US007522837B2

(12) United States Patent
Tanobe et al.

(10) Patent No.: US 7,522,837 B2
(45) Date of Patent: Apr. 21, 2009

(54) OPTICAL COMMUNICATION SYSTEM

(75) Inventors: Hiromasa Tanobe, Tokyo (JP); Akira Okada, Tokyo (JP); Morito Matsuoka, Atsugi (JP); Kazuto Noguchi, Atsugi (JP); Takashi Sakamoto, Zama (JP); Osamu Moriwaki, Zama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 856 days.

(21) Appl. No.: 10/717,225

(22) Filed: Nov. 19, 2003

(65) Prior Publication Data

US 2004/0151498 A1    Aug. 5, 2004

(30) Foreign Application Priority Data

Nov. 21, 2002   (JP)   ............................. 2002-338242
Sep. 18, 2003   (JP)   ............................. 2003-326317

(51) Int. Cl.
    *H04J 14/00*   (2006.01)
(52) U.S. Cl. ............................. 398/63; 398/3; 398/48; 398/59
(58) Field of Classification Search ............. 398/3, 398/7, 45, 48–50, 55–59, 63, 66
    See application file for complete search history.

(56) References Cited

U.S. PATENT DOCUMENTS

| 5,663,818 | A | 9/1997 | Yamamoto et al. |
| 6,643,463 | B1 * | 11/2003 | Suzuki et al. ................. 398/49 |
| 6,718,140 | B1 | 4/2004 | Kamei et al. |
| 7,181,140 | B2 * | 2/2007 | Ovadia ........................ 398/51 |
| 2002/0154357 | A1 * | 10/2002 | Ozveren et al. ............. 359/124 |

FOREIGN PATENT DOCUMENTS

| JP | 56-111340 | 9/1981 |
| JP | 58-120330 | 7/1983 |
| JP | 58-123246 | 7/1983 |
| JP | 58-161488 | 9/1983 |
| JP | 06-216910 | 8/1994 |
| JP | 8-242208 | 9/1996 |

(Continued)

OTHER PUBLICATIONS

"Dynamically reconfigurable real-time information-sharing network system based on a cyclic-frequency AWG and tunable-wavelength lasers", by Akira Okada, et al., 29th European Conference on Optical Communication, Th 2.4.3, Sep. 25, 2003, 2 pages.

(Continued)

*Primary Examiner*—Dalzid Singh
(74) *Attorney, Agent, or Firm*—Harness, Dickey & Pierce, P.L.C.

(57) ABSTRACT

An optical communication system is constructed which enables highly reliable and flexible connection to communication nodes connected to a path establishment circuit, by utilizing wavelength-routing characteristics of a path establishment circuit such as an arrayed waveguide grating. The optical communication system has multiple communication nodes having a signal output port and signal input port pair, and a path establishment circuit having multiple optical input ports and multiple optical output ports which are set so that optical signals input from the respective optical input ports are output to predetermined optical output ports corresponding to the wavelengths of the optical signals.

33 Claims, 50 Drawing Sheets

POINT-TO-POINT TRAFFIC=3
(3/N PER NODE)

FOREIGN PATENT DOCUMENTS

| | | |
|---|---|---|
| JP | 11-041270 | 2/1999 |
| JP | 2000-201112 | 7/2000 |
| JP | 2000-232420 | 8/2000 |
| JP | 2001-53760 | 2/2001 |
| JP | 2001-346235 | 12/2001 |

OTHER PUBLICATIONS

"32×32 full-mesh (1024 path) wavelength-routing WDM network based on uniform-loss cyclic-frequency arrayed-waveguide grating", K. Kato, et al., Electronics Letters, vol. 36, No. 15, pp. 1294-1296, Jul. 20, 2000.

"IEEE 802.5 Documents, 802.5c-1991 (R1997) Supplement to IEEE Std 802.5-1989", <URL: http://www.8025.org/documents/>, Sep. 18, 1991, 47 pages.

"High-Speed Communicatiions Solutions: Reflective Memory Products" by VMIC, a GE Fanuc Company, Aug. 2002, 5 pages.

"GIGA Channel Module APM-425", <URL: http://avaldata.com/avaldata/product/module_product/giga/apm425/apm425.html>, Sep. 8, 2003, 1 page.

"Optical Channel-enabled PMC Card", <URL: http://www.avaldata.com/aval/products/compactpci/apm425/index.html; Oct. 18, 2002, 1 page.

News Release entitled "NTT Develops Logical-topology Reconfigurable WDM Network System" dated Sep. 17, 2003 from website http://www.ntt.co.jp/news/news03/0309/030917.html; 5 pages.

"Logical Topology Dynamically-Reconfigurable Network with Wavelength Routing Full-mesh (AWG-STAR) Technology" by Hiromasa Tanobe, et al., http://www.ieice.org/; IEICE Technical Report, NS2002-260-332, Mar. 7, 2003, ISSN 0913-5685, vol. 102, No. 392; 7 pages.

Takahashi et al., "Impact of Crosstalk in an Arrayed-Waveguide Multiplexer on NXN Optical Interconnection", Journal of Lightwave Technology, vol. 14, No. 6, Jun. 1996.

Chang-Joon Chae, "A Flexible and Protected Virtual Optical Ring Network", IEEE Photonics Technology Letters, vol. 14, No. 11, Nov. 2002.

Chang-Joon Chae, et al., "A Protected Optical Star-Shaped Ring Network Using an *NxN* Arrayed Waveguide Grating and Incoherent Light Sources", IEEE Photonics Technology Letters, vol. 13, No. 8, Aug. 2001, 3 pages.

Charles A. Brackett, "Dense Wavelength Division Multiplexing Networks: Principles and Applications", IEEE Journal on Selected Areas in Communications, vol. 8, No. 6, Aug. 1990, 17 pages.

Mansour I. Irshid, et al., "A WDM Cross-Connected Star Topology for Multihop Lightwave Networks", Journal of Lightwave Technology, vol. 10, No. 6, Jun. 1992, 8 pages.

* cited by examiner

FIG.2A

OUTPUT PORTS

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ9 |
| 3 | λ3 | λ4 | λ5 | λ6 | λ7 | λ8 | λ9 | λ10 |
| 4 | λ4 | λ5 | λ6 | λ7 | λ8 | λ9 | λ10 | λ11 |
| 5 | λ5 | λ6 | λ7 | λ8 | λ9 | λ10 | λ11 | λ12 |
| 6 | λ6 | λ7 | λ8 | λ9 | λ10 | λ11 | λ12 | λ13 |
| 7 | λ7 | λ8 | λ9 | λ10 | λ11 | λ12 | λ13 | λ14 |
| 8 | λ8 | λ9 | λ10 | λ11 | λ12 | λ13 | λ14 | λ15 |

INPUT PORTS

OUTPUT PORTS

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ1 |
| 3 | λ3 | λ4 | λ5 | λ6 | λ7 | λ8 | λ1 | λ2 |
| 4 | λ4 | λ5 | λ6 | λ7 | λ8 | λ1 | λ2 | λ3 |
| 5 | λ5 | λ6 | λ7 | λ8 | λ1 | λ2 | λ3 | λ4 |
| 6 | λ6 | λ7 | λ8 | λ1 | λ2 | λ3 | λ4 | λ5 |
| 7 | λ7 | λ8 | λ1 | λ2 | λ3 | λ4 | λ5 | λ6 |
| 8 | λ8 | λ1 | λ2 | λ3 | λ4 | λ5 | λ6 | λ7 |

INPUT PORTS

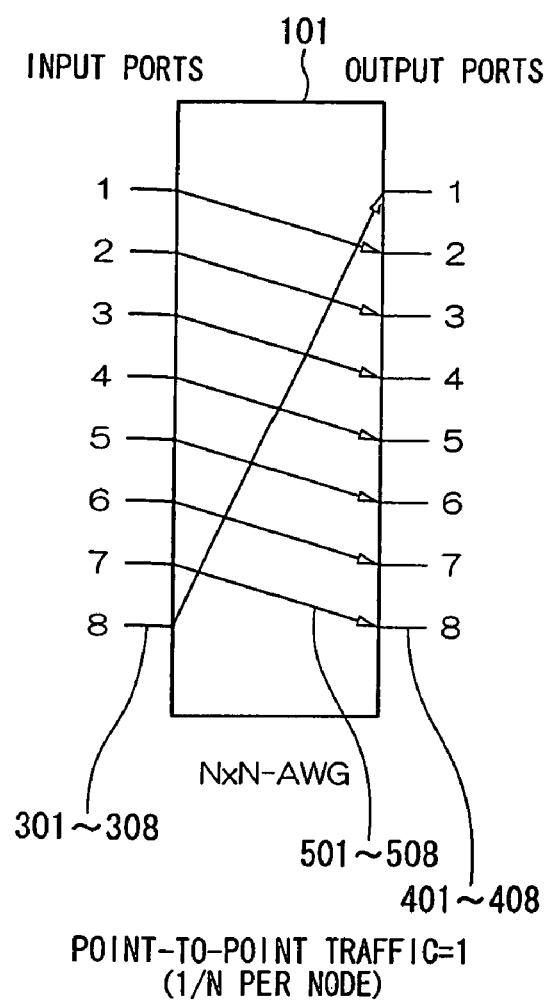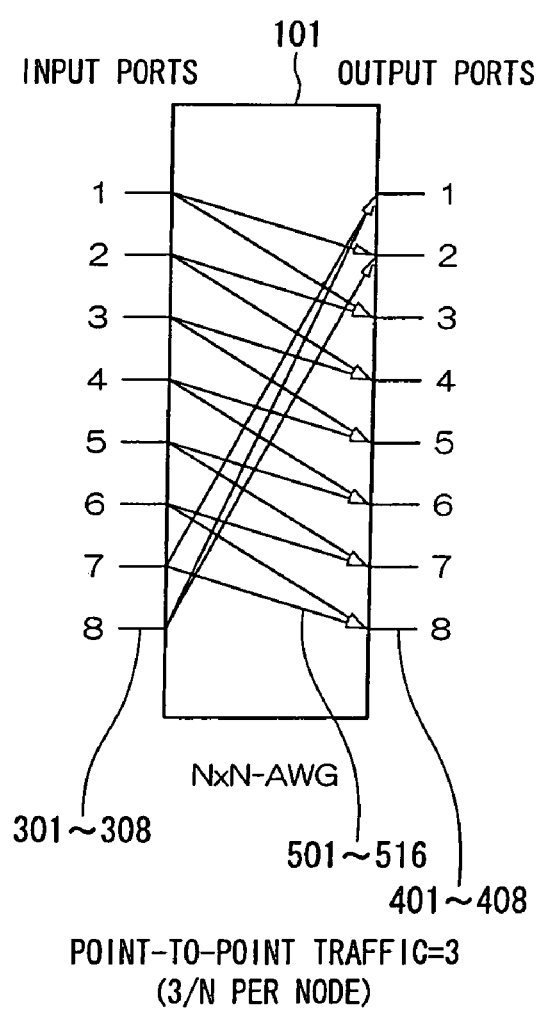

FIG.5A

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ9 |
| 3 | λ3 | λ4 | λ5 | λ6 | λ7 | λ8 | λ9 | λ10 |
| 4 | λ4 | λ5 | λ6 | λ7 | λ8 | λ9 | λ10 | λ11 |
| 5 | λ5 | λ6 | λ7 | λ8 | λ9 | λ10 | λ11 | λ12 |
| 6 | λ6 | λ7 | λ8 | λ9 | λ10 | λ11 | λ12 | λ13 |
| 7 | λ7 | λ8 | λ9 | λ10 | λ11 | λ12 | λ13 | λ14 |
| 8 | λ8 | λ9 | λ10 | λ11 | λ12 | λ13 | λ14 | λ15 |

INPUT PORTS (rows) / OUTPUT PORTS (columns)

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ1 |
| 3 | λ3 | λ4 | λ5 | λ6 | λ7 | λ8 | λ1 | λ2 |
| 4 | λ4 | λ5 | λ6 | λ7 | λ8 | λ1 | λ2 | λ3 |
| 5 | λ5 | λ6 | λ7 | λ8 | λ1 | λ2 | λ3 | λ4 |
| 6 | λ6 | λ7 | λ8 | λ1 | λ2 | λ3 | λ4 | λ5 |
| 7 | λ7 | λ8 | λ1 | λ2 | λ3 | λ4 | λ5 | λ6 |
| 8 | λ8 | λ1 | λ2 | λ3 | λ4 | λ5 | λ6 | λ7 |

INPUT PORTS (rows) / OUTPUT PORTS (columns)

FIG. 7A

INPUT PORTS / OUTPUT PORTS (1301~1308)

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ9 |
| 3 | λ3 | λ4 | λ5 | λ6 | λ7 | λ8 | λ9 | λ10 |
| 4 | λ4 | λ5 | λ6 | λ7 | λ8 | λ9 | λ10 | λ11 |
| 5 | λ5 | λ6 | λ7 | λ8 | λ9 | λ10 | λ11 | λ12 |
| 6 | λ6 | λ7 | λ8 | λ9 | λ10 | λ11 | λ12 | λ13 |
| 7 | λ7 | λ8 | λ9 | λ10 | λ11 | λ12 | λ13 | λ14 |
| 8 | λ8 | λ9 | λ10 | λ11 | λ12 | λ13 | λ14 | λ15 |

FIG. 7B

INPUT PORTS (1401~1408) / OUTPUT PORTS (1301~1308)

| | 1 | 2 | 3 | 4 | 5 | 6 | 7 | 8 |
|---|---|---|---|---|---|---|---|---|
| 1 | λ1 | λ2 | λ3 | λ4 | λ5 | λ6 | λ7 | λ8 |
| 2 | λ2 | λ3 | λ4 | λ5 | λ6 | λ7 | λ8 | λ1 |
| 3 | λ3 | λ4 | λ5 | λ6 | λ7 | λ8 | λ1 | λ2 |
| 4 | λ4 | λ5 | λ6 | λ7 | λ8 | λ1 | λ2 | λ3 |
| 5 | λ5 | λ6 | λ7 | λ8 | λ1 | λ2 | λ3 | λ4 |
| 6 | λ6 | λ7 | λ8 | λ1 | λ2 | λ3 | λ4 | λ5 |
| 7 | λ7 | λ8 | λ1 | λ2 | λ3 | λ4 | λ5 | λ6 |
| 8 | λ8 | λ1 | λ2 | λ3 | λ4 | λ5 | λ6 | λ7 |

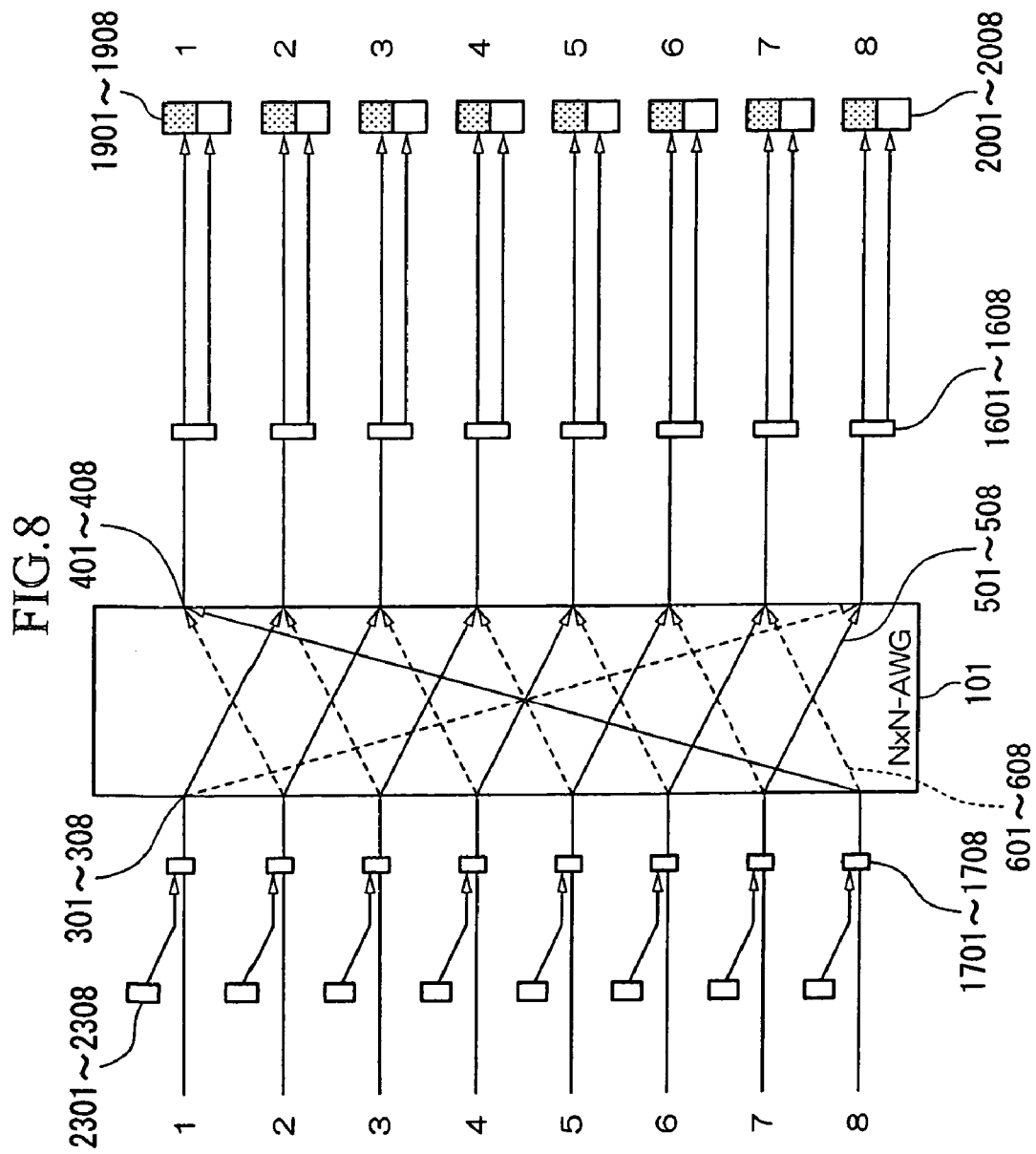

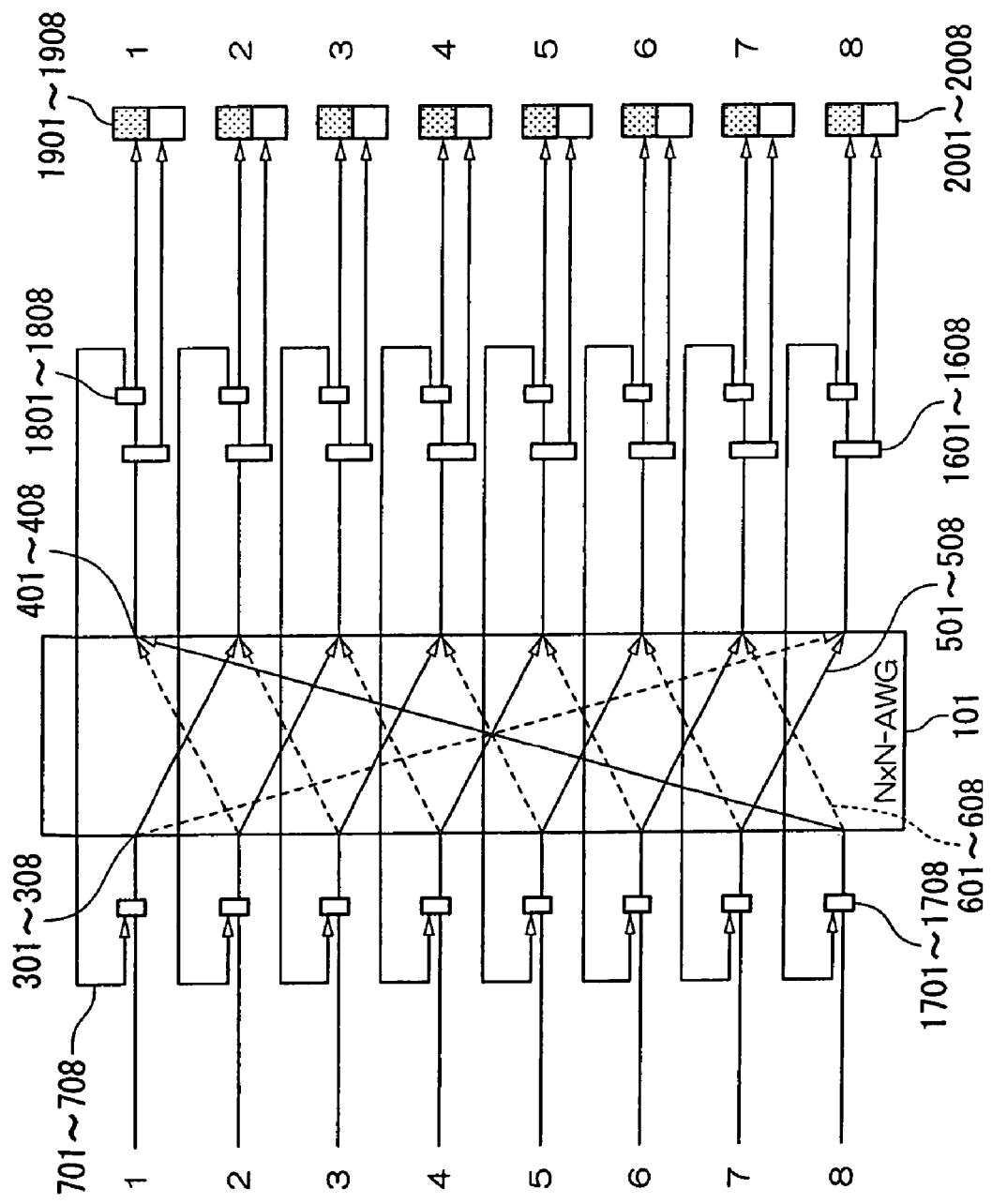

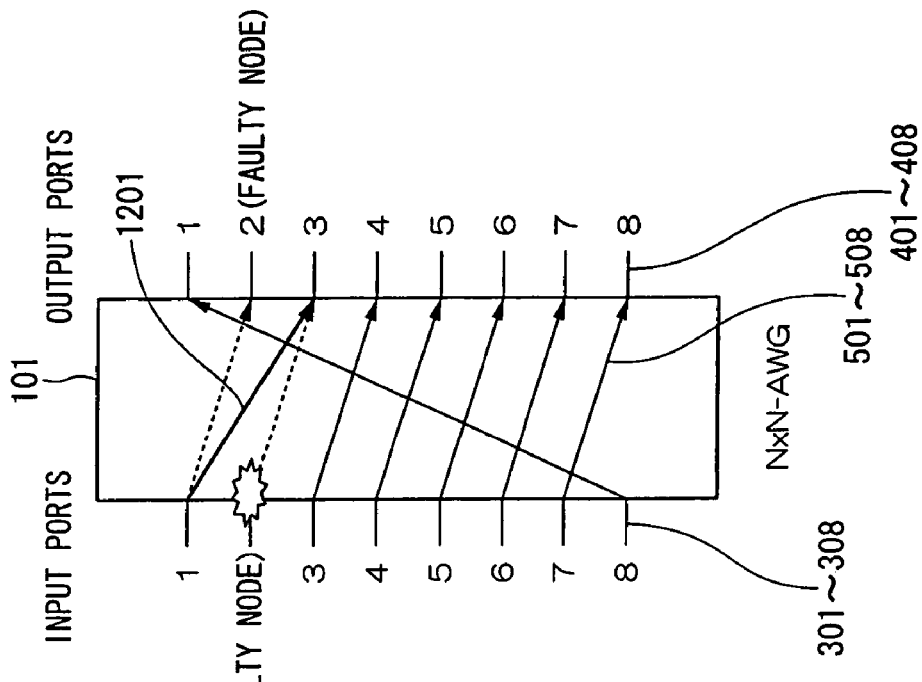
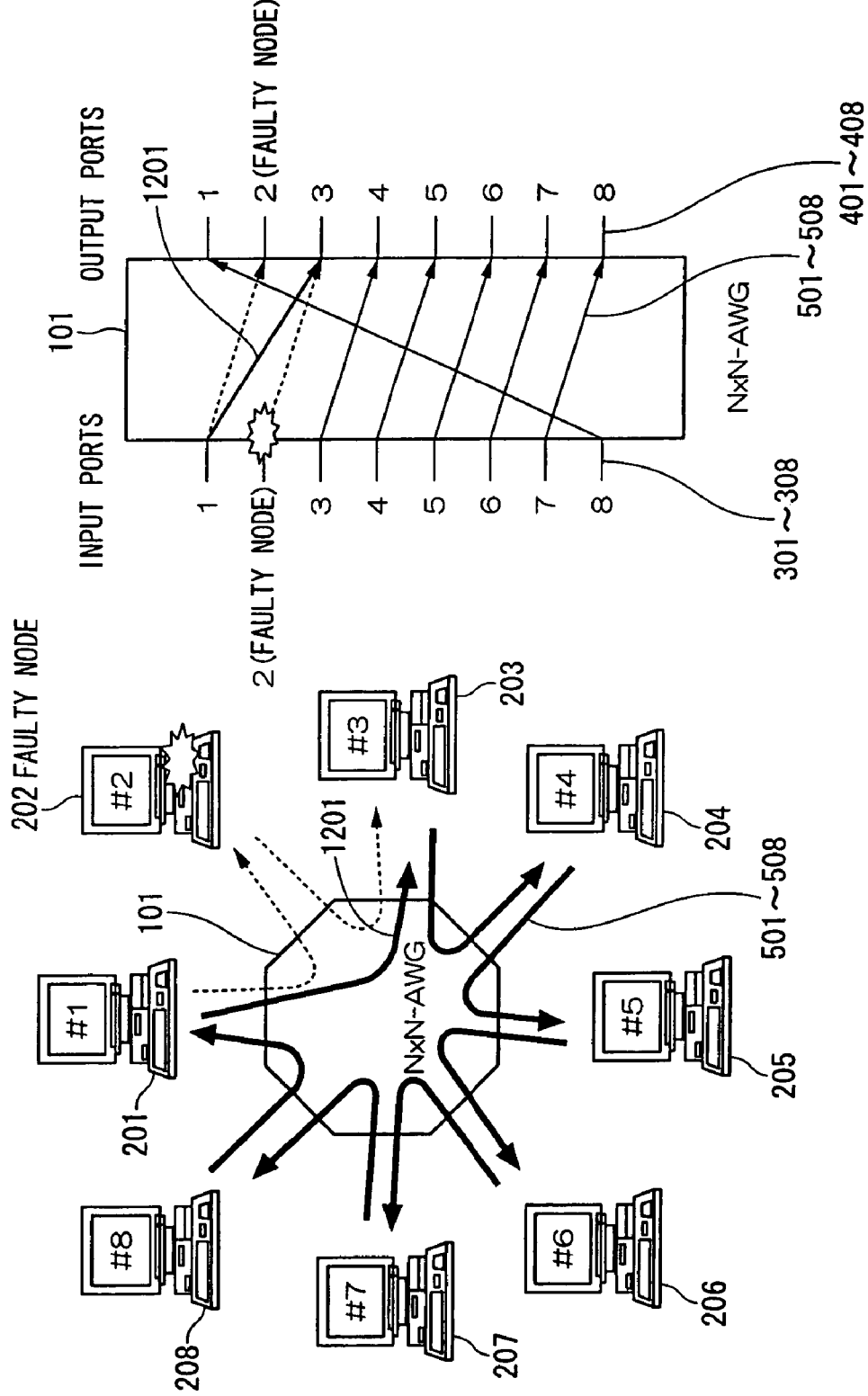

OPTICAL OUTPUT PORTS

| | 3021 | 3022 | 3023 | 3024 |
|---|---|---|---|---|
| 3011 | λ1 | λ2 | λ3 | λ4 |
| 3012 | λ2 | λ3 | λ4 | λ5 |
| 3013 | λ3 | λ4 | λ5 | λ6 |
| 3014 | λ4 | λ5 | λ6 | λ7 |

OPTICAL INPUT PORTS

FIG.23

OPTICAL OUTPUT PORTS

| | 3021 | 3022 | 3023 | 3024 |
|---|---|---|---|---|
| 3011 | λ1 | λ2 | λ3 | λ4 |
| 3012 | λ2 | λ3 | λ4 | λ1 |
| 3013 | λ3 | λ4 | λ1 | λ2 |
| 3014 | λ4 | λ1 | λ2 | λ3 |

OPTICAL INPUT PORTS

OPTICAL OUTPUT PORTS

| | | 3021 | 3022 | 3023 | 3024 |
|---|---|---|---|---|---|
| OPTICAL INPUT PORTS | 3011 | λ1 | λ2 | λ3 | λ4 |
| | 3012 | λ2 | λ3 | λ4 | λ5 |
| | 3013 | λ3 | λ4 | λ5 | λ6 |
| | 3014 | λ4 | λ5 | λ6 | λ7 |

FIG.28

OPTICAL OUTPUT PORTS

| | 3021 | 3022 | 3023 | 3024 |
|---|---|---|---|---|
| 3011 | λ1 | λ2 | //λ3// | λ4 |
| 3012 | λ2 | λ3 | λ4 | λ1 |
| 3013 | λ3 | λ4 | λ1 | //λ2// |
| 3014 | //λ4// | λ1 | λ2 | λ3 |

OPTICAL INPUT PORTS

OPTICAL OUTPUT PORTS

| | | 3021 | 3022 | 3023 | 3024 |
|---|---|---|---|---|---|
| OPTICAL INPUT PORTS | 3011 | λ1 | λ2 | λ3 | λ4 |
| | 3012 | λ2 | λ3 | λ4 | λ5 |
| | 3013 | λ3 | λ4 | λ5 | λ6 |
| | 3014 | λ4 | λ5 | λ6 | λ7 |

FIG.34

OPTICAL OUTPUT PORTS

| | 3021 | 3022 | 3023 | 3024 |
|---|---|---|---|---|
| 3011 | λ1 | λ2 | λ3 | λ4 |
| 3012 | λ2 | λ3 | λ4 | λ1 |
| 3013 | λ3 | λ4 | λ1 | λ2 |
| 3014 | λ4 | λ1 | λ2 | λ3 |

OPTICAL INPUT PORTS

OPTICAL OUTPUT PORTS

| | 3021 | 3022 | 3023 | 3024 |
|---|---|---|---|---|
| 3011 | λ1 | λ2 | λ3 | λ4 |
| 3012 | λ2 | λ3 | λ4 | λ5 |
| 3013 | λ3 | λ4 | λ5 | λ6 |
| 3014 | λ4 | λ5 | λ6 | λ7 |

OPTICAL INPUT PORTS

FIG.39

OPTICAL OUTPUT PORTS

OPTICAL INPUT PORTS

|  | 3021 | 3022 | 3023 | 3024 |
|---|---|---|---|---|
| 3011 | λ1 | λ2 | λ3 | λ4 |
| 3012 | λ2 | λ3 | λ4 | λ1 |
| 3013 | λ3 | λ4 | λ1 | λ2 |
| 3014 | λ4 | λ1 | λ2 | λ3 |

FIG. 48

OPTICAL OUTPUT PORTS

| | 3021 | 3022 | 3023 | 3024 |
|---|---|---|---|---|
| 3011 | $\lambda 1$ | $\lambda 2$ | $\lambda 3$ | $\lambda 4$ |
| 3012 | $\lambda 2$ | $\lambda 3$ | $\lambda 4$ | $\lambda 1$ |
| 3013 | $\lambda 3$ | $\lambda 4$ | $\lambda 1$ | $\lambda 2$ |
| 3014 | $\lambda 4$ | $\lambda 1$ | $\lambda 2$ | $\lambda 3$ |

OPTICAL INPUT PORTS

FIG. 49

OPTICAL OUTPUT PORTS

| | 3025 | 3026 | 3027 | 3028 |
|---|---|---|---|---|
| 3015 | $\lambda 1$ | $\lambda 2$ | $\lambda 3$ | $\lambda 4$ |
| 3016 | $\lambda 2$ | $\lambda 3$ | $\lambda 4$ | $\lambda 1$ |
| 3017 | $\lambda 3$ | $\lambda 4$ | $\lambda 1$ | $\lambda 2$ |
| 3018 | $\lambda 4$ | $\lambda 1$ | $\lambda 2$ | $\lambda 3$ |

OPTICAL INPUT PORTS

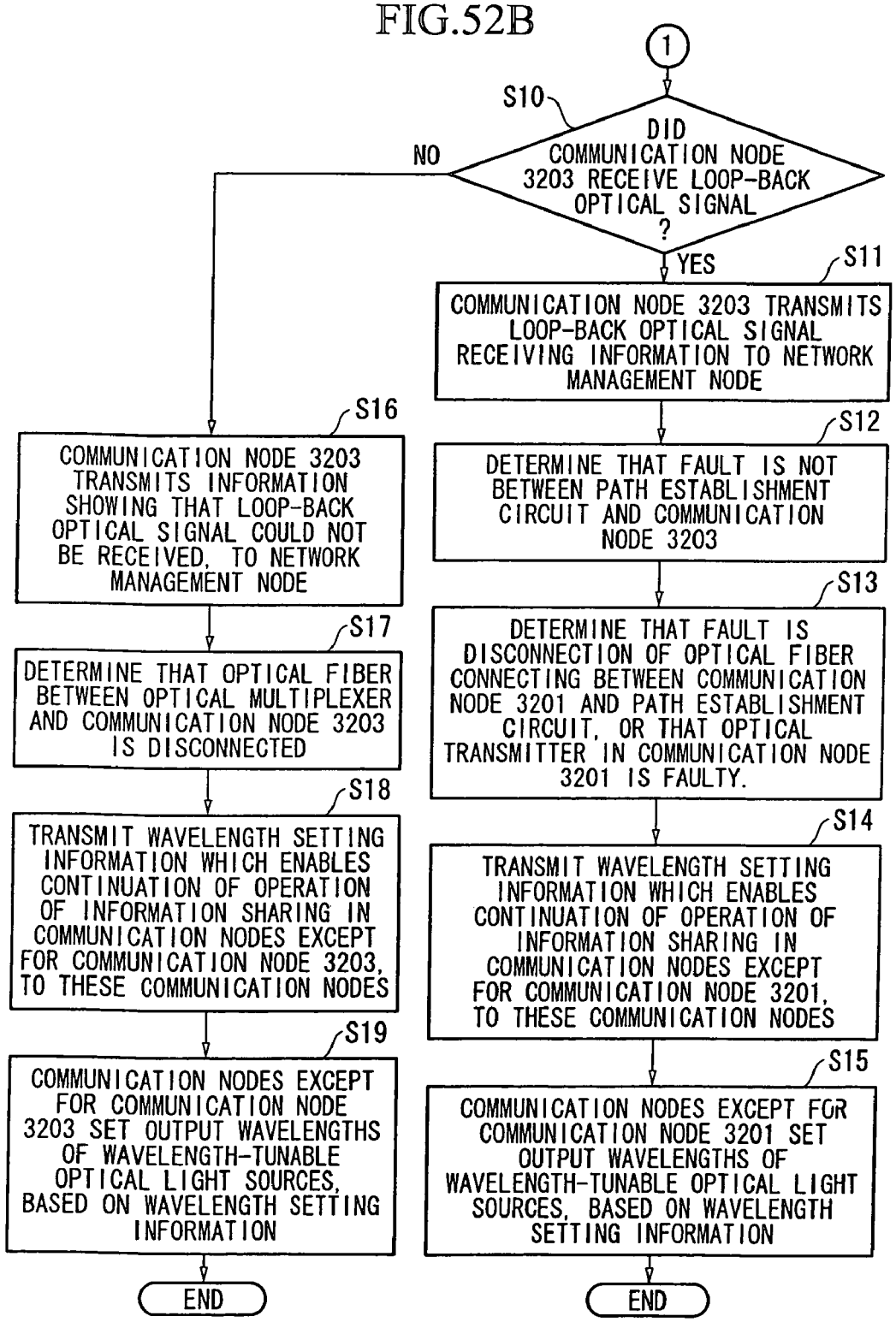

13001~1300n

TOKEN RING   4001~400n

OPTICAL COMMUNICATION SYSTEM

BACKGROUND OF THE INVENTION

1. Field of the Invention

The present invention relates to an optical communication system for connecting communication nodes. Specifically, the present invention relates to an optical communication system (optical network system) for flexibly connecting multiple communication nodes at low cost and with high reliability by utilizing the wavelength-routing characteristics of an arrayed waveguide grating, and for sharing memories loaded in respective communication nodes at low cost. More specifically, the present invention relates to an optical communication system which enables flexible connection of communication nodes with high reliability, by utilizing the wavelength-routing characteristics used in an arrayed waveguide grating or the like.

Priority is claimed on Japanese Patent Application No. 2002-338242 filed on Nov. 21, 2002 and Japanese Patent Application No. 2003-326317 filed on Sep. 18, 2003, the contents of which are incorporated herein by reference.

2. Description of the Related Art

With the developments in computerized offices and computerized administration, a demand for sharing information between respective communication nodes (nodes), for delivering information to a specific communication node, or for distributed processing of the specific information between respective communication nodes is increasing in intranets and networks in organizations. Therefore, a method for realizing this with low cost, easily, and stably has been desired.

As a method for realizing this, as shown in FIG. 53, it is considered to annularly connect by optical fibers, shared memory which is loaded in respective communication nodes on the network, and to sequentially transmit frames loaded with communication data between these communication nodes. FIG. 53 shows a system comprising four communication nodes 5201 to 5204. Communication modules 5012 loaded with optical transceivers and shared memories, are installed in the communication nodes 5201 to 5204, and the flow of frames F1 to F4 loaded with the respective data of the communication nodes 5201 to 5204, forms a logical ring topology. The frames F1 to F4 loaded with the respective data of the communication nodes 5201 to 5204, circulate the logical ring topology so that the data is shared between the communication nodes (for example, refer to "optical channel-enabled PMC card", <URL: http://avaldata.com/avaldata/product/module_product/giga/apm425/apm425.html>)

Here, as a method for configuring a network by connecting communication nodes, as shown in FIG. 54A to FIG. 54B, there is so called a ring-shaped network system which physically and annularly connects respective communication nodes, represented by a token ring (for example, refer to "IEEE 802.5 Documents, 802.5c-1991(R1997) Supplement to IEEE Std 802.5-1989", especially, chapter 2, <URL: http://www.8025.org/documents/>). In FIG. 54A, reference symbols 13001 to 1300n denote nodes.

Regarding the token ring scheme shown in FIG. 54A and FIG. 54B, by only arranging a transmission/reception circuit (transceiver) in respective communication nodes, and simply chain connecting sequentially all the communication nodes by an optical waveguide such as an optical fiber, it is possible to connect many communication nodes by transmission processing, with low cost. Therefore, it is suitable as a network which can be configured easily.

According to this scheme, as shown in FIG. 53, it is possible to share data of the memories, which all the connected communication nodes have, so that delivering, circulating, and distributed processing of signals between all the communication nodes becomes feasible.

However, in the abovementioned scheme, the problem is such that, in the case where any fault such as disconnection of an optical fiber or failure of a communication node occurs, all the other connected communication nodes are affected. That is to say, in the case where a fault occurs, the communication node that detected the fault outputs a fault signal, the respective communication nodes temporarily withdraw from the network to which they belong, and attempt automatic diagnosis in order to reconfigure the network around the faulty area. When they attempt automatic diagnosis, all the other communication nodes connected to the network are affected, and communication disconnection occurs. Furthermore, another problem is such that, in the case where a communication node is to be added to the same ring, the overall network must be paused.

Hence, in a ring-shaped network, a method for avoiding the influence of a communication fault by using a reverse route is used. For example, there is an FDDI (Fiber Distributed Data Interface) as a token ring optical communication system which duplicates a ring network by an optical fiber. In the FDDI, when a fault occurs, the reverse route can be realized by using a redundant optical fiber. However, not only is there a problem in that the fault avoiding system becomes extremely large scale, but also a redundant configuration of the transmission optical fiber is indispensable. Moreover, a token ring does not function as a shared memory network unless the ring is completed. Therefore, a convenient and stable optical communication system alternative has been desired.

Furthermore, even if the redundant configuration is employed, if a communication faults occur at more than one communication node, it becomes impossible to form a logical ring topology. Therefore, there is the drawback in that communication nodes where no fault has occurred are isolated.

Moreover, it is also considered to share the memory which the respective communication nodes accommodated in a ring network have. However, due to the abovementioned problems, there is a need for a highly reliable optical communication system as an alternative to this.

SUMMARY OF THE INVENTION

The present invention takes into consideration the abovementioned problems, with an object of realizing an optical communication system which can connect multiple communication nodes at low cost and with high reliability, and which can share memory loaded in respective communication nodes at low cost.

Also, an object of the present invention is to construct an optical communication system which enables highly reliable and flexible connection to communication nodes connected to a path establishment circuit such as an arrayed waveguide grating, by utilizing wavelength-routing characteristics of a path establishment circuit such as an arrayed waveguide grating.

In order to solve the abovementioned problem, an optical communication system according to a first aspect of the present invention comprising: an N×N wavelength path establishment circuit having N input ports and N output ports, N being an integer of at least 2, outputting light input from an input port to a different output port depending on the wavelength of the input light, and the wavelength of light output from an output port being different depending on the input port; n communication nodes, n being an integer at least 2 and not greater than N, for outputting information of an input optical data signal, as is or after changing a part of the information, as an optical data signal of a predetermined wavelength; and optical waveguides for connecting the input ports and the output ports of the N×N wavelength path establishment circuit, and the communication nodes, wherein for at least some of the n communication nodes, in order to form at least one logical-ring transmission path where an optical data signal transmitted from one communication node returns to the one communication node via other communication nodes, a correlation of wavelengths for connecting between the input ports and the output ports of the N×N wavelength path establishment circuit, wavelengths of optical data signals output from the respective communication nodes, and connections between the input ports and the output ports of the N×N wavelength path establishment circuit, and the respective communication nodes are set.

Moreover, in an optical communication system according to a second aspect of the present invention, in the abovementioned optical communication system, for at least some of the n communication nodes, in order to form at least two logical-ring transmission paths where an optical data signal transmitted from one communication node returns to the one communication node via other communication nodes, a correlation of wavelengths for connecting between the input ports and the output ports of the N×N wavelength path establishment circuit, wavelengths of at least two optical data signals output from the respective communication nodes, and connections between the input ports and the output ports of the N×N wavelength path establishment circuit, and the respective communication nodes are set.

Furthermore, in an optical communication system according to a third aspect of the present invention, in the abovementioned optical communication system of the first aspect, each communication node sets the wavelength of an optical control signal for link query between the communication nodes which is output so as to form the logical-ring transmission path where the optical control signal circulates in reverse to the optical data signal. In an optical communication system according to a fourth aspect of the present invention, in the optical communication system according to the third aspect, each communication node splits a part of an input optical data signal and transmits the split optical data signal as the optical control signal for link query. In an optical communication system according to a fifth aspect of the present invention, in the optical communication system according to the third aspect, each communication node configures a leading part of the optical data signal with an unmodulated signal, modulates the unmodulated part of the optical data signal input to each communication node, and transmits the modulated optical data signal as the optical control signal for link query.

Furthermore, in an optical communication system according to a sixth aspect of the present invention, in the optical communication system according to any one of the third to the fifth aspects, a communication node which cannot receive the optical control signal for link query sets the output wavelength of the optical data signal to a wavelength corresponding to a communication node which skips at least the next communication node on the transmission path of the optical data signal.

Furthermore, in an optical communication system according to a seventh aspect of the present invention, in an optical communication system according to any one of the abovementioned aspects, each communication nodes is provided with: a device which transfers the optical data signal so that an optical data signal loaded with information of communication nodes circulates the respective communication nodes forming the logical-ring transmission path; a memory for storing information of the optical data signal which has been received; and a transfer device which writes the information of the optical data signal to the memory, and appends information to the optical data signal which is transmitted.

Moreover, in an optical communication system according to an eighth aspect of the present invention, in an optical communication system according to any one of the abovementioned aspects, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

Furthermore, an optical communication system according to a ninth aspect of the present invention is an optical communication system for communicating between multiple communication nodes for outputting information of an input optical data signal, as is or after changing a part of the information, as an optical data signal of a predetermined wavelength, comprising: an N×N wavelength path establishment circuit, which has N input ports and N output ports, N being any integer which satisfies $2 \leq n \leq N$ where n is the number of the communication nodes, connected to the communication nodes via an optical waveguide, and light input from an input port is output to a different output port depending on the wavelength of the input light, and the wavelength of light output from an output port is different depending on the input port; a database prestored with output wavelengths used in the case in which a signal is routed from a predetermined input port to a predetermined output port in the N×N wavelength path establishment circuit; and a controlling device which receives control information including a connection request from a communication node, refers to the database and reads out an output wavelength which should be set by the communication node, and transmits control information for instructing the output wavelength to the communication node which transmitted the connection request, wherein for at least some of the n communication nodes, in order to form a logical-ring transmission path where an optical data signal transmitted from one communication node returns to the one communication node via other communication nodes, a correlation of wavelengths for connecting between the input ports and the output ports of the N×N wavelength path establishment circuit, wavelengths of optical data signals output from respective communication nodes, and connections between the input ports and the output ports of the N×N wavelength path establishment circuit, and the respective communication nodes are set.

According to the above-described optical communication systems, multiple communication nodes (nodes) can be connected at low cost and with high reliability, and sharing of the memories of the respective communication nodes becomes possible.

Moreover, an optical communication system according to a tenth aspect of the present invention comprising: multiple communication nodes each having a pair of a signal output port and a signal input port; and multiple path establishment circuits each having multiple optical input ports and multiple optical output ports which are set so that an optical signal input from an optical input port is output to a predetermined optical output port corresponding to the wavelength of the input optical signal, wherein the signal output port and the signal input port of the pair of each communication node are connected to an optical input port and an optical output port of one of the multiple path establishment circuits, an optical input port of one path establishment circuit is connected to an optical output port of another path establishment circuit, and an optical output port of the one path establishment circuit is connected to an optical input port of the other path establishment circuit.

Moreover, in an optical communication system according to an eleventh aspect of the present invention, in the optical communication system of the tenth aspect, the wavelengths of the optical signals from the signal output ports of the respective communication nodes are arranged so that the connection of the multiple communication nodes forms a logical ring topology.

Moreover, in an optical communication system according to a twelfth aspect of the present invention, in the optical communication system according to the tenth or eleventh aspects, an optical output port of the one path establishment circuit and an optical input port of the other path establishment circuit is connected via a communication node.

An optical communication system according to a thirteenth aspect of the present invention comprising multiple units, each of which comprises: multiple communication nodes each having a pair of a signal output port and a signal input port; multiple optical switches, each of which sets the direction of an optical signal in which the optical signal from one optical input port is output to any of multiple optical output ports; multiple optical multiplexers, each of which multiplexes optical signals from multiple optical input ports, and each of which outputs a multiplexed signal to one optical output port; and a path establishment circuit having multiple optical input ports and multiple optical output ports which is set so that an optical signal input from an input port is output to a predetermined optical output port depending on the wavelength of the input optical signal, wherein, in each of the multiple units, a signal output port of a communication node is connected to an optical input port of the corresponding optical switch, an optical output port of the optical switch is connected to an optical input port of the corresponding optical multiplexer, an optical output port of the optical multiplexer is connected to an optical input port of the corresponding path establishment circuit, and an output port of the path establishment circuit is connected to a signal input port of the corresponding communication node.

An optical communication system according to a fourteenth aspect of the present invention comprising multiple units, each of which comprises: multiple communication nodes each having a pair of a signal output port and a signal input port; multiple optical splitters, each of which splits an optical signal from one optical input port, and each of which outputs split optical signals to multiple optical output ports; multiple optical switches, each of which sets the direction of an optical signal in which the optical signal from any of multiple input ports is output to one optical output port; and a path establishment circuit having multiple optical input ports and multiple optical output ports which is set so that an optical signal input from an optical input port is output to a predetermined optical output port depending on the wavelength of the input optical signal, wherein, in each of the multiple units, a signal output port of a communication node is connected to an optical input port of the corresponding optical splitter, an optical output port of the optical splitter is connected to an optical input port of the corresponding optical switch, an optical output port of the optical switch is connected to an optical input port of the corresponding path establishment circuit, and an output port of the path establishment circuit is connected to a signal input port of the corresponding communication node.

In an optical communication system according to a fifteenth aspect of the present invention, in the optical communication system according to the thirteenth or the fourteenth aspects, the wavelengths of the optical signals from the signal output ports of the respective communication nodes are arranged and the directions of the optical switches are set so that the connection of the multiple communication nodes forms a logical ring topology.

In an optical communication system according to a sixteenth aspect of the present invention, in the optical communication system according to any one of the thirteenth through fifteenth aspects, each of the path establishment circuits comprises an arrayed waveguide grating.

In an optical communication system according to a seventeenth aspect of the present invention, in the optical communication system according to any one of the thirteenth through sixteenth aspects, an optical light source of the communication node comprises a wavelength-tunable optical light source.

In an optical communication system according to an eighteenth aspect of the present invention, in an optical communication system according to any one of the twelfth through seventeenth aspects, a part of the communication nodes is replaced by a repeater having a function for converting wavelength.

In an optical communication system according to a nineteenth aspect of the present invention, in an optical communication system according to the eleventh or fifteenth aspects, each communication node is provided with: a device which transfers an optical data signal loaded with information of communication nodes so that the optical data signal circulates the respective communication nodes on the logical ring topology; a memory for storing information of the optical data signal which has been received; and a transfer device which writes the information of the received optical data signal to the memory, and appends information to an optical data signal which is transmitted.

In an optical communication system according to a twentieth aspect of the present invention, in an optical communication system according to any of the tenth through nineteenth aspects, further comprising a management node which monitors and controls the condition of the respective communication nodes, wherein the respective communication nodes and the management node communicate using an optical signal, of which the wavelength is different from the wavelength of an optical data signal loaded with information of communication nodes.

An optical communication system according to a twenty first aspect of the present invention is an optical communication system for communicating between multiple communication nodes each having a pair of a signal output port and a signal input port, comprising: a path establishment circuit having multiple optical input ports and multiple optical output ports which is previously set so that an optical signal input from an optical input port is output to a predetermined optical output port depending on the wavelength of the input optical signal; a database prestored with output wavelengths used in the case in which a signal is routed from a predetermined optical input port to the predetermined optical output port in the path establishment circuit; and a controlling device which receives control information including a connection request from a communication node, refers to the database and reads out an output wavelength which should be set by the communication node, and transmits control information for instructing the output wavelength to the communication node which transmitted the connection request, wherein the signal output port and the signal input port of the pair of each multiple communication node are connected to an optical input port and an optical output port of the path establishment circuit, and an optical input port of one path establishment circuit is connected to an optical output port of another path establishment circuit, and an optical output port of the one path establishment circuit is connected to an optical input port of the other path establishment circuit.

An optical communication system according to a twenty second aspect of the present invention is an optical communication system for communicating between multiple communication nodes each having a pair of a signal output port and a signal input port, comprising: multiple units, each of which comprises multiple optical switches, each of which sets the direction of an optical signal in which the optical signal from one optical input port is output to any of multiple optical output ports, multiple optical multiplexers, each of which multiplexes optical signals from multiple optical input ports, and each of which outputs a multiplexed optical signal to one optical output port, and a path establishment circuit having multiple optical input ports and multiple optical output ports which is set so that an optical signal input from an optical input port is output to a predetermined optical output port depending on the wavelength of the input optical signal; a database prestored with information of devices connected to the optical input ports and the optical output ports of the optical switches, and output wavelengths used in the case in which an optical signal is routed from a predetermined optical input port to a predetermined optical output port in the path establishment circuits; and a controlling device which receives control information including a connection request from a communication node, refers to the database and reads out an output wavelength which should be set by the communication node, and transmits control information for instructing the output wavelength to the communication node which transmitted the connection request, and also which controls the setting of the directions of the optical switches, wherein, in each of the multiple units, a signal output port of a communication node is connected to an optical input port of the corresponding optical switch, an optical output port of the optical switch is connected to an optical input port of the corresponding optical multiplexer, an optical output port of the optical multiplexer is connected to an optical input port of the corresponding path establishment circuit, and an output port of the path establishment circuit is connected to a signal input port of the corresponding communication node.

An optical communication system according to a twenty third aspect of the present invention is an optical communication system for communicating between multiple communication nodes each having a pair of a signal output port and a signal input port, comprising: multiple units, each of which comprises multiple optical splitters, each of which splits an optical signal from one optical input port, and each of which outputs split optical signals to multiple optical output ports, multiple optical switches, each of which sets the direction of an optical signal in which the optical signal from any of the multiple input ports is output to one optical output port, and a path establishment circuit having multiple optical input ports and multiple optical output ports which is set so that an optical signal input from an input port is output to a predetermined optical output port depending on the wavelength of the input optical signal; a database prestored with information of devices connected to the optical input ports and the optical output ports of the optical switches, and output wavelengths used in the case in which an optical signal is routed from a predetermined optical input port to a predetermined optical output port in the path establishment circuits; and a controlling device which receives control information including a connection request from a communication node, refers to the database and reads out an output wavelength which should be set by the communication node, and transmits control information for instructing the output wavelength to the communication node which transmitted the connection request, and also which controls the setting of the directions of the optical switches, wherein, in each of the multiple units, a signal output port of a communication node is connected to an optical input port of the corresponding optical splitter, an optical output port of the optical splitter is connected to an optical input port of the corresponding optical switch, an optical output port of the optical switch is connected to an optical input port of the corresponding path establishment circuits, and an output port of the path establishment circuit is connected to a signal input port of the corresponding communication node.

Furthermore, the respective configurations can be combined in as many ways as possible.

Here a communication node means a device which receives an input optical signal, effects communication processing and then outputs an optical signal with a predetermined wavelength. Logical ring topology means a configuration where the logical connection forms a ring shape. Arrayed-waveguide grating means a passive functional device where an optical waveguide is formed on a substrate made of silica, silicon or the like. By means of an arrayed-waveguide grating, a path establishment modifying function, a wavelength selecting function and the like can be realized. A wavelength-tunable optical light source means an optical light source which can control and modify the wavelength of the output optical signal. A repeater means a device which communication processes layer 1 or lower layers in an OSI basic reference model, receives an input optical signal and outputs an optical signal at a predetermined wavelength. By making the wavelength of the output optical signal different from the wavelength of the input optical signal, the repeater can be given a wavelength conversion function.

According to the optical communication systems of the above-described tenth through twenty-third aspects, it is possible to highly reliably and flexibly connect communication nodes connected to a path establishment circuit such as an arrayed waveguide grating, by utilizing wavelength-routing characteristics of a path establishment circuit such as an arrayed waveguide grating.

BRIEF DESCRIPTION OF THE DRAWINGS

FIG. 2A and FIG. 2B are explanatory diagrams for the first embodiment of the present invention, showing an example of correlation of wavelengths connecting between input ports and output ports in an N×N-AWG, FIG. 2A showing a case without cyclic-wavelength characteristics, and FIG. 2B showing a case with cyclic-wavelength characteristics.

FIG. 4A and FIG. 4B are explanatory diagrams showing an example of transmission paths between input ports and output ports in an N×N-AWG of the second embodiment of the present invention.

FIG. 5A and FIG. 5B are explanatory diagrams showing an example of setting of wavelengths of optical data signals of respective communication nodes in the second embodiment of the present invention, FIG. 5A showing a case without cyclic-wavelength characteristics, and FIG. 5B showing a case with cyclic-wavelength characteristics.

FIG. 7A and FIG. 7B are explanatory diagrams showing an example of setting of wavelengths of optical data signals and optical control signals of the respective communication nodes in the third embodiment of the present invention, FIG. 7A showing a case without cyclic-wavelength characteristics, and FIG. 7B showing a case with cyclic-wavelength characteristics.

FIG. 8 is an explanatory diagram showing an example of a configuration related to transfer of optical control signals in the respective communication nodes in the third embodiment of the present invention.

FIG. 9 is an explanatory diagram showing another example of a configuration related to transfer of optical control signals in the respective communication nodes in the third embodiment of the present invention.

FIG. 12A and FIG. 12B are block diagrams showing a situation in a case where a fault occurs in an optical communication system of the present invention.

FIG. 13A and FIG. 13B are explanatory diagrams showing an example of setting of wavelength of optical data signals and optical control signals of the respective communication nodes in a case where a fault occurs, FIG. 13A showing a case without cyclic-wavelength characteristics, and FIG. 13B showing a case with cyclic-wavelength characteristics.

FIG. 23 is an explanatory diagram showing wavelength characteristics of a path establishment circuit applicable to the fifth embodiment of the present invention.

FIG. 28 is an explanatory diagram showing wavelength characteristics of a path establishment circuit applicable to the eighth embodiment of the present invention.

FIG. 34 is an explanatory diagram showing wavelength characteristics of the path establishment circuit applicable to the ninth embodiment of the present invention.

FIG. 39 is an explanatory diagram showing wavelength characteristics of a path establishment circuit applicable to the twelfth embodiment in the present invention.

FIG. 48 is a diagram showing wavelength-routing characteristics which show a relation between wavelengths and input/output ports of a path establishment circuit 3101, in the thirteenth embodiment of the present invention.

FIG. 49 is a diagram showing wavelength-routing characteristics which show a relation between wavelengths and input/output ports of a path establishment circuit 3102, in the thirteenth embodiment of the present invention.

FIG. 52A and FIG. 52B are flowcharts showing a processing procedure for detecting a fault source and for continuing an operation of information sharing, in the fourteenth embodiment of the present invention.

DETAILED DESCRIPTION OF THE INVENTION

Hereunder is a description of embodiments of the present invention, with reference to the appended drawings.

EMBODIMENT 1

First to fourth embodiments described hereunder, are described using as an example "8" as N, being the number of input ports and output ports of an N×N arrayed waveguide grating optical multiplexer/demultiplexer (hereunder, N×N-AWG) which functions as a wavelength path establishment circuit, and as n, being the number of communication nodes. However, the invention is not limited to this and it may be such that N is any integer of 2 or more and that n is any integer of 2 or more and less than or equal to N.

Figure 1B:
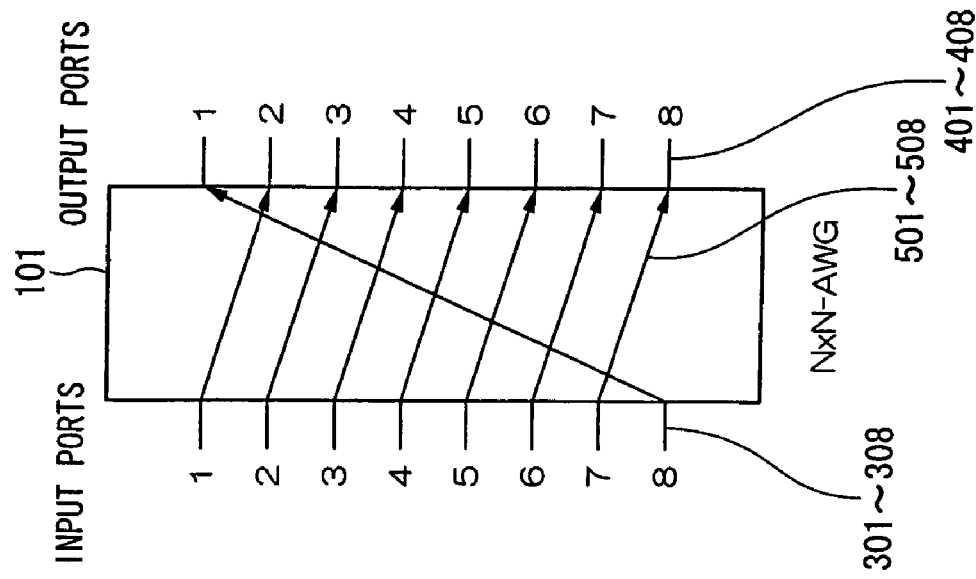
FIG. 1A and FIG. 1B are block diagrams showing a first embodiment of an optical communication system of the present invention.
Figure 1A:
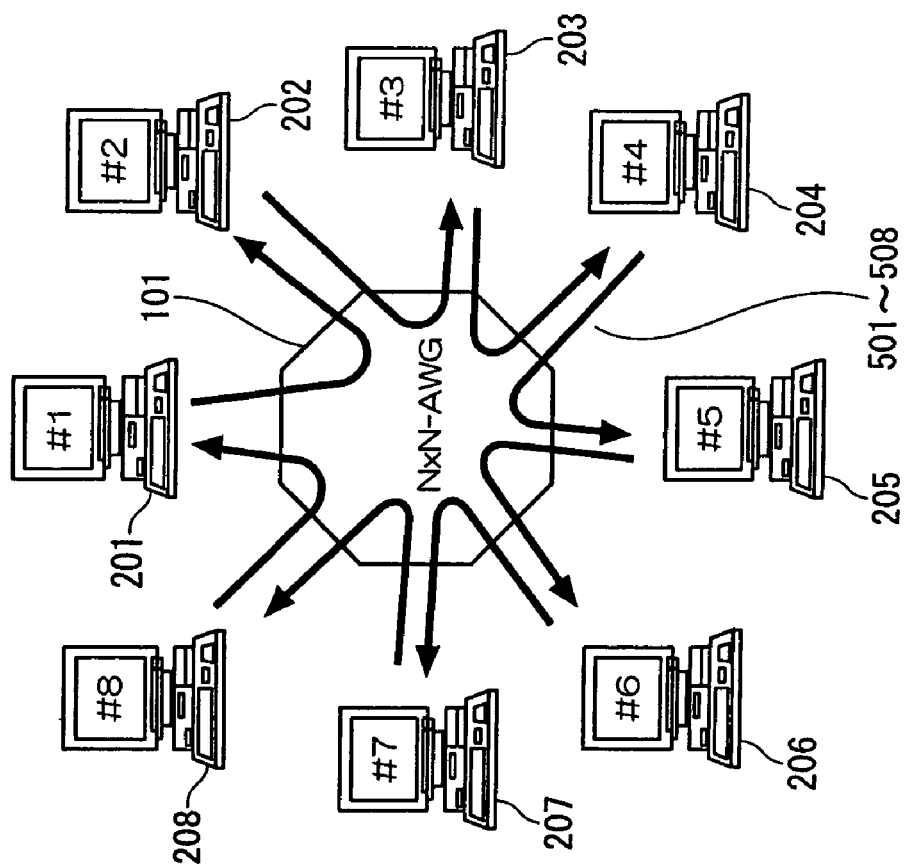

FIG. 1A and FIG. 1B show a first embodiment of an optical communication system of the present invention. FIG. 1A shows the overall configuration, while FIG. 1B shows an example of transmission paths between input ports and output ports in the N×N-AWG.

In FIG. 1A, reference symbol 101 is an N×N (here, 8×8)-AWG having 8 input ports 301 to 308 and 8 output ports of 401 to 408, the arrangement being such that; light input to one input port, is output from different respective output ports according to the wavelength thereof. Also, the wavelength of the light output from the one output port is different for each input port. FIG. 2A and FIG. 2B show an example of correlation of wavelengths for connecting between the input ports and the output ports in the N×N-AWG 101. FIG. 2A shows a case where the used wavelength does not have cyclic characteristics. FIG. 2B shows a case where the used wavelength has cyclic characteristics.

Moreover, in FIG. 1A, reference symbols 201 to 208 denote communication nodes. The arrangement is for outputting optical data signals of predetermined wavelengths and for outputting the information of input optical data signals, as is or after changing a part of it, as the optical data signals of predetermined wavelengths.

The communication nodes 201 to 208 are respectively connected to the input ports 301 to 308 and the output ports 401 to 408 of the N×N-AWG 101 via optical waveguides such as optical fiber (not shown). Specifically, the communication node 201 is connected to the input port 301 and the output port 401, the communication node 202 is connected to the input port 302 and the output port 402, and so on, and the communication node 208 is connected to the input port 308 and the output port 408.

Here, if the wavelengths of the optical data signals of the respective communication nodes 201 to 208 are appropriately selected and set, based on a correlation of wavelengths between the input ports and the output ports in the N×N-AWG 101 and a connection between the input ports and the output ports of the N×N-AWG 101 and the communication nodes 201 to 208, then a logical-ring transmission path can be formed where an optical data signal transmitted from one communication node returns to the one communication node via the other communication nodes.

Specifically, if the wavelengths 1301 to 1308 of the optical data signals of the communication nodes 201 to 208 are set to $\lambda 2, \lambda 4, \lambda 6, \lambda 8, \lambda 10, \lambda 12, \lambda 14$, and $\lambda 8$ (in the case of FIG. 2A) or to $\lambda 2, \lambda 4, \lambda 6, \lambda 8, \lambda 2, \lambda 4, \lambda 6$, and $\lambda 8$ (in the case of FIG. 2B), an optical data signal from the communication node (#1) 201 is output to the communication node (#2) 202, an optical data signal from the communication node (#2) 202 is output to the communication node (#3) 203, and so on, and an optical data signal from the communication node (#7) 207 is output to the communication node (#8) 208, and an optical data signal from the communication node (#8) 208 is output to the communication node (#1) 201. As a result, a logical-ring transmission path 501 to 508 having a route of #1→#2→#3→#4→#5→#6→#7→#8→#1 can be formed.

This idea, as above described, is effective in any case where a wavelength used for the N×N-AWG has cyclic characteristics or where it does not have cyclic characteristics. If the wavelengths are selected based on a correlation of wavelengths, a transmission path connecting the communication nodes can be formed.

Furthermore, here an example of the transmission path having a route of #1→#2→#3→#4→#5→#6→#7→#8→#1 is shown, however, the order of the transferring communication nodes has no special meaning provided that wavelengths which connect the communication nodes in this manner are selected. For example, even for a route of #2→#5→#6→#8→#7→#4→#3→#1→#2, the wavelengths may be selected and set based on the correlation of wavelength shown in FIG. 2A and FIG. 2B.

On the other hand, in the above example, the case of a transmission path having a route of #1→#2→#3→#4→#5→#6→#7→#8→#1 is shown. However, multiple routes may be simultaneously set depending on the setting of the wavelengths of the optical data signals.

EMBODIMENT 2

Figure 3B:
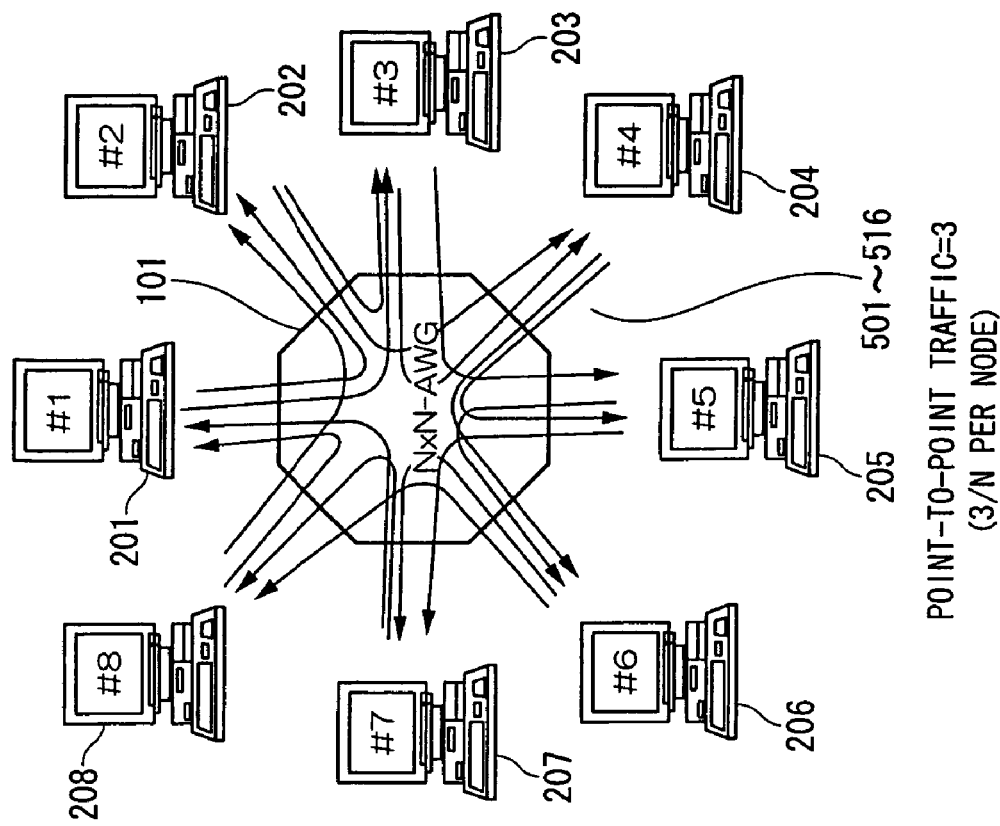
FIG. 3A and FIG. 3B are block diagrams showing a second embodiment of an optical communication system of the present invention.
Figure 3A:
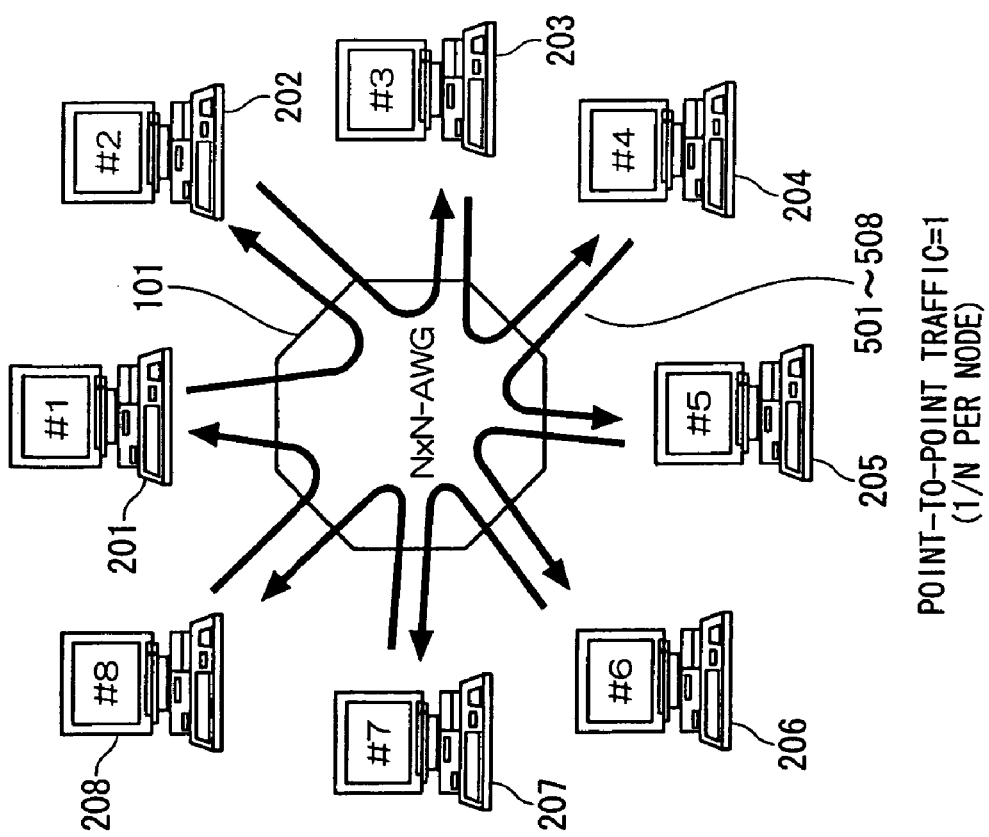

FIG. 3A and FIG. 3B show a second embodiment of an optical communication system of the present invention. FIG. 3A shows a case with one route (same as the case of the first embodiment) and FIG. 3B shows a case with three routes.

That is to say, as shown in FIG. 3B, it becomes possible to treble the overall path by forming a new transmission path having a route of #1→#3→#5→#7→#1 and a route of #2→#4→#6→#8→#2, in addition to the transmission path having a route of #1→#2→#3→#4→#5→#6→#7→#8→#1.

FIG. 4A and FIG. 4B show an example of transmission paths between the input ports and the output ports in N×N-AWG 101 of the second embodiment, FIG. 4A showing an example corresponding to FIG. 3A and FIG. 4B showing an example corresponding to FIG. 3B.

FIG. 5A and FIG. 5B show an example of setting of wavelengths 1301 to 1316 of optical data signals of the respective communication nodes 201 to 208 in the second embodiment shown in FIG. 3B. FIG. 5A shows a case where the used wavelength does not have cyclic characteristics, while FIG. 5B shows a case where the used wavelength has cyclic characteristics. For example, if the wavelengths of the optical data signals of the communication node (#1) 201 are set to $\lambda 2$ and $\lambda 3$, an optical data signal can be transmitted from the communication node (#1) 201 to the communication node (#2) 202 and the communication node (#3) 203.

EMBODIMENT 3

Next is a description of a scheme for fault avoidance in the present optical communication system.

As above-described, in an optical communication system where an optical data signal is transmitted in only one direction, in the case where a fault occurs in a specific node, it becomes aware of the fact that a fault has occurred somewhere on the present optical network when an optical data signal does not return to the communication node which transmitted the optical data signal. However, in this case, since the part where the fault has occurred cannot be determined, then normally there are many cases where some optical control signals for link query between communication nodes are needed.

Figure 6B:
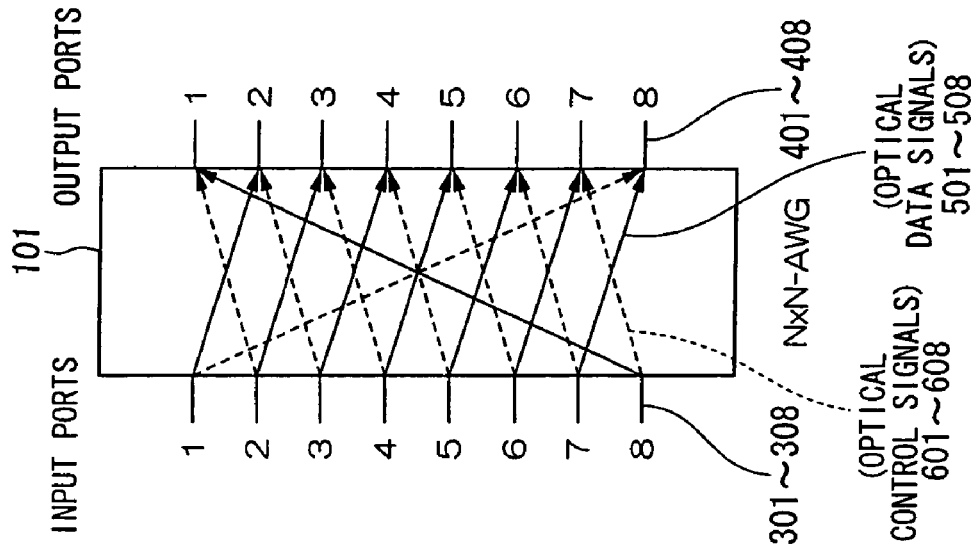
FIG. 6A and FIG. 6B are block diagrams showing a third embodiment of an optical communication system of the present invention.
Figure 6A:
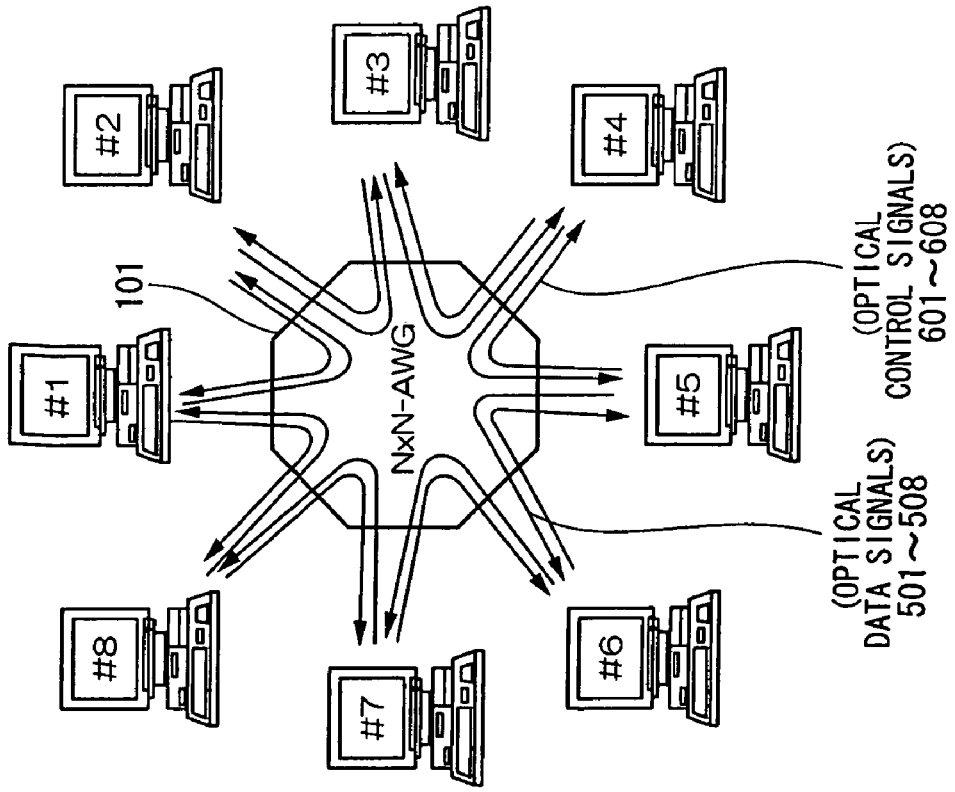

FIG. 6A and FIG. 6B show a third embodiment of an optical communication system of the present invention. FIG. 6A shows an overall configuration, while FIG. 6B shows an example of a transmission path between input ports and output ports in an N×N-AWG.

Here, regarding the communication nodes 201 to 208, by properly selecting and setting the output wavelengths of the optical control signals, a logical-ring transmission path 601 to 608 can be formed in which, in reverse to the optical data signal, an optical control signal transmitted from one communication node returns to the one communication node via the other communication nodes.

FIG. 7A and FIG. 7B show an example of setting of wavelengths of the optical data signals and the optical control signals of the communication nodes in the third embodiment. FIG. 7A shows a case where the used wavelength does not have cyclic characteristics, while FIG. 7B shows a case where the used wavelength has cyclic characteristics.

That is to say, regarding the wavelengths 1301 to 1308 of the optical data signals of the respective communication nodes 201 to 208, by setting similarly to the first embodiment, it becomes possible to form a transmission path 501 to 508 having a route of #1→#2→#3→#4→#5→#6→#7→#8→#1. On the other hand, regarding the wavelengths 1401 to 1408 of the optical control signals of the respective communication nodes 201 to 208, if these are set to $\lambda 8$, $\lambda 2$, $\lambda 4$, $\lambda 6$, $\lambda 8$, $\lambda 10$, $\lambda 12$, and $\lambda 14$ (in the case of FIG. 7A) or to $\lambda 8$, $\lambda 2$, $\lambda 4$, $\lambda 6$, $\lambda 8$, $\lambda 2$, $\lambda 4$, and $\lambda 6$ (in the case of FIG. 7B), a logical-ring transmission path 601 to 608 having a reverse route of #1→#8→#7→#6→→#5→#4→#3→#2→#1 can be formed.

In this case, as described in the first embodiment, the route of the transmission path of the optical data signal is not always limited to #1→#2→#3→#4→#5→#6→#7→#8→#1, and the wavelengths may be selected and set so that this passes through the communication nodes in a desired order, and the wavelengths may be selected and set based on FIG. 7A and FIG. 7B so that also for the optical control signals their transmission path is in a reverse direction.

FIG. 8 shows an example of a configuration related to transfer of optical control signals in the respective communication nodes, together with an N×N-AWG. Here, the example is shown for the case where an optical data signal and an optical control signal are independently transmitted. In the figure, reference symbols 1601 to 1608 denote optical demultiplexers, reference symbols 1701 to 1708 denote optical multiplexers, reference symbols 1901 to 1908 denote optical data signal receivers, reference symbols 2001 to 2008 denote optical control signal receivers, and reference symbols 2301 to 2308 denote optical control signal transmitters.

In the configuration, optical control signals generated by optical control signal transmitters 2301 to 2308 are multiplexed with optical data signals by the optical multiplexers 1701 to 1708, and input to respective input ports of the N×N-AWG 101, and transmitted to output ports corresponding to the respective wavelengths. The optical data signals and optical control signals output from the output ports are demultiplexed by the optical demultiplexers 1601 to 1608 and received by the optical data signal receivers 1901 to 1908 and the optical control signal receivers 2001 to 2008.

Incidentally, as will be clear by referring to the correlation of wavelengths shown in FIG. 7A and FIG. 7B, the wavelengths 1301 to 1308 of the optical data signals transferred between communication nodes, and the wavelengths 1401 to 1408 of the optical control signals of the reverse route transferred between these communication nodes are the same. For example, the wavelength of the optical data signal from the communication node (#1) 201 to the communication node (#2) 202, and the wavelength of the optical control signal from the communication node (#2) 202 to the communication node (#1) 201 are the same wavelength ($\lambda 2$). Consequently, it is also possible to split a part of the optical data signal input to the respective communication nodes, and transmit it as an optical control signal for link query.

FIG. 9 shows another example of a configuration related to transfer of optical control signals in the respective communication nodes, together with an N×N-AWG. Here, the example is shown for the case where a part of the optical data signal is split and transmitted as the optical control signal. In the figure, reference symbols 701 to 708 denote paths for loop-back optical signals, reference symbols 1801 to 1808 denote optical splitters. The other configuration is the same as for the case of FIG. 8.

In the configuration, a part of optical data signals demultiplexed by the optical demultiplexers 1601 to 1608 is split by the optical splitters 1801 to 1808, and this is input to the optical multiplexers 1701 to 1708 via the paths 701 to 708 for loop-back optical signals, to thereby be used as optical control signals. In this case, when a reverse direction optical control signal does not come from the next communication node in the transmission direction of the optical data signal, it can be determined that a fault is in the next communication node or in the optical waveguide between the present communication node and the next communication node.

Furthermore, in the case where a part of the optical data signal is split and made an optical control signal, several methods can be considered.

Figure 10:
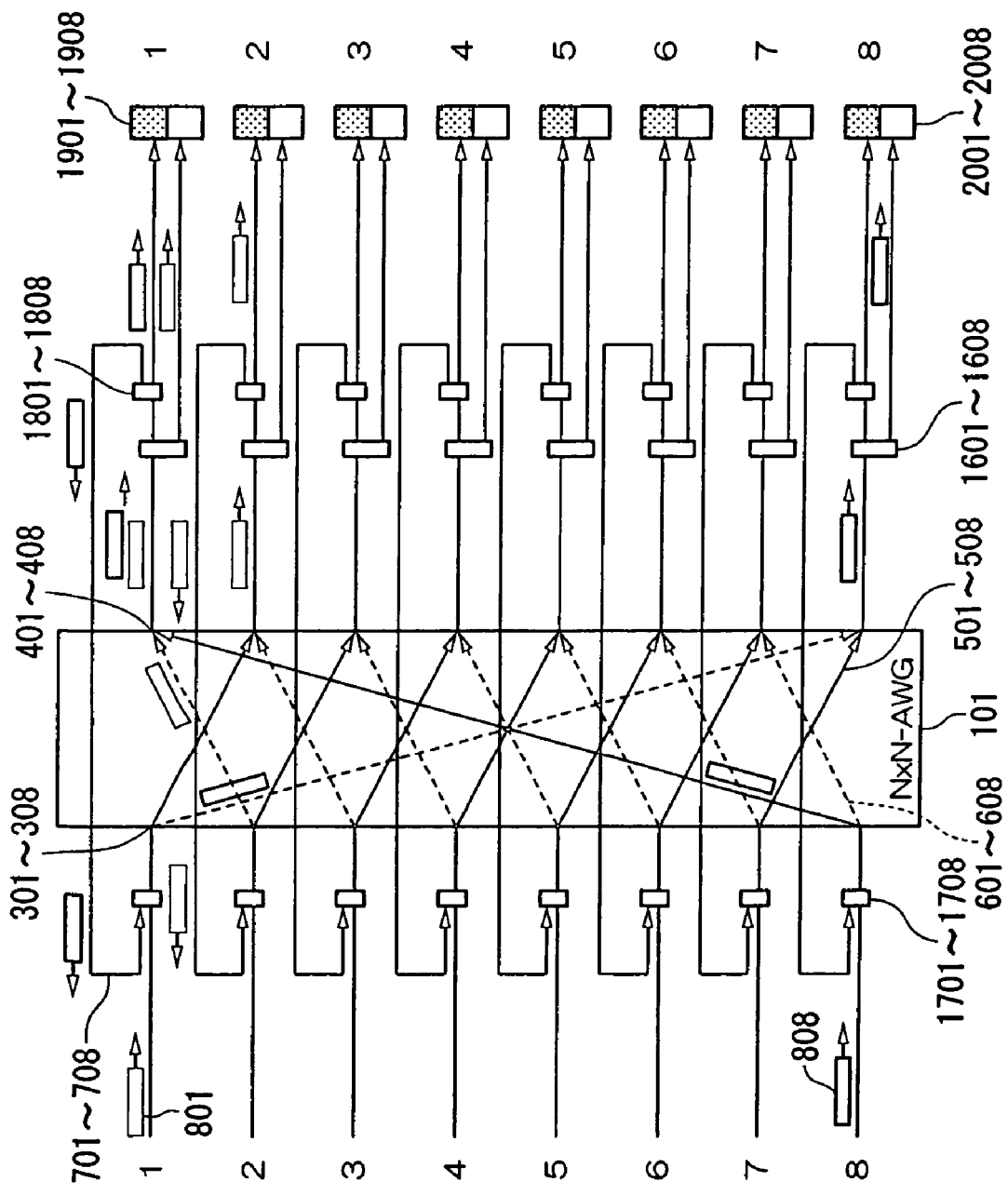
FIG. 10 is an explanatory diagram showing yet another example of a configuration related to transfer of optical control signals in the respective communication nodes in the third embodiment of the present invention.

FIG. 10 shows yet another example of a configuration related to transfer of optical control signals in the respective communication nodes, together with an N×N-AWG. Here, shown an example, as with the example in FIG. 9, of the case where a part of the optical data signal is simply split and returned to the input port.

In this configuration, for example, an optical data signal of a shared memory frame 801 of the communication node (#1) 201 is sent to the communication node (#2) 202, a part of this is returned as an optical control signal by the communication node (#2) 202, then sent to the communication node (#1) 201, and received by the optical control signal receiver 2001. Similarly, an optical data signal of a shared memory frame 808 of the communication node (#8) 208 is sent to the communication node (#1) 201, a part of this is returned as an optical control signal by the communication node (#1) 201, then sent to the communication node (#8) 208, and received by the optical control signal receiver 2008.

Figure 11:
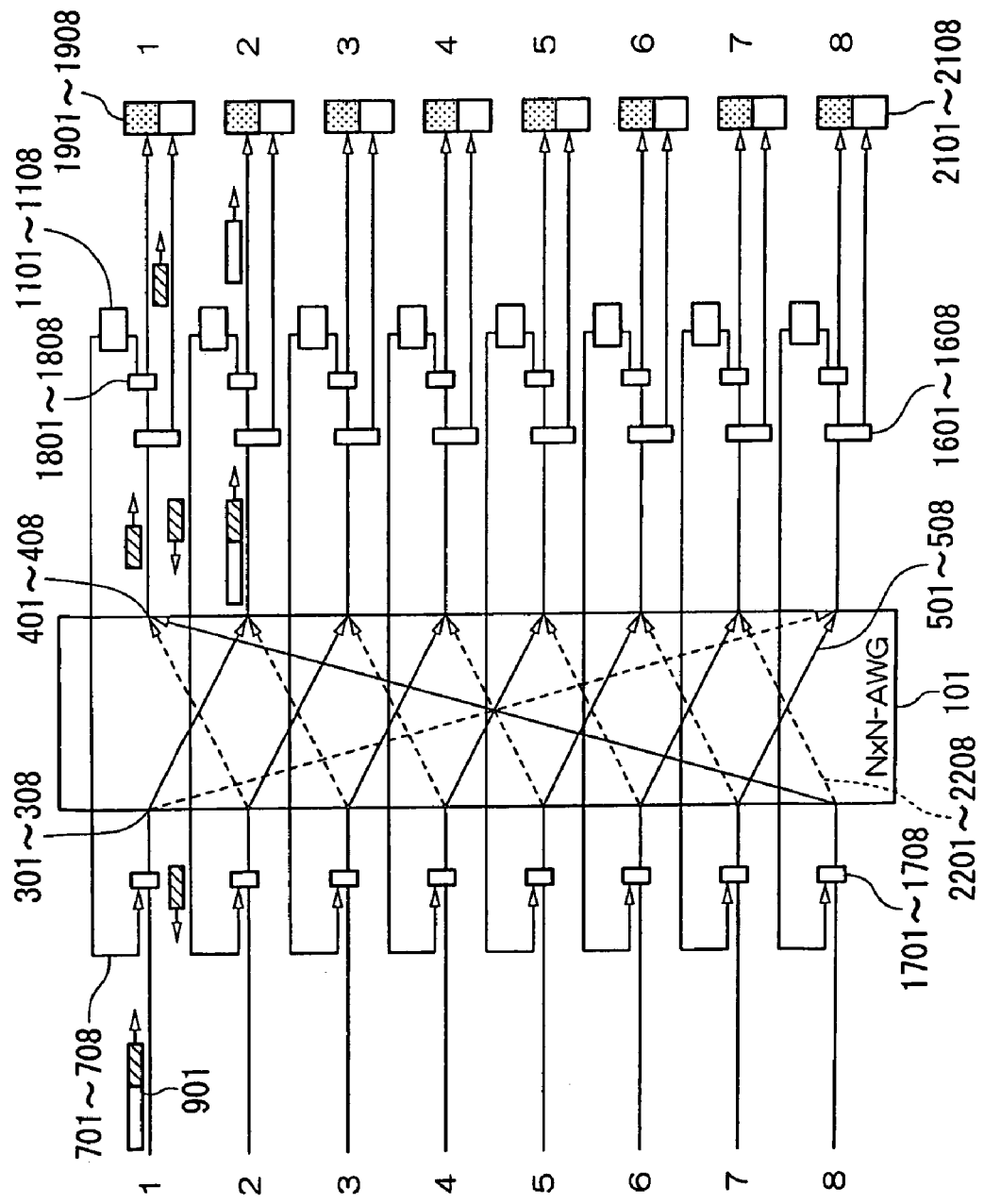
FIG. 11 is an explanatory diagram showing yet another example of a configuration related to transfer of optical control signals in the respective communication nodes in the third embodiment of the present invention.

FIG. 11 shows yet another example of a configuration related to transfer of optical control signals in the respective communication nodes, together with an N×N-AWG. Here, an example is shown of a case where an unmodulated CW (Continuous-Wave) region is previously added to the head of an optical data signal, and this is modulated and transmitted in a reverse direction, reflecting for example a condition of the communication nodes. In the figure, reference symbols 1101 to 1108 denote optical modulators, reference symbols 2101 to 2108 denote reverse optical data signal receivers, and reference symbols 2201 to 2208 denote reverse optical data signals. The other configuration is the same as for the case of FIG. 8.

In the configuration, for example, an optical data signal of a shared memory frame 901 of the communication node (#1) 201 is sent to the communication node (#2) 202, an unmodulated part at the head is split by the optical splitter 1802 of the communication node (#2) 202, modulated by the optical modulator 1102 and returned as a reverse optical data signal 2201 for link query, and sent to the communication node (#1) 201, and received by the reverse optical data signal receiver 2101. In this embodiment, similarly to the examples in FIG. 9 and FIG. 10, when a reverse direction optical signal does not come from the next communication node in the transmission direction of the optical data signal, it can be determined that the fault is in the next communication node or in the optical waveguide between the present communication node and the next communication node, and it is possible to gain information related for example to the condition of the next communication node from the reverse optical data signal.

In any case, in the case where it is determined by using the optical control signal or the reverse optical data signal that there is a fault in a communication node or in an optical waveguide such as an optical fiber, it becomes possible to skip the faulty part.

FIG. 12A and FIG. 12B show a situation in the case where a fault occurs in the aforementioned first embodiment. FIG. 12A shows the overall configuration, while FIG. 12B shows an example of transmission paths between the input ports and the output ports in the N×N-AWG.

If a fault occurs in a communication node or optical waveguide, a communication node prior to the communication node or optical waveguide where the fault occurs in the transmission direction of the optical data signal, becomes unable to receive the optical control signal for link query. In this case, the communication node which becomes unable to receive the optical control signal sets the output wavelength of the optical data signal to a wavelength corresponding to a communication node which skips at least the next communication node on the transmission path of the optical data signal.

For example, in the case where a fault occurs in the communication node (#2) 202, the communication node (#1) 201 uses a wavelength, for example λ3, for transmitting the optical data signal to the next communication node (#3) 203 after the communication node (#2) 202, so that it become possible to easily form a transmission path #1→#3→#4→#5→#6→#7→#8→#1 by a skip path 1201 for at the time of the fault, which skips the faulty communication node (#2) 202.

Figures 13A, 13B:
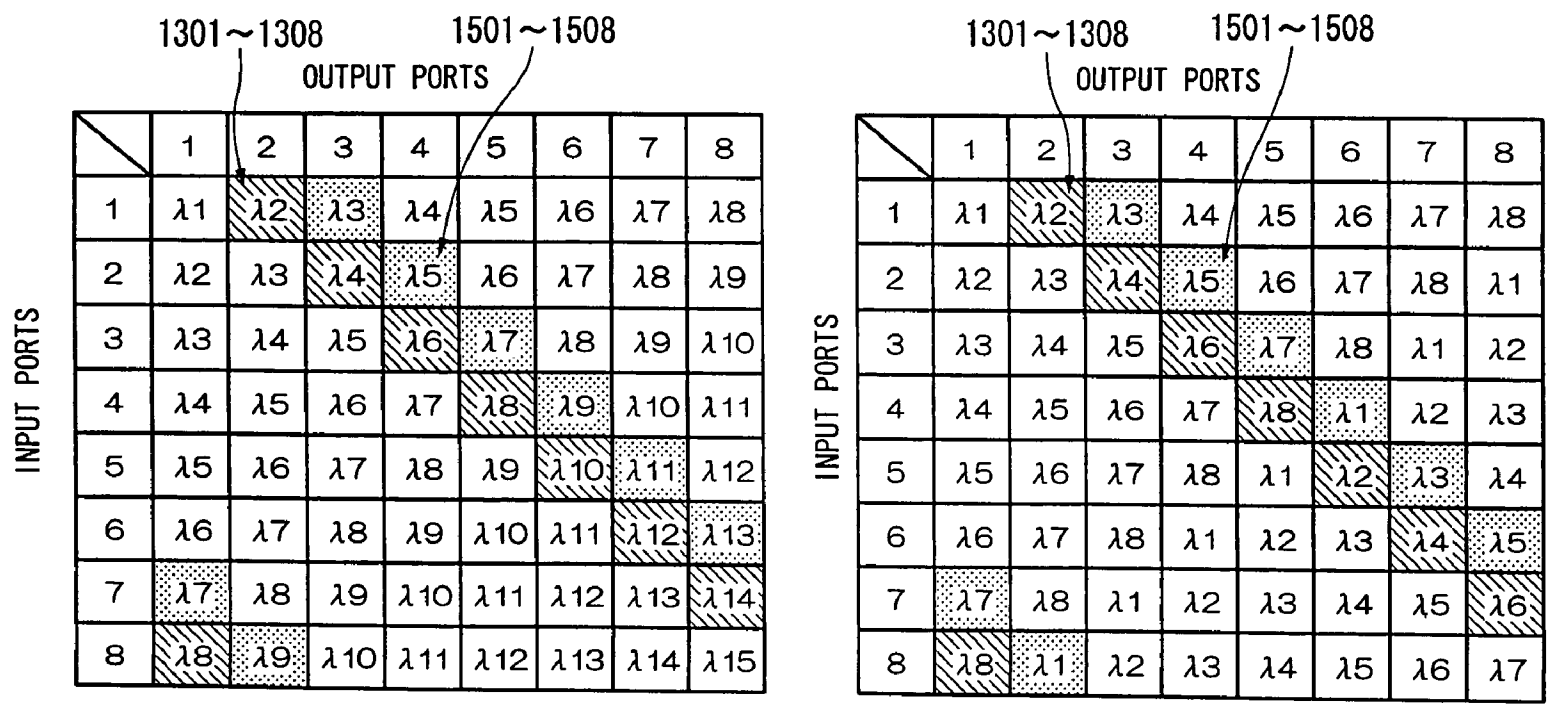

FIG. 13A and FIG. 13B show an example of setting of wavelengths of optical data signals and optical control signals of the communication nodes in the case where a fault occurs. FIG. 13A shows a case where the used wavelength does not have cyclic characteristics, while FIG. 13B shows a case where the used wavelength has cyclic characteristics. In the figures, reference symbols 1501 to 1508 are skip wavelengths for at the time of a fault. However, these wavelengths (λ3, λ5, λ7, λ9, λ11, λ13, λ7, and λ9 in the case of FIG. 13A, and λ3, λ5, λ7, λ1, λ3, λ5, λ7, and λ1 in the case of FIG. 13B) denote wavelengths which are respectively and individually modified in the case where a fault occurs in any one of the communication nodes #2, #3, #4, #5, #6, #7, #8, and #1 (or their optical waveguides) and does not mean simultaneously modifying all the wavelengths when a fault occurs.

In this case, similar to the abovementioned embodiment, the effect is similar in any case where a wavelength used for the N×N-AWG has cyclic characteristics or where it does not have cyclic characteristics. In any case, the wavelength may be set based on FIG. 13A and FIG. 13B.

Figure 14:
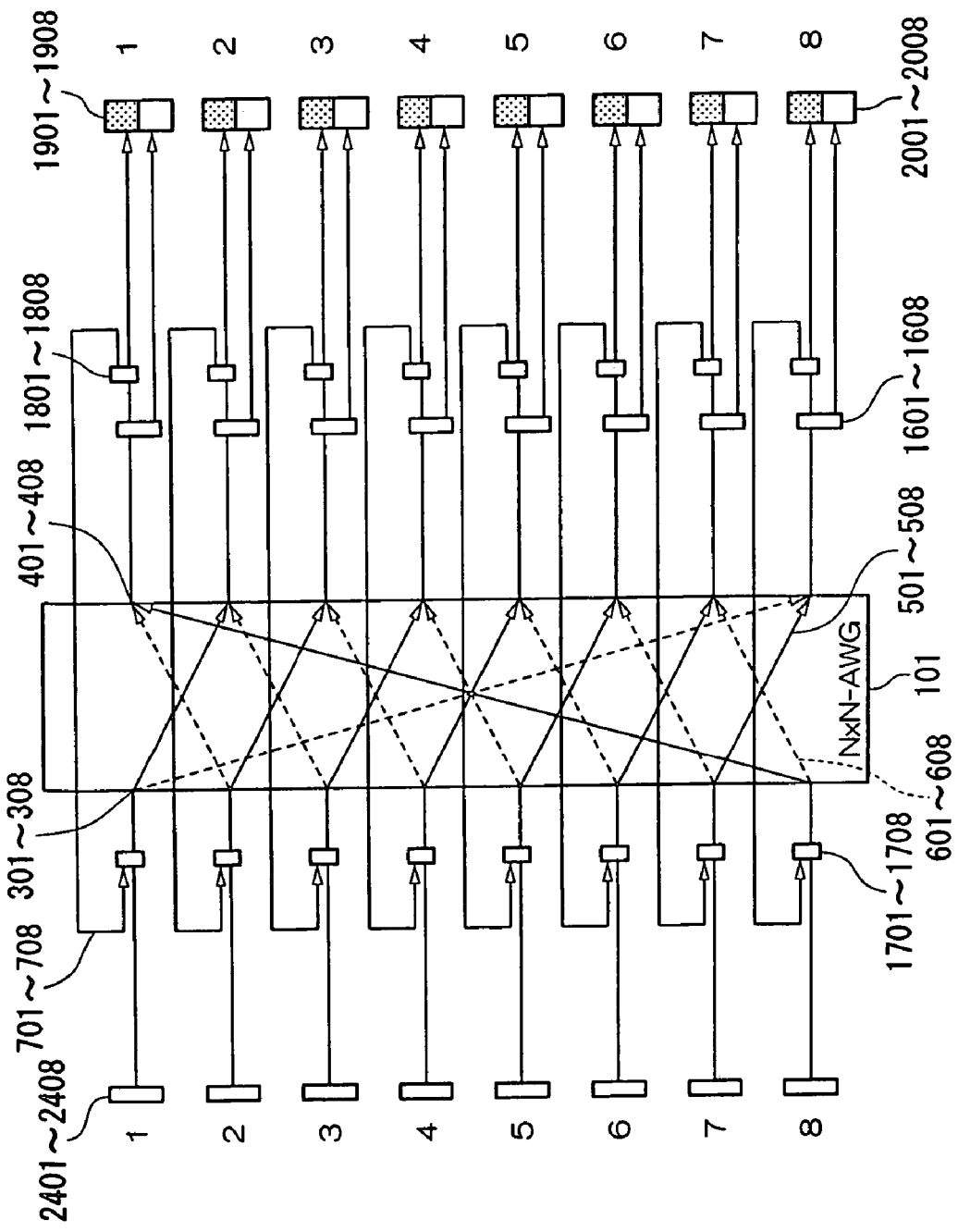
FIG. 14 is an explanatory diagram showing an example of a configuration related to avoidance of faults in the respective communication nodes.

FIG. 14 shows an example of a configuration related to avoidance of faults in the respective communication nodes, together with an N×N-AWG. In the figure, reference symbols 2401 to 2408 denote multi-wavelength optical transmitters. Together with light sources corresponding to wavelengths of the original optical data signals of the respective communication nodes, light sources of wavelengths corresponding to skip wavelengths are provided, for modifying the wavelengths of the optical data signals from the original wavelengths into skip wavelengths when a fault occurs. The other configuration is the same as for the cases in FIG. 9 and FIG. 10.

Figure 15:
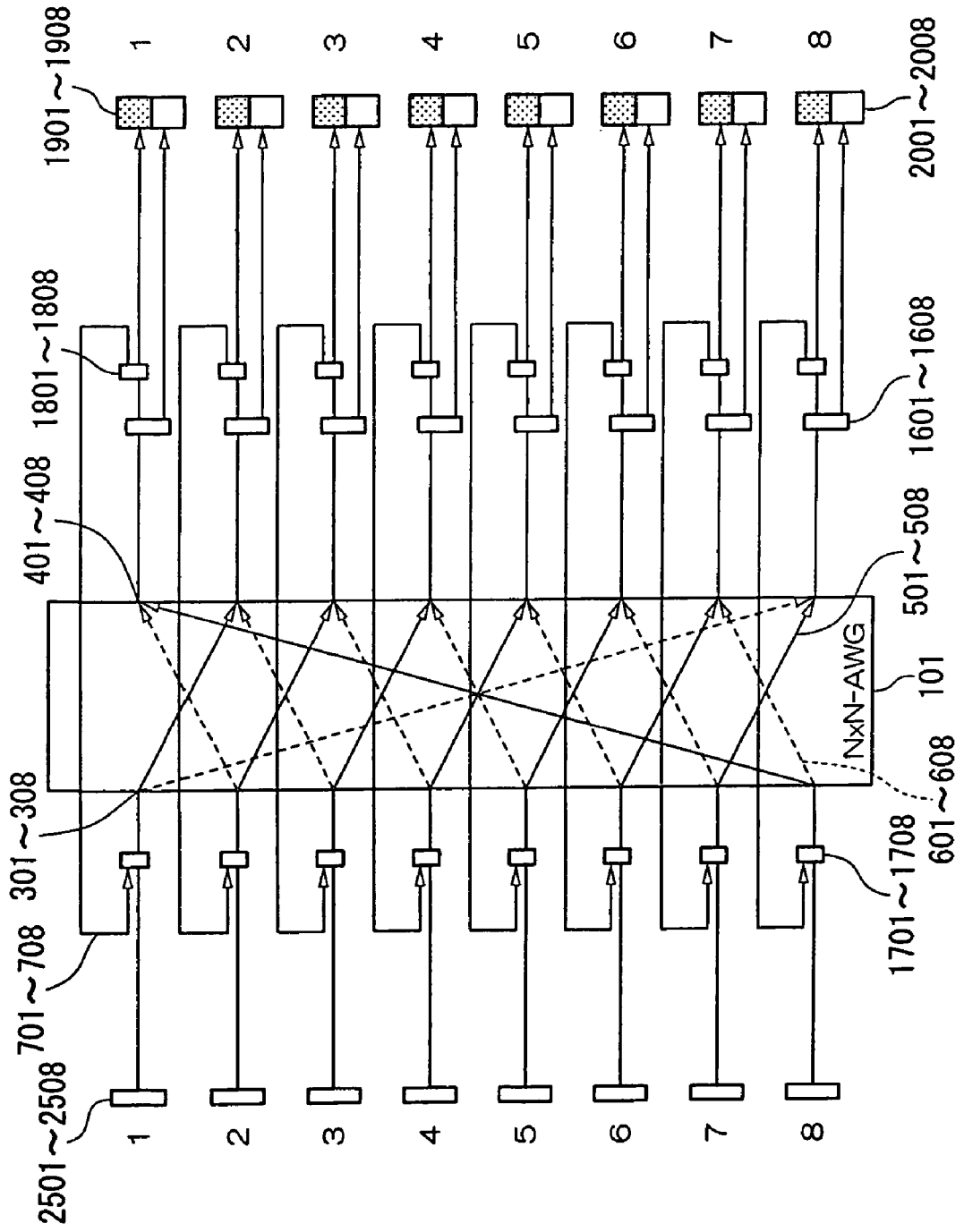
FIG. 15 is an explanatory diagram showing another example of a configuration related to avoidance of faults in the respective communication nodes.

FIG. 15 shows an example of a configuration related to avoidance of faults in the respective communication nodes, together with an N×N-AWG. In the figure, reference symbols 2501 to 2508 denote wavelength-tunable optical transmitters. Light sources for which the respective wavelengths are modified into the wavelengths of the original optical data signals of the respective communication nodes or into the skip wavelengths of the respective communication nodes, are provided for modifying the wavelengths of the optical data signals from the original wavelengths into skip wavelengths when a fault occurs. The other configuration is the same as for the cases in FIG. 9 and FIG. 10.

Furthermore, here an example is shown for skipping the communication node where a fault has occurred (in the example of FIG. 12A and FIG. 12B, the communication node (#2) 202), and for transmitting the optical data signal to the next communication node (in the example of FIG. 12A and FIG. 12B, the communication node (#3) 203). However, when a fault occurs, the transmission path of the overall optical network may be reestablished. For example, it is possible to easily reestablish a transmission path having a route such as #1→#6→#4→#3→#8→#5→#7→#1, which does not include the communication node (#2) 202 where a fault has occurred, by modifying the wavelength of the optical data signal.

Consequently, as mentioned above, in the present optical communication system, it is not necessary to employ a redundant configuration of the optical waveguide such as with an optical fiber, so that it becomes possible to easily constitute a stable optical communication system having superior resistance to faults. Moreover, the number of the communication nodes which can be contained in the network is limited depending on the number of ports of the AWG, and can realize a large-scale network of 100 nodes or more.

EMBODIMENT 4

Figure 16:
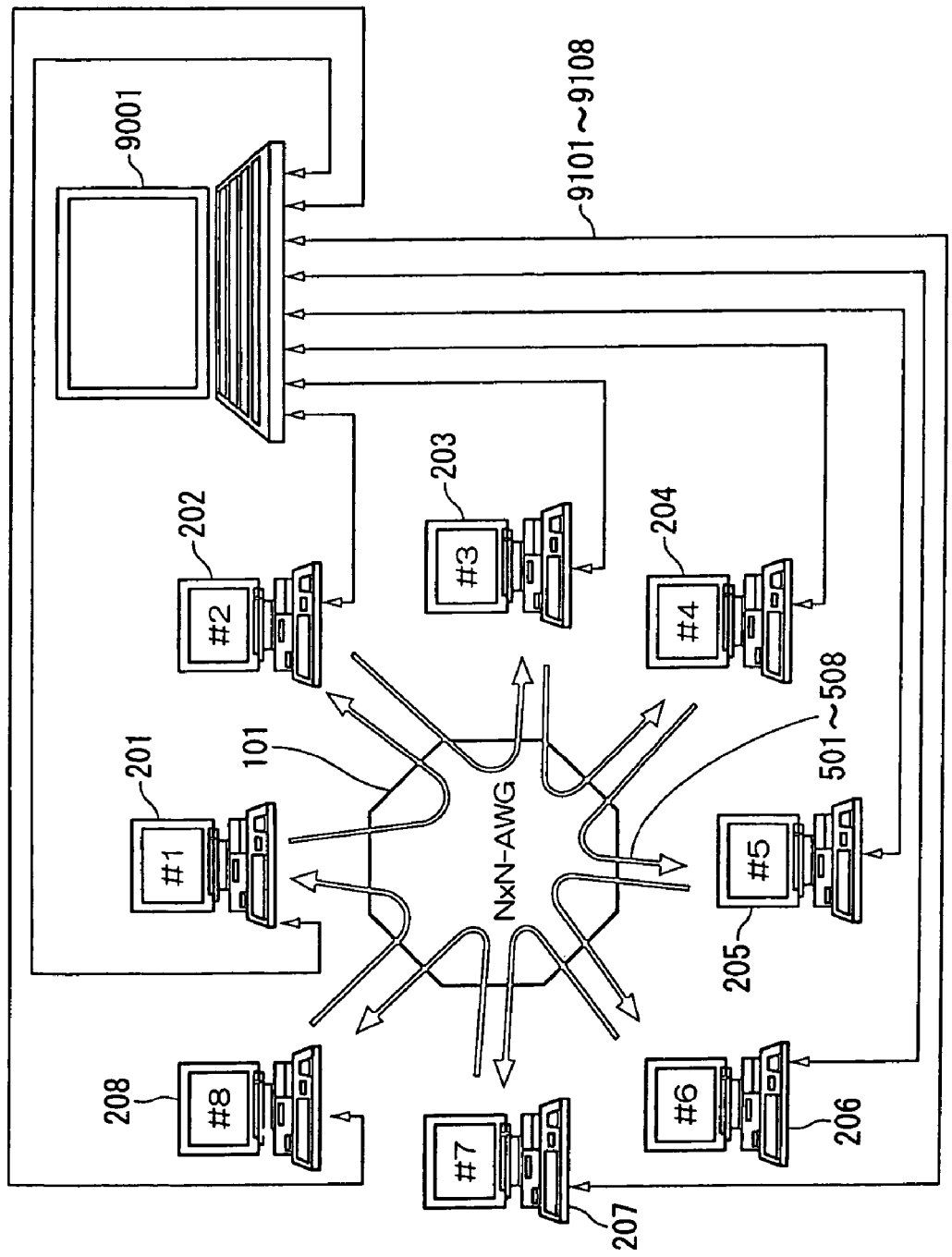
FIG. 16 is a block diagram showing a fourth embodiment of an optical communication system of the present invention.

FIG. 16 shows a fourth embodiment of an optical communication system of the present invention. Here, an example is shown where a management device for monitoring and controlling the condition of the respective communication nodes, is provided in the first embodiment.

That is to say, in the figure, reference symbol 9001 denotes a management device, which controls transfer conditions for the optical data signals of the respective communication nodes 201 to 208, joining and separation to the network, grouping, and avoidance when a fault occurs, by transferring management signals 9101 to 9108 between the respective communication nodes 201 to 208.

Figure 17:
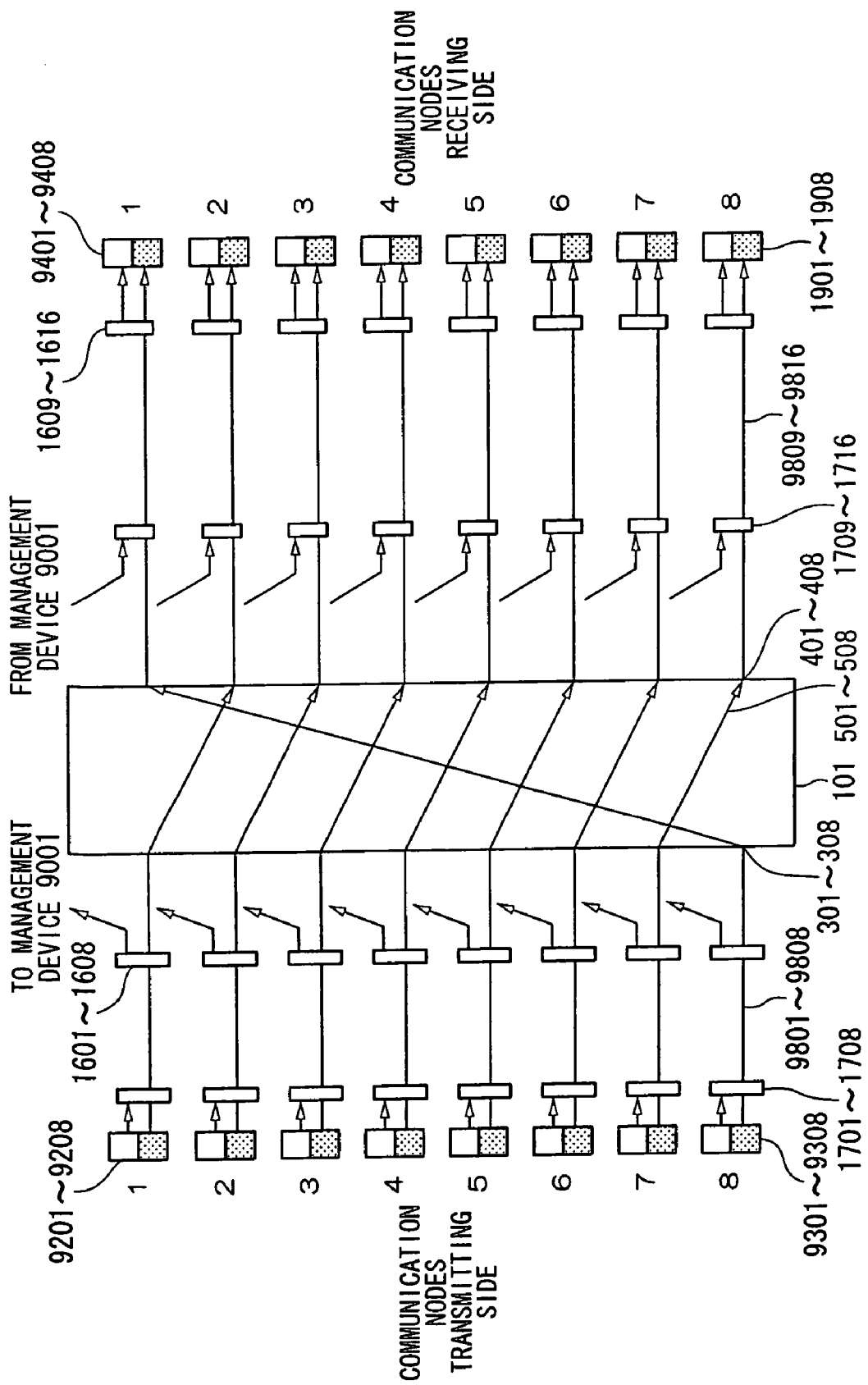
FIG. 17 is an explanatory diagram showing an example of a configuration related to the transfer of management signals in the respective communication nodes.

FIG. 17 shows an example of a configuration related to transfer of management signals in the respective communication nodes, together with an N×N-AWG. Here, an example is shown where a management signal is transferred by an optical signal having a different wavelength to that of an optical data signal (for example, the wavelength of the optical data signal is 1.5 μm, while the wavelength of the optical control signal is 1.3 μm). In the figure, reference symbols 1609 to 1616 denote optical demultiplexers, reference symbols 1709 to 1716 denote optical multiplexers, reference symbols 9201 to 9208 denote optical management signal transmitters, reference symbols 9301 to 9308 denote optical data signal transmitters comprising the above-described multi-wavelength optical transmitters or wavelength-tunable optical transmitters, reference symbols 9401 to 9408 denote optical management signal receivers, and 9801 to 9816 denote optical waveguides.

In the configuration, optical management signals of 1.3 μm wavelength generated in the optical management signal transmitters 9201 to 9208, and optical data signals of 1.5 μm wavelength generated in the optical data signal transmitters 9301 to 9308 are multiplexed by the optical multiplexers 1701 to 1708 and transmitted via the optical waveguides 9801 to 9808. The optical management signals and the optical data signals which are multiplexed and transmitted, are demultiplexed by the optical demultiplexers 1601 to 1608 prior to input to N×N-AWG 101, and the optical management signals are input to the management device 9001 and the optical data signals are input to the respective input ports of the N×N-AWG 101.

Based on control information of the communication nodes included in the optical management signals, the management device 9001 transmits management information for controlling joining and separation to the network of the communication nodes, grouping, and avoidance control when a fault occurs, towards the respective communication nodes as optical management signals of 1.3 μg/m wavelength. These optical management signals are again multiplexed with the optical data signals of 1.5 μm wavelength from the N×N-AWG 101 by the optical multiplexers 1709 to 1716, transmitted to the respective communication nodes via the optical waveguide 9809 to 9816, demultiplexed by the optical demultiplexers 1609 to 1616, and received by the optical data signal receivers 1901 to 1908 and the optical management signals receivers 9401 to 9408.

For the wavelength of the optical management signals, any wavelength may be selected as long as it can be multiplexed with and demultiplexed from the optical data signals or the optical data signals and the optical control signals.

Figure 18:
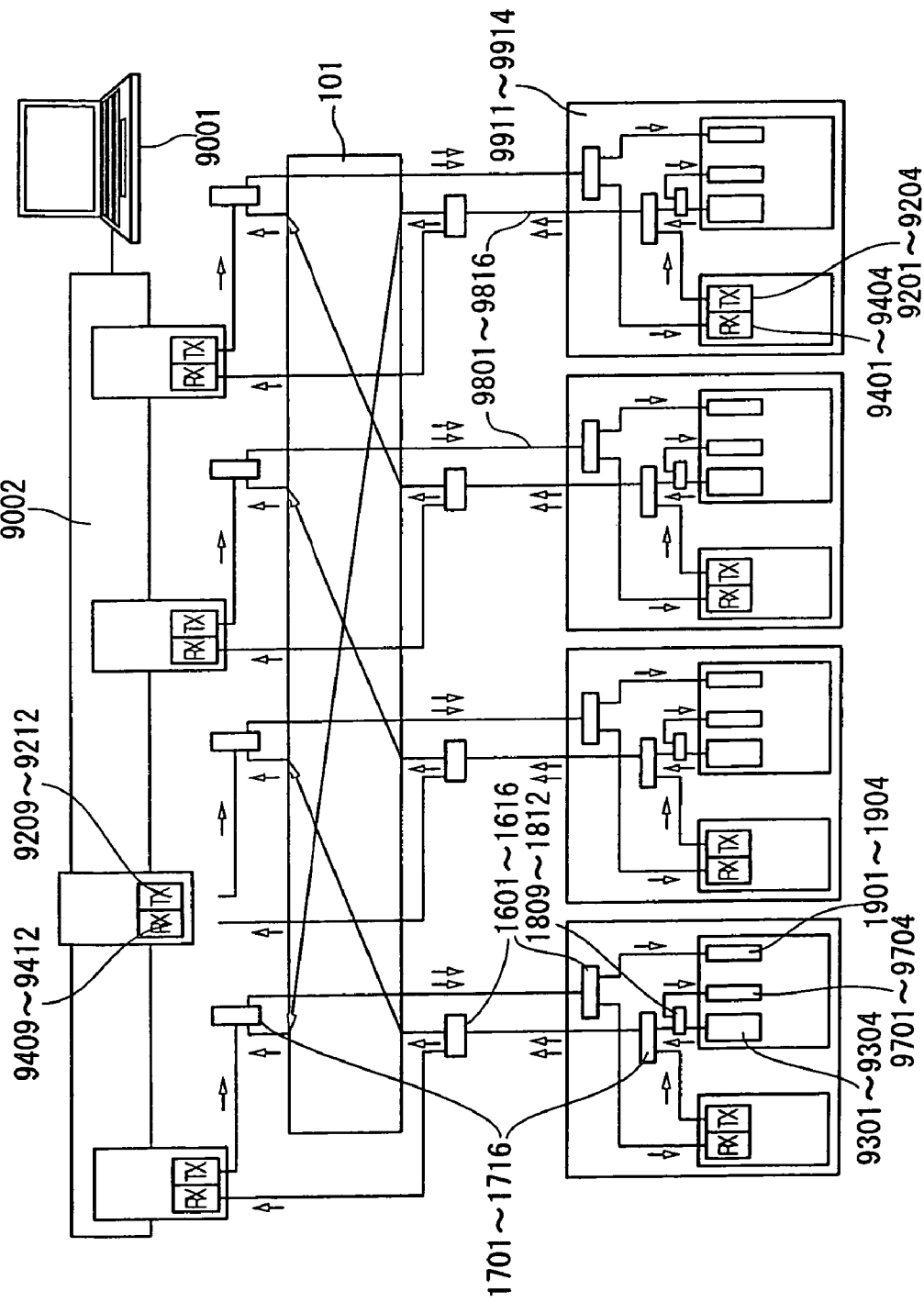
FIG. 18 is an explanatory diagram showing in detail a configuration related to the transfer of management signals in the respective communication nodes and management devices.

FIG. 18 shows details of a configuration related to transfer of optical management signals in the respective communication nodes and management device, together with an N×N-AWG. Here, the configuration for the case where N=n=4 is shown. In the figure, reference symbols 1809 to 1812 denote optical splitters, reference symbol 9002 denotes a transfer device for the management device, reference symbols 9209 to 9212 denote optical management signal transmitters of the management device, reference symbols 9409 to 9412 denote optical management signal receivers of the management device, reference symbols 9701 to 9704 denote optical monitoring signal receivers, and reference symbols 9911 to 9914 denote transferring sections of the communication nodes.

In the configuration, in the transfer device for the management device 9002, optical management signals are transferred by the optical management signal transmitters of the management devices 9209 to 9212 and the optical management signal receivers of the management devices 9409 to 9412 which are similar to the transferring sections of the communication nodes 9911 to 9914. Furthermore, in the transferring sections 9911 to 9914 of the respective communication nodes, the optical splitters 1809 to 1812 split a part of the optical data signals generated by the optical data signal transmitters 9301 to 9304, and the optical monitoring signal receivers 9701 to 9704 receive the split optical data signals and monitor the condition thereof.

Figure 19:
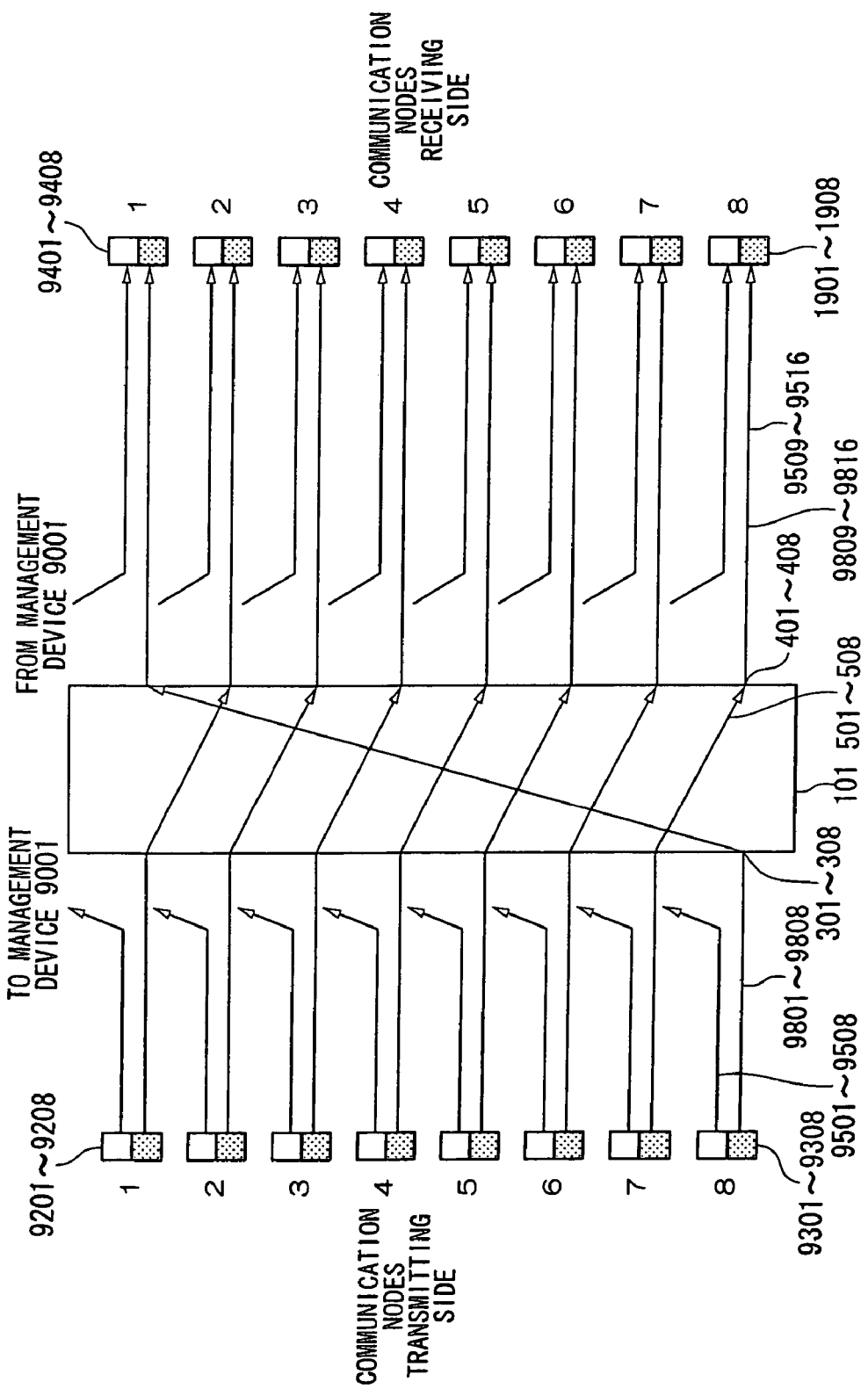
FIG. 19 is an explanatory diagram showing another example of a configuration related to the transfer of management signals in the respective communication nodes.

FIG. 19 shows another example of a configuration related to the transfer of management signals in the respective communication nodes, together with an N×N-AWG. Here, an example is shown where a management signal is transferred via an optical waveguide which is different from that for an optical data signal. In the figure, reference symbols 9501 to 9516 denote optical waveguides which are different from the optical waveguides 9801 to 9816.

In the configuration, optical management signals generated in the optical management signal transmitters 9201 to 9208 are transmitted via the optical waveguides 9501 to 9508, separate to the optical data signals, and input to the management device 9001. Similarly, the optical management signals sent towards the respective communication nodes from the management device 9001 are transmitted to the respective communication nodes via the optical waveguides 9509 to 9516, and received by the optical management signal receivers 9401 to 9408.

At this time, the wavelength of the optical management signals from the optical management signal transmitters 9201 to 9208 may be the same as the wavelength of optical data signals from the optical data signal transmitters 9301 to 9308. Moreover, the management signals may be transferred as electric signals via electric signal lines, instead of via the optical waveguides.

Furthermore, in the fourth embodiment, an example is shown where the management device is provided in the first embodiment, however needless to say the management device may be provided in the second or third embodiment.

Moreover, in the description to here, the case is shown where memories to be shared, and transmitters and receivers of various signals (or, in addition, optical multiplexers, optical demultiplexers, optical splitters and the like) are provided in the respective communication nodes. However, a construction is possible where only these parts of the respective communication nodes are arranged at one place, for example concentrated near the N×N-AWG, and these and the respective communication nodes are connected by another transmission path for optical signals or electric signals, so as to exchange various signals.

EMBODIMENT 5

Regarding the first to fourth embodiments, only one N×N-AWG which functions as a wavelength path establishment circuit is used. On the other hand, regarding the optical communication system related to the embodiments described hereunder, multiple wavelength path establishment circuits are used.

Figure 20:
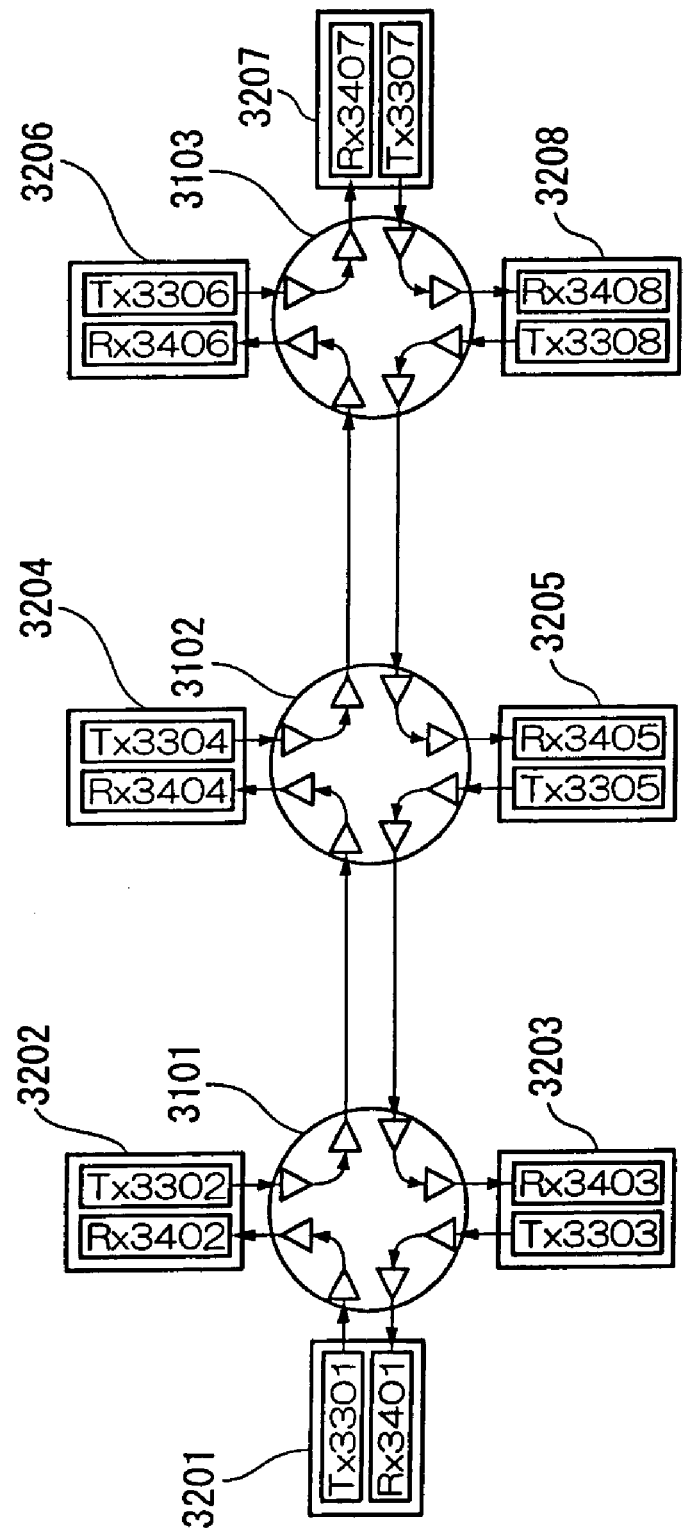
FIG. 20 is a block diagram showing a fifth embodiment of the present invention, for describing an optical communication system which uses wavelength path establishment circuits.

FIG. 20 describes an optical communication system which accommodates eight communication nodes by using three path establishment circuits having four pairs of optical input ports and optical output ports. In FIG. 20, reference symbols 3101 to 3103 denote path establishment circuits, reference symbols 3201 to 3208 denote communication nodes, reference symbols 3301 to 3308 denote respectively output circuits of the communication nodes 3201 to 3208, and reference symbols 3401 to 3408 denote respectively input circuits of the communication nodes 3201 to 3208.

The communication nodes 3201 to 3208 each have one output circuit and input circuit pair, and there is provided one signal input port and signal output port pair for one output circuit and input circuit pair, and the optical signals to the signal input port are received, and then, after communication processing, the optical signals are output from the signal output port. The path establishment circuits 3101 to 3103 have multiple optical input port and optical output port pairs, and are set so as to output to the predetermined optical output ports corresponding to the wavelengths of the optical signals input from the respective optical input ports. As a path establishment circuit, an arrayed waveguide grating (AWG) or the like can be applied.

In FIG. 20, the path establishment circuit 3101, the path establishment circuit 3102, and the path establishment circuit 3103 are cascade connected through these optical input port and optical output port pairs. The communication nodes 3201, 3202, and 3203 are accommodated in the path establishment circuit 3101, the communication nodes 3204 and 3205 are accommodated in the path establishment circuit 3102, and the communication nodes 3206, 3207, and 3208 are accommodated in the path establishment circuit 3103. As shown in FIG. 20, in the respective path establishment circuits, the wavelengths of the optical signals from the signal output ports of the respective communication nodes are arranged so that paths are established from the optical input ports to the adjacent optical output ports.

An optical signal from the output circuit 3301 of the communication node 3201 is input to the input circuit 3402 of the communication node 3202 and received, and after communication processing by the communication node 3202, the optical signal is output from the output circuit 3302.

An optical signal from the output circuit 3302 of the communication node 3202 is input, via the optical output port of the path establishment circuit 3101 and the optical input port of the path establishment circuit 3102, to the input circuit 3404 of the communication node 3204 and received, and after communication processing by the communication node 3204, the optical signal is output from the output circuit 3304.

An optical signal from the output circuit 3304 of the communication node 3204 is input, via the optical output port of the path establishment circuit 3102 and the optical input port of path establishment circuit 3103, to the input circuit 3406 of the communication node 3206 and received, and after communication processing by the communication node 3206, the optical signal is output from the output circuit 3306.

An optical signal from the output circuit 3306 of the communication node 3206 is input to the input circuit 3407 of the communication node 3207 and received, and after communication processing by the communication node 3207, the optical signal is output from the output circuit 3307.

An optical signal from the output circuit 3307 of the communication node 3207 is input to the input circuit 3408 of the communication node 3208 and received, and after communication processing by the communication node 3208, the optical signal is output from the output circuit 3308.

An optical signal from the output circuit 3308 of the communication node 3208 is input, via the optical output port of path establishment circuit 3103 and the optical input port of path establishment circuit 3102, to the input circuit 3405 of the communication node 3205 and received, and after communication processing by the communication node 3205, the optical signal is output from the output circuit 3305.

An optical signal from the output circuit 3305 of the communication node 3205 is input, via the optical output port of path establishment circuit 3102 and the optical input port of path establishment circuit 3101, to the input circuit 3403 of the communication node 3203 and received, and after communication processing by the communication node 3203, the optical signal is output from the output circuit 3303.

An optical signal from the output circuit 3303 of the communication node 3203 is input to the input circuit 3401 of the communication node 3201 and received, and then communication processed by the communication node 3201.

In this manner, the connection of the communication nodes circulates sequentially from the communication node 3201, the communication node 3202, the communication node 3204, the communication node 3206, the communication node 3207, the communication node 3208, the communication node 3205, the communication node 3203, to the communication node 3201, so that the connection of these communication nodes forms a logical ring topology.

Here, in a path establishment circuit, as shown in FIG. 20, a method is described for arranging wavelengths of the optical signals from the signal output ports of the respective communication nodes, so that a path is established from the optical input port to the adjacent optical output port.

Figures 21, 22:
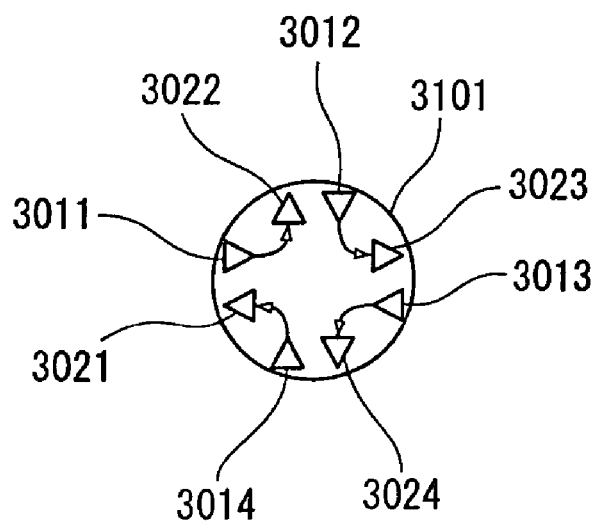
FIG. 21 is an explanatory diagram showing a configuration of a path establishment circuit applicable to the fifth embodiment of the present invention.
FIG. 22 is an explanatory diagram showing wavelength characteristics of a path establishment circuit applicable to the fifth embodiment of the present invention.

FIG. 21 shows a configuration of a path establishment circuit. In FIG. 21, reference symbol 3101 denotes a path establishment circuit, reference symbols 3011, 3012, 3013, and 3014 denote optical input ports, and reference symbols 3021, 3022, 3023 and 3024 denote optical output ports. FIG. 22 and FIG. 23 show wavelength-routing characteristics which determine from which optical output port an optical signal input from an optical input port is to be output corresponding to the wavelength thereof. FIG. 22 shows a case without cyclic-wavelength characteristics, while FIG. 23 shows a case with cyclic-wavelength characteristics. Such characteristics can be realized by configuring with an arrayed waveguide grating. In a path establishment circuit with cyclic-wavelength characteristics, the number of wavelengths used in the respective communication nodes may be only a few.

For example, in an arrayed waveguide grating without cyclic-wavelength characteristics, as shown by the hatched area in FIG. 22, if an optical signal of λ2 wavelength is input from the optical input port 3011, it is output to the optical output port 3022. If an optical signal of λ4 wavelength is input from the optical input port 3012, it is output to the optical output port 3023. If an optical signal of λ6 wavelength is input from the optical input port 3013, it is output to the optical output port 3024. If an optical signal of λ4 wavelength is input from the optical input port 3014, it is output to the optical output port 3021.

For example, in the arrayed waveguide grating with cyclic-wavelength characteristics, as shown by the hatched area in FIG. 23, if an optical signal of λ2 wavelength is input from the optical input port 3011, it is output to the optical output port 3022. If an optical signal of λ4 wavelength is input from the optical input port 3012, it is output to the optical output port 3023. If an optical signal of λ2 wavelength is input from the optical input port 3013, it is output to the optical output port 3024. If an optical signal of λ4 wavelength is input from the optical input port 3014, it is output to the optical output port 3021.

If the wavelengths of communication nodes to be connected to the path establishment circuit 3101 in FIG. 21 are arranged such as in FIG. 22 or FIG. 23, it becomes possible in the path establishment circuit 3101 to establish the paths shown by the arrowheads in FIG. 21.

For example, in the case of a path establishment circuit without cyclic-wavelength characteristics, in FIG. 20, if the wavelength of an optical signal from the output circuit 3301 of the communication node 3201 is set to λ2, the wavelength of an optical signal from the output circuit 3302 of the communication node 3202 is set to λ4, the wavelength of an optical signal from the output circuit 3305 of the communication node 3205 is set to λ6, and the wavelength of an optical signal from the output circuit 3303 of the communication node 3203 is set to λ4, it becomes possible to establish the path shown in the path establishment circuit 3101 in FIG. 20.

For example, in the case of a path establishment circuit with cyclic-wavelength characteristics, in FIG. 20, if the wavelength of an optical signal from the output circuit 3301 of the communication node 3201 is set to λ2, the wavelength of an optical signal from the output circuit 3302 of the communication node 3202 is set to λ4, the wavelength of an optical signal from the output circuit 3305 of the communication node 3205 is set to λ2, and the wavelength of an optical signal from the output circuit 3303 of the communication node 3203 is set to λ4, it becomes possible to establish the path shown in the path establishment circuit 3101 in FIG. 20.

Similarly, in the other path establishment circuits, by making the wavelengths of optical signals from the signal output ports of the communication nodes to a predetermined arrangement, it is possible to establish paths such as shown in the path establishment circuit 3101 in FIG. 20.

As described in the present embodiment, by making the wavelengths of optical signals from the signal output ports of the communication nodes to the predetermined arrangement, it becomes possible to make the connection of the communication nodes via path establishment circuits, into a logical ring topology. Furthermore, either an arrayed waveguide grating with cyclic-wavelength characteristics or an arrayed waveguide grating without cyclic-wavelength characteristics is applicable to such path establishment circuits.

In this embodiment, the optical input port and optical output port pairs of the path establishment circuit were described as four pairs, however, the optical input port and optical output port pairs of the path establishment circuit are not limited to four pairs and may be multiple pairs. Also, in the above embodiment, the path establishment circuits have the same number of optical input port and optical output port pairs, however, the respective path establishment circuits may have different numbers of optical input port and optical output port pairs.

EMBODIMENT 6

Figure 24:
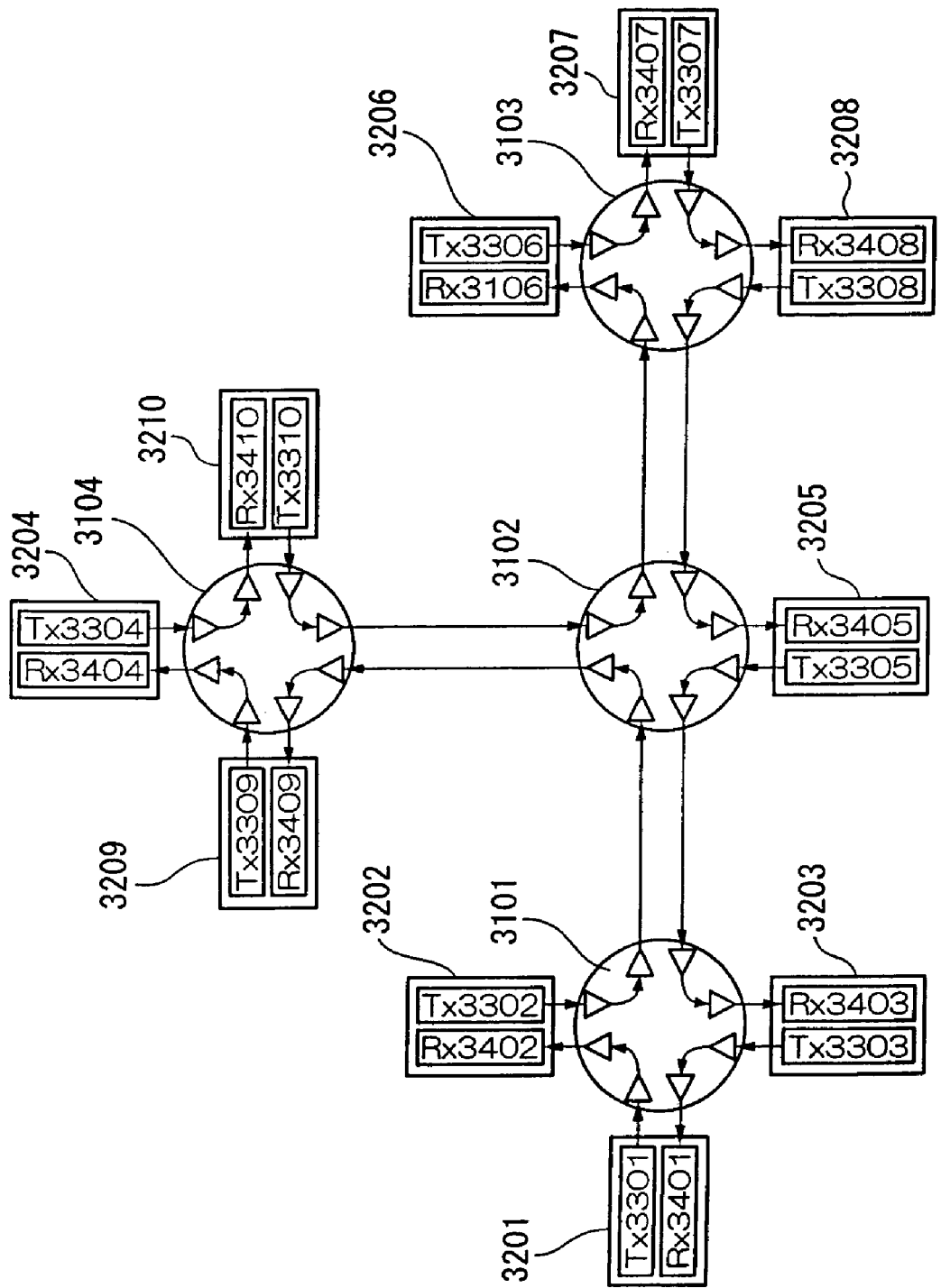
FIG. 24 is a block diagram showing a sixth embodiment of the present invention, for describing an optical communication system which uses wavelength path establishment circuits.

This embodiment describes an increase in communication nodes connected by an optical communication system. In FIG. 24, reference symbols 3101 to 3104 denote path establishment circuits, reference symbols 3201 to 3210 denote communication nodes, reference symbols 3301 to 3310 denote respectively output circuits of the communication nodes 3201 to 3210, and reference symbols 3401 to 3410 denote respectively input circuits of the communication nodes 3201 to 3210.

The communication nodes 3201 to 3210 each have one output circuit and input circuit pair, and there is provided one signal input port and signal output port pair for one output circuit and input circuit pair, and the optical signals input to the signal input port are received, and then, after communication processing, the optical signals are output from the signal output port. The path establishment circuits 3101 to 3104 have multiple optical input port and optical output port pairs, and are set so as to output to the predetermined optical output ports corresponding to the wavelengths of the optical signals input from the respective optical input ports. As a path establishment circuit, an arrayed waveguide grating (AWG) or the like can be applied.

In FIG. 24, the path establishment circuit 3101, the path establishment circuit 3102, the path establishment circuit 3103, and the path establishment circuit 3104 are connected through these optical input port and optical output port pairs. The communication nodes 3201, 3202, and 3203 are accommodated in the path establishment circuit 3101, the communication node 3205 is accommodated in the path establishment circuit 3102, the communication nodes 3206, 3207, and 3208 are accommodated in the path establishment circuit 3103, and the communication nodes 3204, 3209 and 3210 are accommodated in the path establishment circuit 3104. As shown in FIG. 24, in the path establishment circuits 3101 to 3104, the wavelengths of the optical signals from the signal output ports of the respective communication nodes are arranged so that paths are established from the optical input ports to the adjacent optical output ports.

An optical signal from the output circuit 3301 of the communication node 3201 is input to the input circuit 3402 of the communication node 3202 and received, and after communication processing by the communication node 3202, the optical signal is output from the output circuit 3302. If this connection is repeated, the connection of the communication nodes circulates sequentially from the communication node 3201, the communication node 3202, the communication node 3209, the communication node 3204, the communication node 3210, the communication node 3206, the communication node 3207, the communication node 3208, the communication node 3205, the communication node 3203, to the communication node 3201, so that the connection of these communication nodes forms a logical ring topology.

As described in the present embodiment, even if the communication nodes are increased, it becomes possible make the connection of the communication nodes via a path establishment circuit, into a logical ring topology.

Here, the number of path establishment circuits for connection is four. However, the number of path establishment circuits for connection is not limited to the number described in the embodiment, and has no upper limit.

EMBODIMENT 7

Figure 25:
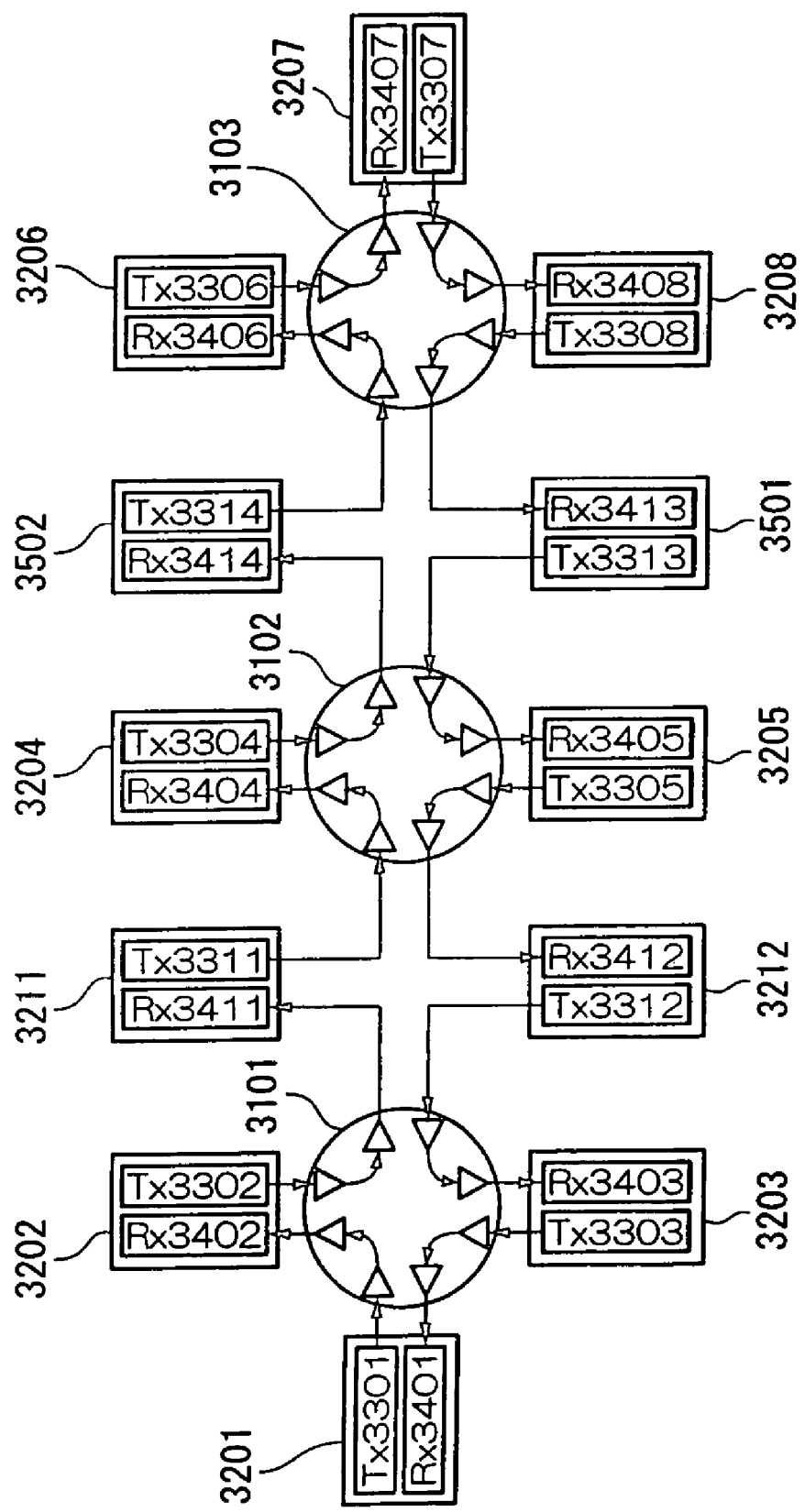
FIG. 25 is a block diagram showing a seventh embodiment of the present invention, for describing a configuration of an optical communication system which uses communication nodes and repeaters for connection of a path establishment circuit.

In this embodiment, a description is given of an optical communication system for connecting an optical output port of a path establishment circuit and an optical input port of another path establishment circuit via communication nodes. In FIG. 25, reference symbols 3101 to 3103 denote path establishment circuits, reference symbols 3201 to 3208, 3211, and 3211 denote communication nodes, reference symbols 3301 to 3308, 3311, and 3312 denote respectively output circuits for the communication nodes 3201 to 3208, 3211, and 3212, reference symbols 3401 to 3408, 3411, and 3412 denote respectively input circuits for the communication nodes 3201 to 3208, 3211, and 3212, reference symbols 3501 and 3502 denote repeaters, reference symbols 3313 and 3314 denote output circuits of the repeaters 3501 and 3502, and reference symbols 3413 and 3414 denote input circuits of the repeaters 3501 and 3502.

The communication nodes 3201 to 3208, 3211, and 3212 each have one output circuit and input circuit pair, and there is provided one signal input port and signal output port pair for one output circuit and input circuit pair, and the optical signals to the signal input port are received, and then, after communication processing, the optical signals are output from the signal output port. The repeaters 3501 and 3502 have one signal input port and signal output port pair, and the optical signals to the signal input port are received, and then the optical signals are output from the signal output port. The path establishment circuits 3101 to 3103 have multiple optical input port and optical output port pairs, and are set so as to output to the predetermined optical output ports corresponding to the wavelengths of the optical signals input from the respective optical input ports. As a path establishment circuit, an arrayed waveguide grating (AWG) or the like can be applied.

An optical signal from the output circuit 3301 of the communication node 3201 is input to the input circuit 3402 of the communication node 3202 and received, and after communication processing by the communication node 3202, the optical signal is output from the output circuit 3302.

An optical signal from the output circuit 3302 of the communication node 3202 is input to the input circuit 3411 of the communication node 3211 and received, and after communication processing by the communication node 3211, the optical signal is output from the output circuit 3311.

An optical signal from the output circuit 3311 of the communication node 3211 is input to the input circuit 3404 of the communication node 3204 and received, and after communication processing by the communication node 3204, the optical signal is output from the output circuit 3304.

If this connection is repeated, the communication nodes are serially connected. In repeaters along the way, there is no communication processing and the input optical signals are received and output with predetermined wavelengths. The connection of the communication nodes circulates sequentially from the communication node 3201, the communication node 3202, the communication node 3211, the communication node 3204, the communication node 3206, the communication node 3207, the communication node 3208, the communication node 3205, the communication node 3212, the communication node 3203, to the communication node 3201, so that the connection configuration of these communication nodes forms a logical ring topology.

As described for this embodiment, if the communication nodes are used for connecting path establishment circuits, it becomes possible to increase the communication nodes. Furthermore, even if the communication nodes are increased, it becomes possible to make the connection of the communication nodes via a path establishment circuit, into a logical ring topology. By using the communication nodes for connecting the path establishment circuits, it become possible to arrange the wavelengths of optical signals input to a path establishment circuit without being affected by communication nodes connected only to another path establishment circuit.

Moreover, in these optical communication systems, even if the communication nodes are replaced by repeaters, it is possible to make the connection of the communication nodes into a logical ring topology.

EMBODIMENT 8

In this embodiment, there is described an optical communication system for modifying path establishment, by modifying the wavelength of the optical signal from the output circuit of the communication node.

Figures 26, 27:
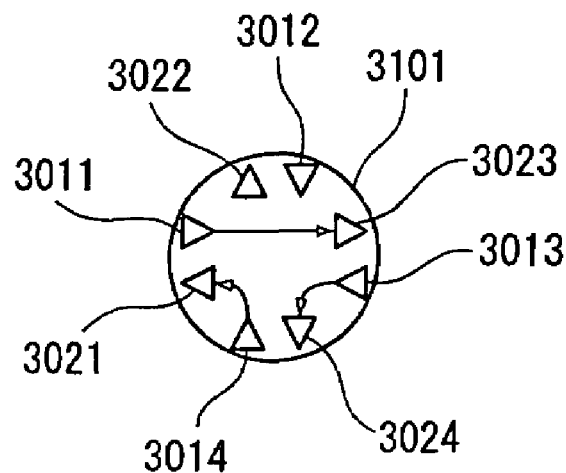
FIG. 26 is an explanatory diagram showing a configuration of a path establishment circuit applicable to an eighth embodiment of the present invention.
FIG. 27 is an explanatory diagram showing wavelength characteristics of a path establishment circuit applicable to the eighth embodiment of the present invention.

FIG. 26 shows a configuration of a path establishment circuit. In FIG. 26, reference symbol 3101 denotes a path establishment circuit, reference symbols 3011, 3012, 3013 and 3014 denote optical input ports, and reference symbols 3021, 3022, 3023 and 3024 denote optical output ports. FIG. 27 and FIG. 28 show wavelength-routing characteristics which determine from which optical output port an optical signal input from an optical input port is to be output corresponding to the wavelength thereof. FIG. 27 shows a case without cyclic-wavelength characteristics, while FIG. 28 shows a case with cyclic-wavelength characteristics. Such characteristic can be realized by configuring with an arrayed waveguide grating. In a path establishment circuit with cyclic-wavelength characteristics, the number of wavelengths used in the respective communication nodes may be only a few.

For example, in an arrayed waveguide grating without cyclic-wavelength characteristics, as shown by hatched area in FIG. 27, if an optical signal of $\lambda 3$ wavelength is input from the optical input port 3011, it is output to the optical output port 3023. If an optical signal of $\lambda 6$ wavelength is input from an optical input port 3013, it is output to the optical output port 3024. If an optical signal of $\lambda 4$ wavelength is input from the optical input port 3014, it is output to the optical output port 3021.

For example, in an arrayed waveguide grating with cyclic-wavelength characteristics, as shown by the hatched area in FIG. 28, if an optical signal of $\lambda 3$ wavelength is input from the optical input port 3011, it is output to the optical output port 3023. If an optical signal of $\lambda 2$ wavelength is input from the optical input port 3013, it is output to the optical output port 3024. If an optical signal of $\lambda 4$ wavelength is input from the optical input port 3014, it is output to the optical output port 3021.

If the wavelength of a communication node connected to the path establishment circuit 3101 in FIG. 26 is arranged such as in FIG. 27 or FIG. 28, it becomes possible in the path establishment circuit 3101 to establish the paths shown by the arrowheads in FIG. 26. In this manner, if the wavelength of the optical signal input to the optical input port of the path establishment circuit is modified, optional path establishment becomes feasible in the path establishment circuit.

If the optical light sources of the communication nodes are made wavelength-tunable optical light sources, and the wavelengths of the optical signals input to the optical input ports of the path establishment circuit are modified, then optional path establishment in the path establishment circuit is possible. If modification of the path establishment is possible, then in an optical communication system, it becomes possible to separate the faulty part and to connect normal communication nodes so as to maintain the connection of a logical ring topology in the case where a fault occurs in a communication node or in an optical waveguide such as an optical fiber connecting the communication nodes or the like, and to configure another ring network.

Figure 29:
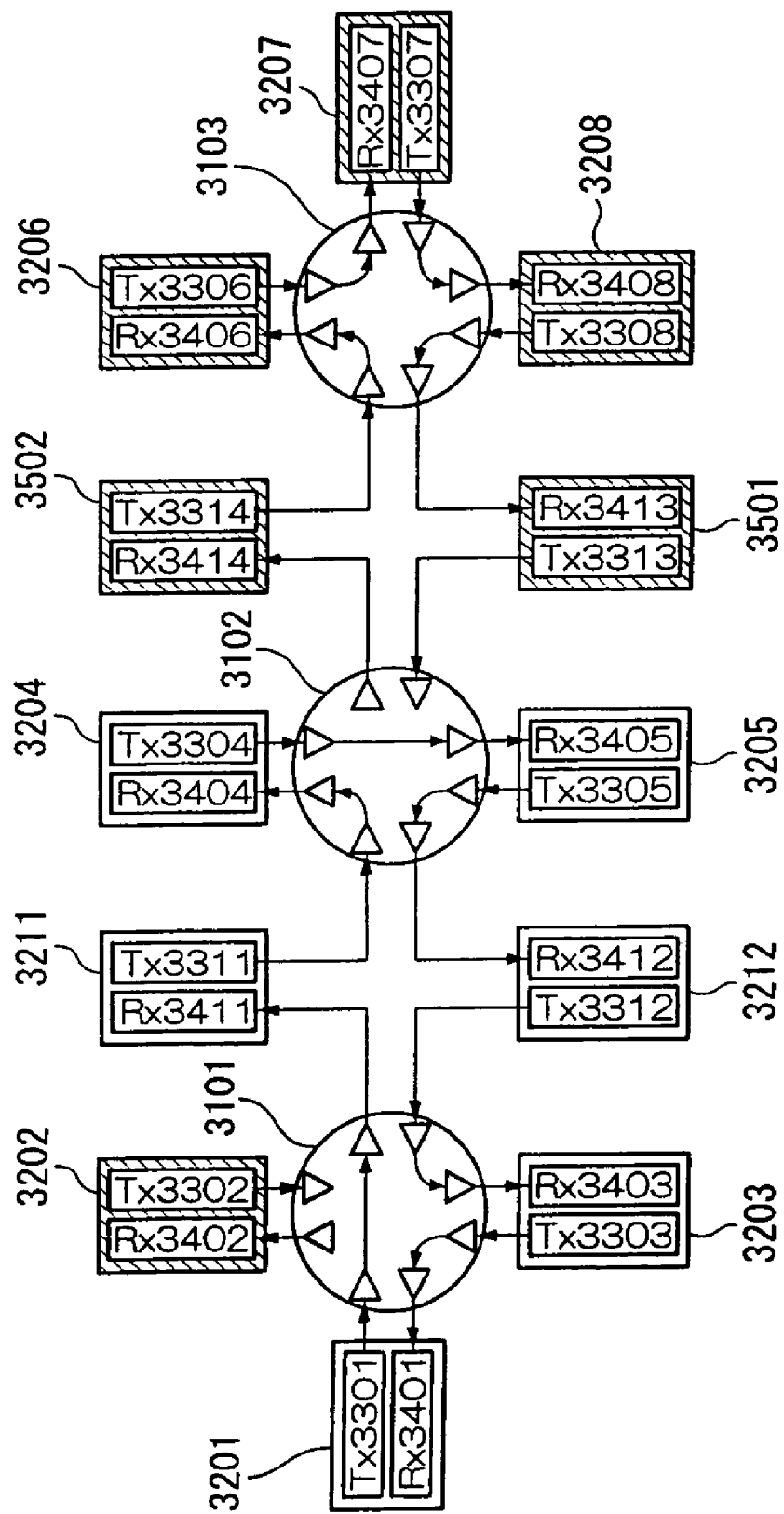
FIG. 29 is a block diagram showing the eighth embodiment of the present invention, for describing an optical communication system which uses wavelength path establishment circuits.

FIG. 29 describes an example for configuring another ring network, by modifying the path establishment. In FIG. 29, reference symbols 3101 to 3103 denote path establishment circuits, reference symbols 3201 to 3208, 3211, and 3211 denote communication nodes, reference symbols 3301 to 3308, 3311, and 3312 denote respectively output circuits of the communication nodes 3201 to 3208, 3211, and 3212, reference symbols 3401 to 3408, 3411, and 3412 denote respectively input circuits of the communication nodes 3201 to 3208, 3211, and 3212, reference symbols 3501 and 3502 denote repeaters, reference symbols 3313 and 3314 denote output circuits of the repeaters 3501 and 3502, and reference symbols 3413 and 3414 denote input circuits of the repeaters 3501 and 3502.

The communication nodes 3201 to 3208, 3211, and 3211 each have one output circuit and input circuit pair, and there is provided one signal output port and signal input port pair for one output circuit and input circuit pair, and the optical signals to the signal input port are received, and then, after communication processing, the optical signals are output from the signal output port. The repeaters 3501 and 3502 have one signal output port and signal input port pair, and the optical signals to the signal input port are received, and then the optical signals are output from the signal output port. The path establishment circuits 3101 to 3103 have multiple optical input port and optical output port pairs, and are set so as to output to the predetermined optical output ports corresponding to the wavelengths of the optical signals input from the respective optical input ports. As a path establishment circuit, an arrayed waveguide grating (AWG) or the like can be applied.

For example, in the case of a path establishment circuit without cyclic-wavelength characteristics, in FIG. 29, if the wavelength of an optical signal from the output circuit 3301 of the communication node 3201 is set to $\lambda 3$, the wavelength of an optical signal from the output circuit 3312 of the communication node 3212 is set to $\lambda 6$, and the wavelength of an optical signal from the output circuit 3303 of the communication node 3203 is set to $\lambda 4$, it becomes possible to establish the path shown in the path establishment circuit 3101 in FIG. 29.

For example, in the case of a path establishment circuit with cyclic-wavelength characteristics, in FIG. 29, if the wavelength of an optical signal from the output circuit 3301 of the communication node 3201 is set to $\lambda 3$, the wavelength of an optical signal from the output circuit 3312 of the communication node 3212 is set to $\lambda 2$, and the wavelength of an optical signal from the output circuit 3303 of the communication node 3203 is set to $\lambda 4$, it becomes possible to establish the path shown in the path establishment circuit 3101 in FIG. 29.

If a fault occurs in the communication nodes 3202, 3206, 3207 and 3208, a logical ring topology is not formed, so that it become impossible to communicate between the communication nodes. Therefore, in order to separate the communication nodes where a fault has occurred, as shown in FIG. 29, the path establishment of the path establishment circuit is modified. Modifying the path establishment is conducted by modifying the wavelength of the optical signal input to the optical input port of the path establishment circuit, that is, the wavelength of the optical signal output from the output circuit of the communication node.

If the path establishment is modified in the path establishment circuits 3101, 3102 of FIG. 29, the connection of the communication nodes circulates sequentially from the communication node 3201, the communication node 3211, the communication node 3204, the communication node 3205, the communication node 3212, the communication node 3203, to communication node 3201, so that the connection of these communication nodes forms a logical ring topology.

As described in the present embodiment, by modifying the wavelength of the optical signal output from the output circuit of the communication node, it becomes possible to modify the path establishment of the path establishment circuit, separate the communication node with a fault, and restore communication by forming the connection of the communication nodes into a logical ring topology.

Furthermore, the number of communication nodes connected to the path establishment circuit is not limited to the number described in the embodiment. Moreover, there is no need to connect the communication nodes to all the optical input port and output port pairs of the path establishment circuit.

EMBODIMENT 9

Figure 30:
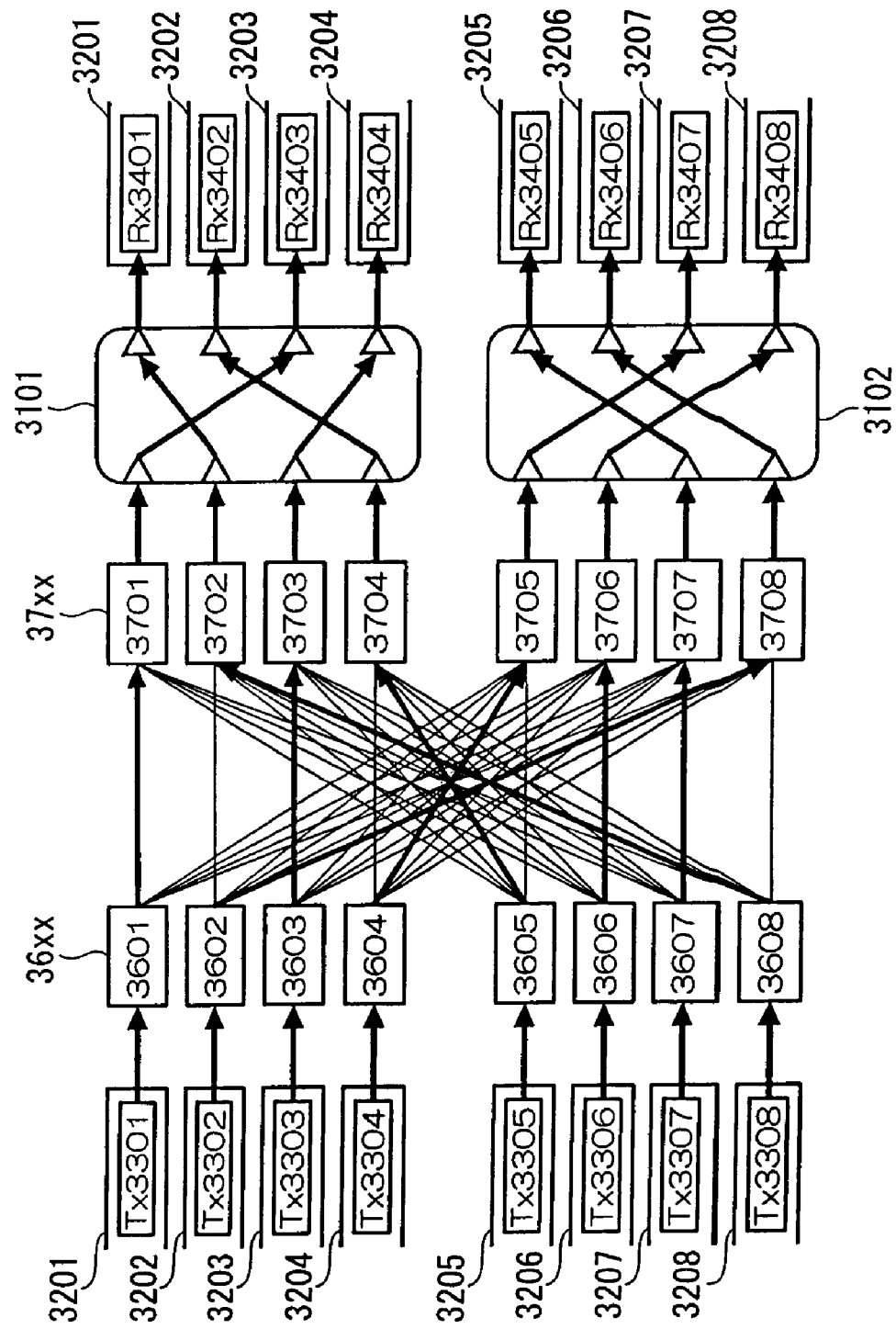
FIG. 30 is a block diagram showing a ninth embodiment of the present invention, for describing an optical communication system which uses wavelength path establishment circuits and optical switches.

FIG. 30 describes an optical communication system for accommodating eight communication nodes. In FIG. 30, reference symbols 3101 to 3103 denote path establishment circuits, reference symbols 3201 to 3208 denote communication nodes, reference symbols 3301 to 3308 denote respectively output circuits of the communication nodes 3201 to 3208, reference symbols 3401 to 3408 denote respectively input circuits of the communication nodes 3201 to 3208, reference symbols 3601 to 3608 denote optical switches, and reference symbols 3701 to 3708 denote optical multiplexers.

The communication nodes 3201 to 3208 each have one output circuit and input circuit pair, and there is provided one signal output port and signal input port pair for one output circuit and input circuit pair, and the optical signals to the signal input port are received, and then, after communication processing, the optical signals are output from the signal output port. In FIG. 30, the communication nodes are separated to the left and right. However, an input circuit and the corresponding output circuit are contained in the same communication node. The path establishment circuits 3101 and 3102 have multiple optical input port and optical output port pairs, and are set for outputting to the predetermined optical output ports corresponding to the wavelengths of the optical signals input from the respective optical input ports. As the path establishment circuit, an arrayed waveguide grating (AWG) or the like can be applied. The optical switches 3601 to 3608 set the direction for outputting an optical signal from an optical input port to any of the multiple optical output ports. The optical multiplexers 3701 to 3708 multiplex the optical signals from the multiple optical input ports and output to one optical output port.

In FIG. 30, four communication nodes, four optical switches, four optical multiplexers, and one path establishment circuit constitute one unit, and an optical communication system comprises two units.

In FIG. 30, the signal output ports that are provided for the output circuits 3301 to 3308 of the communication nodes 3201 to 3208, are connected to the optical input ports of the corresponding optical switches 3601 to 3608. The optical output ports of the optical switches 3601 to 3608 are connected to the optical input ports of the corresponding optical multiplexers 3701 to 3708 and to the optical input ports of all the optical multiplexers 3701 to 3708 of the other units. The optical output ports of the optical multiplexers 3701 to 3708 are connected to the corresponding optical input ports of the path establishment circuits 3101 and 3102. The optical output ports of the path establishment circuits 3101 and 3102 are connected to the signal input ports provided for the input circuits 3401 to 3408 of the corresponding communication nodes 3201 to 3208.

In FIG. 30, the thin lines denote directions in which connections are possible by the optical switches, and the thick lines denote directions in which connections are actually made. To set the directions of the optical switches 3601 to 3608, and the paths of the paths establishment circuits 3101 and 3102 as shown in FIG. 30, the directions of the optical switches 3601 to 3608 are controlled, and the wavelengths of the optical signals from the signal output ports of the respective communication nodes are arranged.

An optical signal from the output circuit 3301 of the communication node 3201 is input via the optical switch 3601, the optical multiplexer 3701 and the path establishment circuit 3101, to the input circuit 3403 of the communication node 3203 and received, and after communication processing by the communication node 3203, the optical signal is output from the output circuit 3303.

An optical signal from the output circuit 3303 of the communication node 3203 is input via the optical switch 3603, the optical multiplexer 3703 and the path establishment circuit 3103, to the input circuit 3404 of the communication node 3204 and received, and after communication processing by the communication node 3204, the optical signal is output from the output circuit 3304.

An optical signal from the output circuit 3304 of the communication node 3204 is input via the optical switch 3604, the optical multiplexer 3705 and the path establishment circuit 3102 to the input circuit 3407 of the communication node 3207 and received, and after communication processing by the communication node 3207, the optical signal is output from the output circuit 3307.

An optical signal from the output circuit 3307 of the communication node 3207 is input via the optical switch 3607, the optical multiplexer 3707 and the path establishment circuit 3102 to the input circuit 3405 of the communication node 3205 and received, and after communication processing by the communication node 3205, the optical signal is output from the output circuit 3305.

An optical signal from the output circuit 3305 of the communication node 3205 is input via the optical switch 3605, the optical multiplexer 3704 and the path establishment circuit 3101 to the input circuit 3402 of the communication node 3202 and received, and after communication processing by the communication node 3202, the optical signal is output from the output circuit 3302.

An optical signal from the output circuit 3302 of the communication node 3202 is input via the optical switch 3602, the optical multiplexer 3708 and the path establishment circuit 3102 to the input circuit 3406 of the communication node 3206 and received, and after communication processing by the communication node 3206, the optical signal is output from the output circuit 3306.

An optical signal from the output circuit 3306 of the communication node 3206 is input via the optical switch 3606, the optical multiplexer 3706 and the path establishment circuit 3102 to the input circuit 3408 of the communication node 3208 and received, and after communication processing by the communication node 3208, the optical signal is output from the output circuit 3308.

An optical signal from the output circuit 3308 of the communication node 3208 is input via the optical switch 3608, the optical multiplexer 3702 and the path establishment circuit 3101 to the input circuit 3401 of the communication node 3201 and received, and communication processing is carried out by the communication node 3201.

Figure 31:
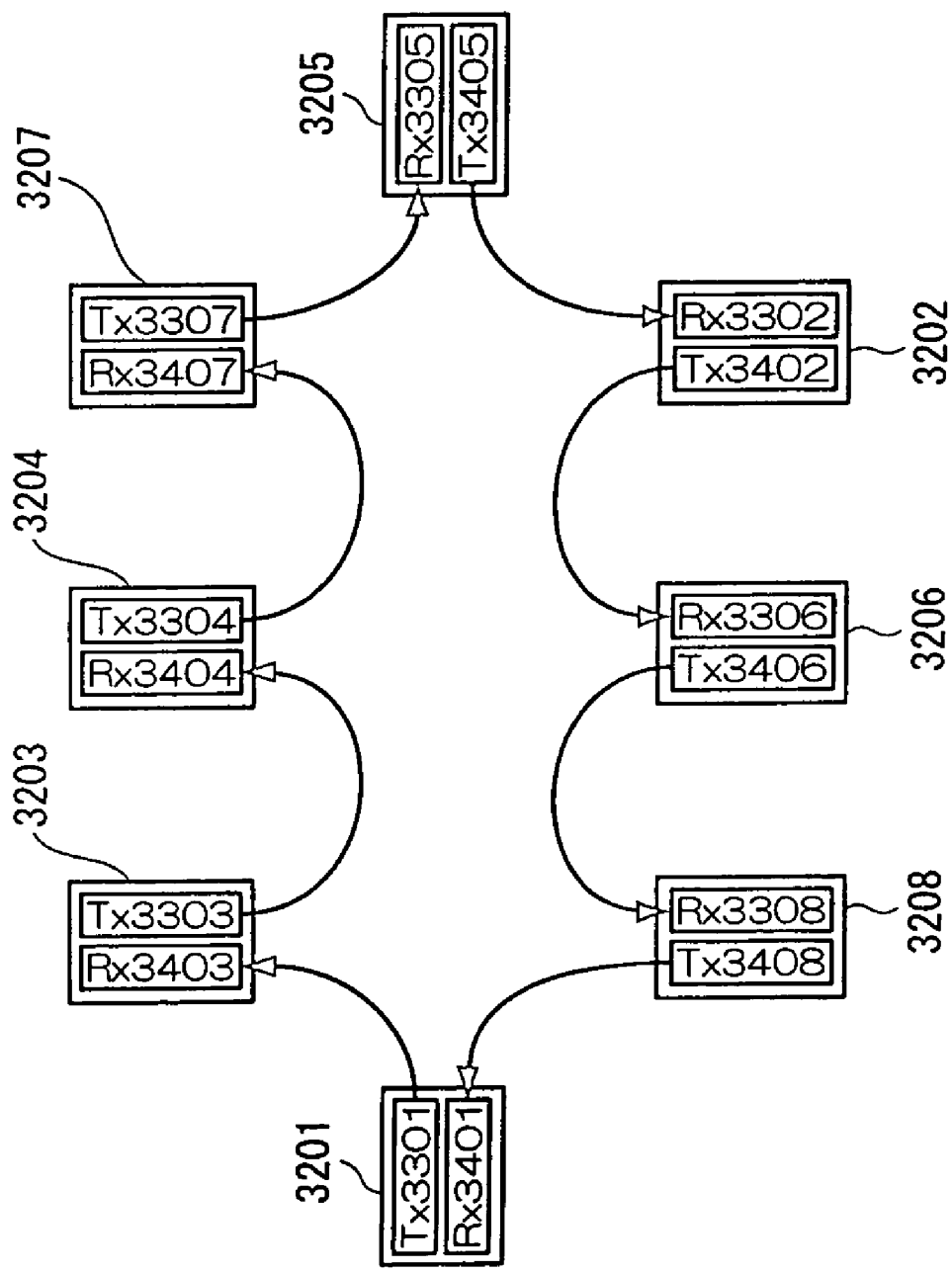
FIG. 31 is a block diagram showing the ninth embodiment of the present invention, for describing logical connections of an optical communication system which uses wavelength path establishment circuits and optical switches.

FIG. 31 shows a logical connection of these communication nodes. As shown in FIG. 31, the connection of the communication nodes circulates sequentially from the communication node 3201, the communication node 3203, the communication node 3204, the communication node 3207, the communication node 3205, the communication node 3202, the communication node 3206, the communication node 3208, to the communication node 3201, so that the connection of these communication nodes forms a logical ring topology.

Here, a method is described for arranging wavelengths of the optical signals from the signal output ports of the respective communication nodes, so that the path is established from the optical input port to the adjacent optical output port as shown in the path establishment circuit in FIG. 30.

Figures 32, 33:
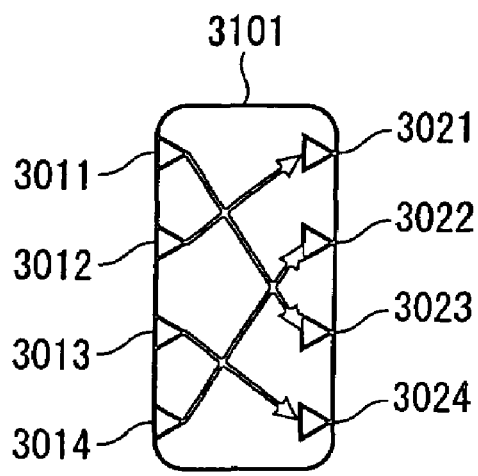
FIG. 32 is an explanatory diagram showing a configuration of a path establishment circuit applicable to the ninth embodiment of the present invention.
FIG. 33 is an explanatory diagram showing wavelength characteristics of the path establishment circuit applicable to the ninth embodiment of the present invention.

FIG. 32 shows a configuration of a path establishment circuit. In FIG. 32, reference symbol 3101 denotes the path establishment circuit, reference symbols 3011, 3012, 3013 and 3014 denote optical input ports, and reference symbols 3021, 3022, 3023 and 3024 denote optical output ports. FIG. 33 and FIG. 34 show wavelength-routing characteristics which determine from which optical output port an optical signal input from an optical input port is to be output corresponding to the wavelength thereof. FIG. 33 shows a case without cyclic-wavelength characteristics, while FIG. 34 shows a case with cyclic-wavelength characteristics. Such characteristics can be realized by configuring with an arrayed waveguide grating. In a path establishment circuit with cyclic-wavelength characteristics, the number of wavelengths used in the respective communication nodes may be only a few.

For example, in an arrayed waveguide grating without cyclic-wavelength characteristics, as shown by hatched area in FIG. 33, if an optical signal of $\lambda 3$ wavelength is input from the optical input port 3011, it is output to the optical output port 3023. If an optical signal of $\lambda 2$ wavelength is input from the optical input port 3012, it is output to the optical output port 3021. If an optical signal of $\lambda 6$ wavelength is input from the optical input port 3013, it is output to the optical output port 3024. If an optical signal of $\lambda 5$ wavelength is input from the optical input port 3014, it is output to the optical output port 3022.

For example, in the arrayed waveguide grating with cyclic-wavelength characteristics, as shown by hatched area in FIG. 34, if an optical signal of $\lambda 3$ wavelength is input from the optical input port 3011, it is output to the optical output port 3023. If an optical signal of $\lambda 2$ wavelength is input from the optical input port 3012, it is output to the optical output port 3021. If an optical signal of $\lambda 2$ wavelength is input from the optical input port 3013, it is output to the optical output port 3024. If an optical signal of $\lambda 1$ wavelength is input from the optical input port 3014, it is output to the optical output port 3022.

If the wavelength of a communication node connected to the path establishment circuit 3101 in FIG. 30 is arranged such as in FIG. 33 or FIG. 34, it becomes possible in the path establishment circuit 3101 to establish the path shown by the arrowheads in FIG. 30.

Similarly, in the other path establishment circuits, by making the wavelengths of optical signals from the signal output ports of communication nodes to a predetermined arrangement, it is possible to establish paths such as shown in the path establishment circuit 3101 in FIG. 30.

As described in the present embodiment, by making the wavelength of optical signals from the signal output port of the communication nodes to the predetermined arrangement, and by making the direction of the optical switch to the predetermined setting, it becomes possible to make the connection of the communication nodes via a path establishment circuit or the like, into a logical ring topology. Furthermore, either of an arrayed waveguide grating with cyclic-wavelength characteristics or an arrayed waveguide grating without cyclic-wavelength characteristics is applicable to such path establishment circuits.

In this embodiment, the optical input port and optical output port pairs of the path establishment circuit were described as four pairs, however the optical input port and optical output port pairs of the path establishment circuit are not limited to four pairs and may be multiple pairs. Also, in the above embodiment, the path establishment circuits have the same number of optical input port and optical output port pairs, however the respective path establishment circuits may have different numbers of optical input port and optical output port pairs. Furthermore, the above embodiment is configured by two units of path establishment circuits, however the number of units is not limited.

EMBODIMENT 10

Figure 35:
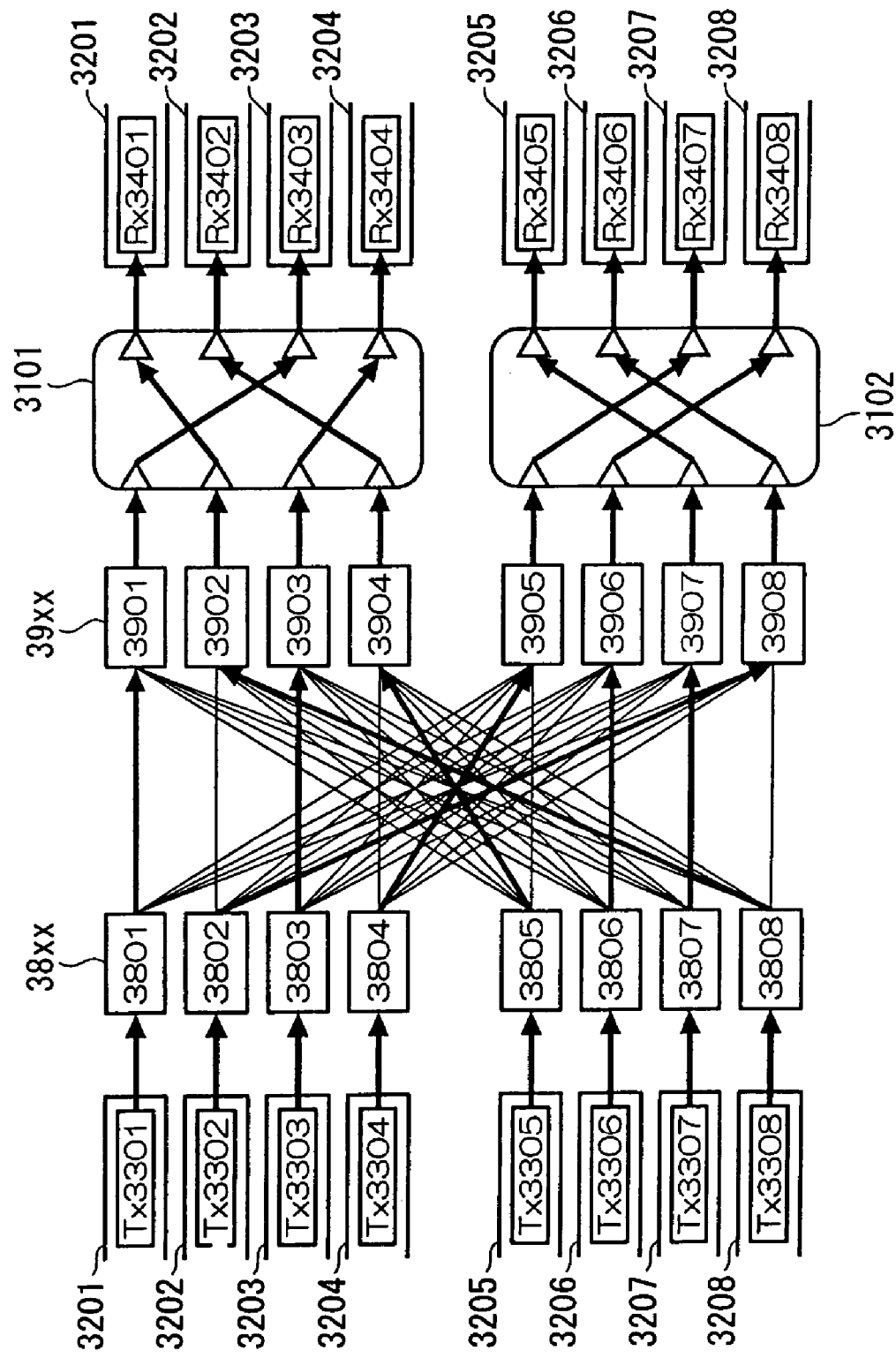
FIG. 35 is a block diagram showing a tenth embodiment of the present invention, for describing an optical communication system which uses wavelength path establishment circuits and optical switches.

FIG. 35 describes another optical communication system which accommodates eight communication nodes. In FIG. 35, reference symbols 3101 to 3102 denote path establishment circuits, reference symbols 3201 to 3208 denote communication nodes, reference symbols 3301 to 3308 denote respectively output circuits of the communication nodes 3201 to 3208, reference symbols 3401 to 3408 denote respectively input circuits of the communication nodes 3201 to 3208, reference symbols 3801 to 3803 denote optical splitters, and reference symbols 3901 to 3908 denote optical switches.

The communication nodes 3201 to 3208 each have one output circuit and input circuit pair, and there is provided one signal output port and signal input port pair for one output circuit and input circuit pair, and the optical signals to the signal input port are received, and then, after communication processing, the optical signals are output from the signal output port. In FIG. 35, the communication nodes are separated to the left and right. However, an input circuit and the corresponding output circuit are contained in the same communication node. The path establishment circuits 3101 to 3102 have multiple optical input port and optical output port pairs, and are set for outputting to the predetermined optical output ports corresponding to wavelengths of the optical signals input from the respective optical input ports. As a path establishment circuit, an arrayed waveguide grating (AWG) or the like can be applied. The optical splitters 3801 to 3808 split the optical signals from one optical input port and output it to the multiple optical output ports. The optical switches 3901 to 3908 set the direction in which any of the optical signals from the multiple input ports are output to one optical output port.

In FIG. 35, four communication nodes, four optical splitters, four optical switches, and one path establishment circuit constitute one unit, and an optical communication system comprises two units.

In FIG. 35, the signal output ports that are provided for the output circuits 3301 to 3308 of the communication nodes 3201 to 3208, are connected to the optical input ports of the corresponding optical splitters 3801 to 3808. The optical output ports of the optical splitters 3801 to 3808 are connected to the optical input ports of the corresponding optical switches 3901 to 3908 and to the optical input ports of all the optical switches 3901 to 3908 of the other units. The optical output ports of the optical switches 3901 to 3908 are connected to the corresponding optical input ports of the path establishment circuits 3101 and 3102. The optical output ports of the path establishment circuits 3101 and 3102 are connected to the signal input ports provided for the input circuits 3401 to 3408 of the corresponding communication nodes 3201 to 3208.

In FIG. 35, the thin lines denote directions in which connections are possible by the optical switches, and the thick lines denote directions in which connections are actually made. To set the directions of the optical switches 3901 to 3908, and to establish the paths of the path establishment circuits 3101 and 3102 as shown in FIG. 35, the directions of the optical switches 3901 to 3908 are controlled, and the wavelengths of the optical signals from the signal output ports of the respective communication nodes are arranged. Such a connection of the communication nodes forms a logical ring topology as in FIG. 31.

As described in the present embodiment, by making the wavelength of optical signals from the signal output ports of the communication nodes to the predetermined arrangement, and by making the direction of the optical switch to the predetermined setting, it becomes possible to make the connection of the communication nodes via a path establishment circuit or the like, into a logical ring topology.

In this embodiment, the optical input port and optical output port pairs of the path establishment circuit were described as four pairs, however the optical input port and optical output port pairs of the path establishment circuit are not limited to four pairs and may be multiple pairs. Also, in the above embodiment, the path establishment circuits have the same number of optical input ports and optical output port pairs, however the respective path establishment circuits may have different numbers of optical input port and optical output port pairs. Furthermore, the above embodiment is configured by two units of path establishment circuits, however the number of units is not limited.

EMBODIMENT 11

Figure 36:
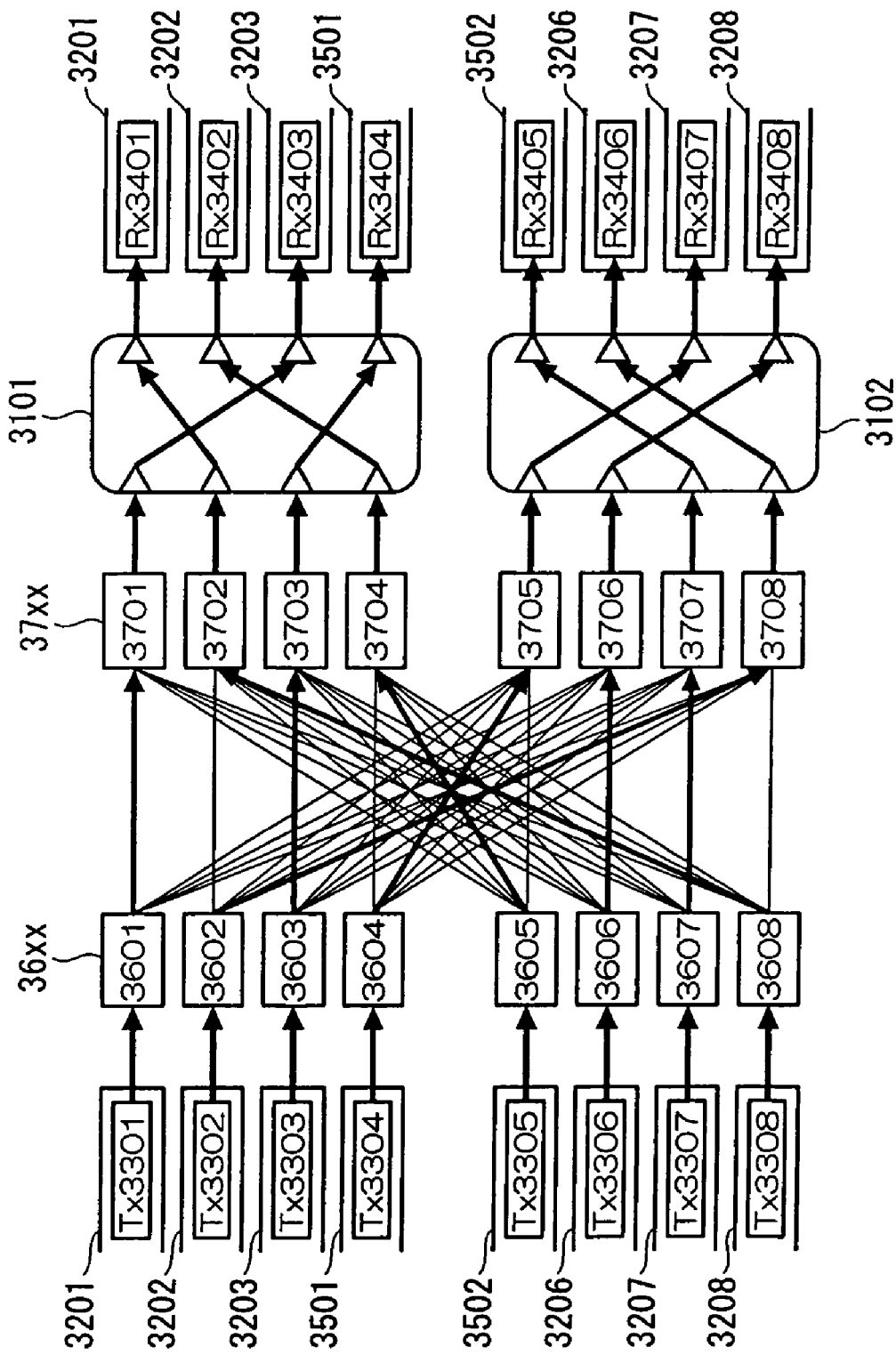
FIG. 36 is a block diagram showing an eleventh embodiment of the present invention, for describing an optical communication system where part of the communication nodes is replaced by a repeater.

In this embodiment, a description is given of an optical communication system where a part of communication nodes are replaced by repeaters. In FIG. 36, reference symbols 3101 to 3102 denote path establishment circuits, reference symbols 3201 to 3203 and 3206 to 3208 denote communication nodes, reference symbols 3501 and 3502 denote repeaters, reference symbols 3301 to 3308 denote respectively output circuits of the communication nodes 3201 to 3203 and 3206 to 3208 and the repeaters 3501 and 3502, reference symbols 3401 to 3408 denote respectively input circuits of the communication nodes 3201 to 3203 and 3206 to 3208 and the repeaters 3501 and 3502, reference symbols 3601 to 3608 denote optical switches, and reference symbols 3701 to 3708 denote optical multiplexers.

The present embodiment is such that in the above-described embodiments, the communication node 3204 is replaced by the repeater 3501 and the communication node 3205 is replaced by the repeater 3502. Even if they are replaced in this manner, the connection of the communication nodes circulates sequentially from the communication node 3201, the communication node 3203, the repeater 3501, the communication node 3207, the repeater 3502, the communication node 3202, the communication node 3206, the communication node 3208, to the communication node 3201, so that the connection of these communication nodes forms a logical ring topology. The connection of FIG. 36 becomes equivalent to a connection skipping the communication nodes 3204 and 3205 in FIG. 31.

In this embodiment, in the optical communication system of the present invention, even if the communication nodes are replaced by repeaters, it is possible to make the connection of the communication nodes into a logical ring topology.

EMBODIMENT 12

In this embodiment, there is described an optical communication system for modifying the connections of the communication nodes, by modifying the wavelength of the optical signals from the output circuit of the communication node, and the direction of the optical switch.

Figures 37, 38:
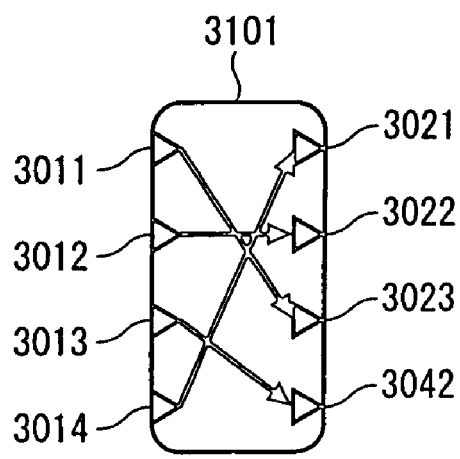
FIG. 37 is an explanatory diagram showing a configuration of a path establishment circuit applicable to the twelfth embodiment of the present invention.
FIG. 38 is an explanatory diagram showing wavelength characteristics of a path establishment circuit applicable to the twelfth embodiment of the present invention.

FIG. 37 shows a configuration of a path establishment circuit. In FIG. 37, reference symbol 3101 denotes the path establishment circuit, reference symbols 3011, 3012, 3013 and 3014 denote optical input ports, and reference symbols 3021, 3022, 3023 and 3024 denote optical output ports. FIG. 38 and FIG. 39 show wavelength-routing characteristics which determine from which optical output port an optical signal input from an optical input port is to be output corresponding to the wavelength thereof. FIG. 38 shows a case without cyclic-wavelength characteristics, while FIG. 39 shows a case with cyclic-wavelength characteristics. Such characteristic can be realized by configuring with an arrayed waveguide grating. In a path establishment circuit with cyclic-wavelength characteristics, the number of wavelengths used in the respective communication nodes may be only a few.

For example, in an arrayed waveguide grating without cyclic-wavelength characteristics, as shown by the hatched area in FIG. 38, if an optical signal of λ3 wavelength is input from the optical input port 3011, it is output to the optical output port 3023. If an optical signal of λ3 wavelength is input from the optical input port 3012, it is output to the optical output port 3022. If an optical signal of λ6 wavelength is input from the optical input port 3013, it is output to the optical output port 3024. If an optical signal of λ4 wavelength is input from the optical input port 3014, it is output to the optical output port 3021.

For example, in the arrayed waveguide grating with cyclic-wavelength characteristics, as shown by the hatched area in FIG. 39, if an optical signal of λ3 wavelength is input from the optical input port 3011, it is output to the optical output port 3023. If an optical signal of λ3 wavelength is input from the optical input port 3012, it is output to the optical output port 3022. If an optical signal of λ2 wavelength is input from the optical input port 3013, it is output to the optical output port 3024. If an optical signal of λ4 wavelength is input from the optical input port 3014, it is output to the optical output port 3021. In this manner, by setting wavelengths of the optical signals input to the optical input ports, it becomes possible to modify the path in a path establishment circuit such as an arrayed waveguide grating.

If the wavelength of a communication node connected to the path establishment circuit 3101 in FIG. 37 is arranged such as in FIG. 38 or FIG. 39, it becomes possible in the path establishment circuit 3101 to establish the paths shown by the arrowheads in FIG. 37. In this manner, if the wavelength of the optical signal input to the optical input port of the path establishment circuit is modified, optional path establishment becomes feasible in path establishment circuit.

If the optical light sources of the communication nodes are made wavelength-tunable optical light sources, and the wavelengths of the optical signals input to the optical input ports of the path establishment circuit are modified, then optional path establishment in the path establishment circuit is possible. If it becomes possible to modify the directions of the optical switches and the path establishment of the path establishment circuits, then in an optical communication system, it becomes possible to separate the faulty part and to connect normal communication nodes so as to maintain the connection of a logical ring topology in the case where a fault occurs in a communication node or in an optical waveguide such as an optical fiber connecting the communication nodes or the like, and to configure another ring network.

Figure 40:
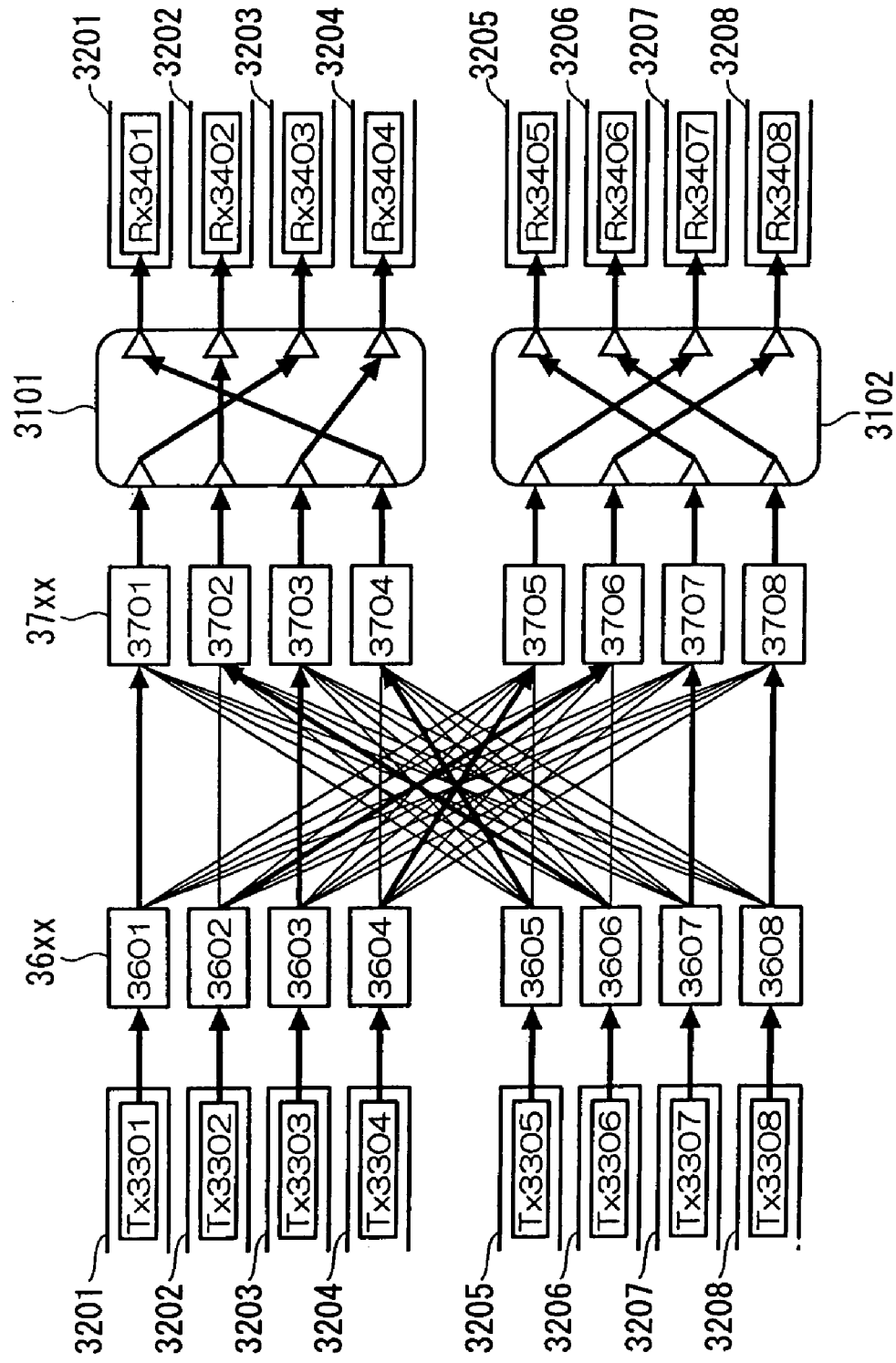
FIG. 40 is a block diagram showing the twelfth embodiment of the present invention, for describing an optical communication system which uses wavelength path establishment circuits and optical switches.

FIG. 40 describes an example for modifying the configuration from one ring network into two ring networks by modifying a path establishment. In FIG. 40, reference symbols 3101 and 3102 denote path establishment circuits, reference symbols 3201 to 3208 denote communication nodes, reference symbols 3301 to 3308 denote respectively output circuits of the communication nodes 3201 to 3208, reference symbols 3401 to 3408 denote respectively input circuits of the communication nodes 3201 to 3208, reference symbols 3601 to 3608 denote optical switches, and reference symbols 3701 to 3708 denote optical multiplexers.

The communication nodes 3201 to 3208 each have one output circuit and input circuit pair, and there is provided one signal output port and signal input port pair for one output circuit and input circuit pair, and the optical signals to the signal input port are received, and then, after communication processing, the optical signals are output from the signal output port. In FIG. 40, communication nodes are separated to the left and right. However, an input circuit and the corresponding output circuit are contained in the same communication node. The path establishment circuits 3101 to 3102 have multiple optical input port and optical output port pairs, and are set for outputting to the predetermined optical output ports corresponding to wavelengths of the optical signals input from the respective optical input ports. As the path establishment circuit, an arrayed waveguide grating (AWG) or the like can be applied. The optical switches 3601 to 3608 set the direction for outputting an optical signal from an optical input port to any of the multiple optical output ports. The optical multiplexers 3701 to 3708 multiplex the optical signals from the multiple optical input ports and output to one optical output port.

In the case of making a connection of a logical ring topology by the communication node 3201, the communication node 3203, the communication node 3204, the communication node 3207, and the communication node 3205, and making a connection of a logical ring topology by the communication node 3208, the communication node 3206, and the communication node 3202, then as shown in FIG. 40, the path establishment of the path establishment circuits and the directions of the optical switches are modified. Modifying the path establishment is conducted by modifying the wavelength of the optical signal input to the optical input port of the path establishment circuit, that is, the wavelength of the optical signal output from the output circuit of the communication node.

Figure 41:
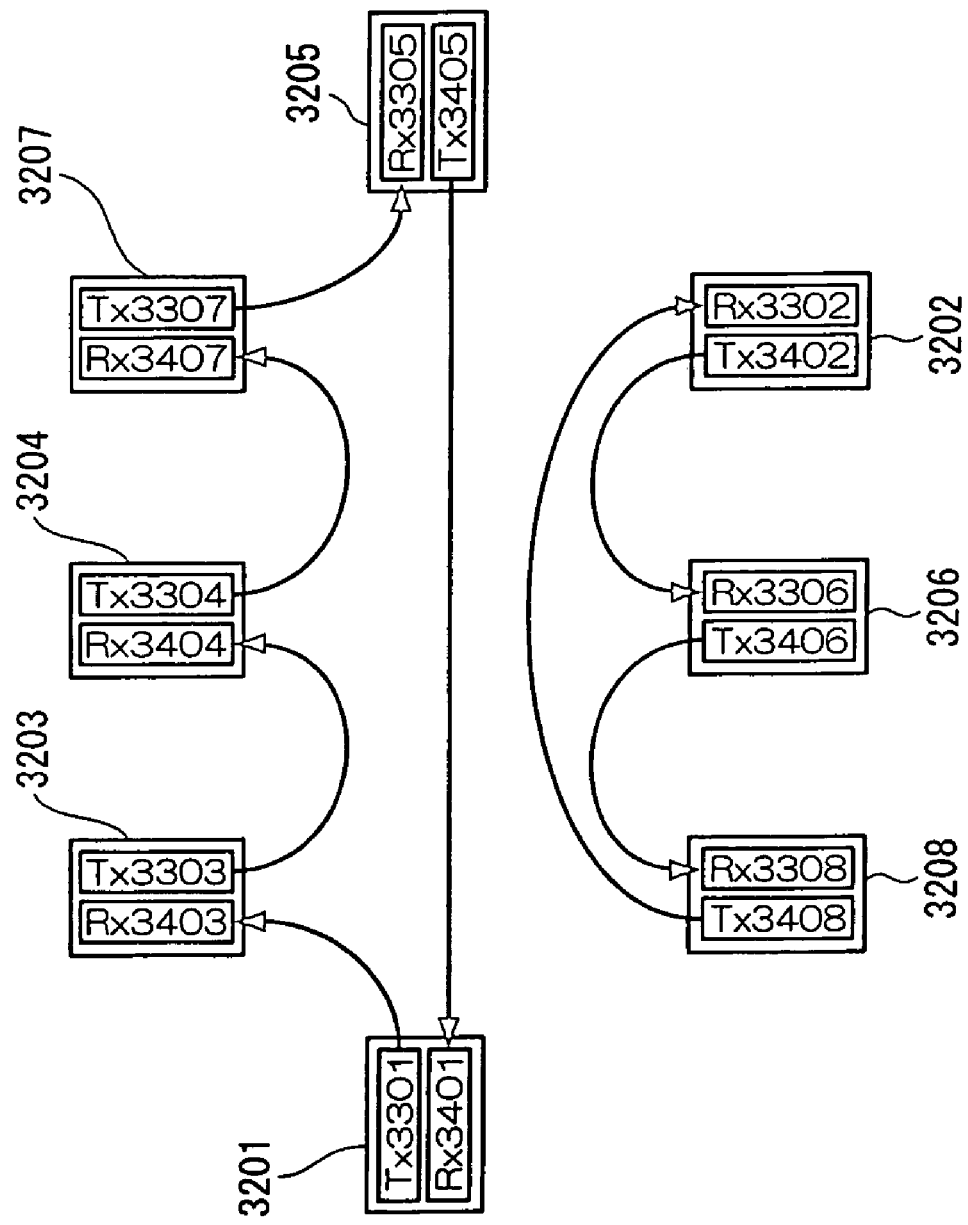
FIG. 41 is a block diagram showing the twelfth embodiment of the present invention, for describing logical connections of an optical communication system which uses wavelength path establishment circuits and optical switches.

If the path establishment is modified in the path establishment circuits 3101 and 3102 and the directions of the optical switches 3601 to 3608 are modified as shown in FIG. 40, a logical connection of the communication nodes as shown FIG. 41 can be obtained. As shown in FIG. 41, the connection of the communication nodes circulates sequentially from the communication node 3201, the communication node 3203, the communication node 3204, the communication node 3207, the communication node 3205, to the communication node 3201, so that the connection of these communication nodes forms a logical ring topology. In addition, regarding a connection from the communication node 3208, the communication node 3202, the communication node 3206, to communication node 3208, the connection of these communication nodes also forms a logical ring topology.

As described in the present embodiment, by modifying the wavelength of the optical signal output from the output circuit of the communication node and the direction of the optical switches, it becomes possible to modify the path establishment of the path establishment circuit so as to separate the communication node with a fault, and to configure another ring network Furthermore, the number of communication nodes connected to the path establishment circuit is not limited to the number described in the embodiment. Moreover, there is no need to connect the communication nodes to all the optical input port and optical output port pairs of the path establishment circuit.

EMBODIMENT 13

Next is a description of an information sharing system which uses the optical communication system of the present invention. The following embodiments describe an example of a case for constituting an information sharing system on an optical communication system provided with multiple wavelength path establishment circuits as described in the fifth to twelfth embodiments. However, it is possible to construct an information sharing system on an optical communication system which uses only one wavelength path establishment circuit as described in the first to fourth embodiments.

Figure 42:
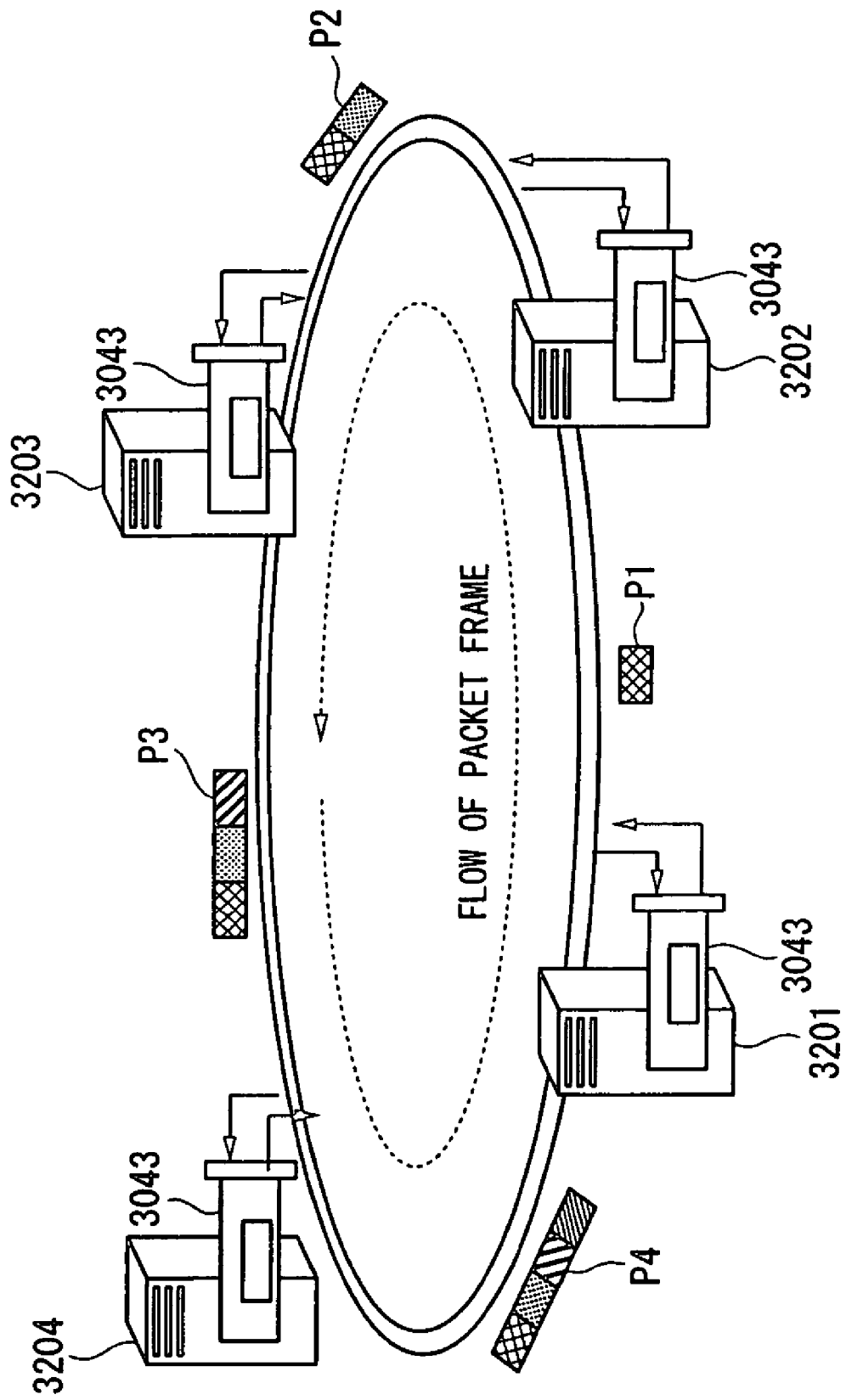
FIG. 42 is a diagram showing a basic concept for an information sharing system according to a thirteenth embodiment of the present invention.

At first, a description is given of a basic configuration of an information sharing system which uses an optical communication system according to the present invention. FIG. 42 shows a basic configuration of an information sharing system comprising four communication nodes 3201 to 3204. Shared memory boards 3043 loaded with optical transceivers and memories are installed in the communication nodes 3201 to 3204. In the system, the flow of packet frames P1 to P4 loaded with information of the respective communication nodes 3201 to 3204 sent from the optical transceivers installed in the shared memory boards 3043 of the respective communication nodes for sharing information (in the case of sharing images, this becomes graphic data), forms a logical ring topology. As shown in FIG. 42, the packet frames P1 to P4 loaded with information of the respective communication nodes 3201 to 3204 circulate on a logical ring so that the respective communication nodes can share the information.

Figure 43A:
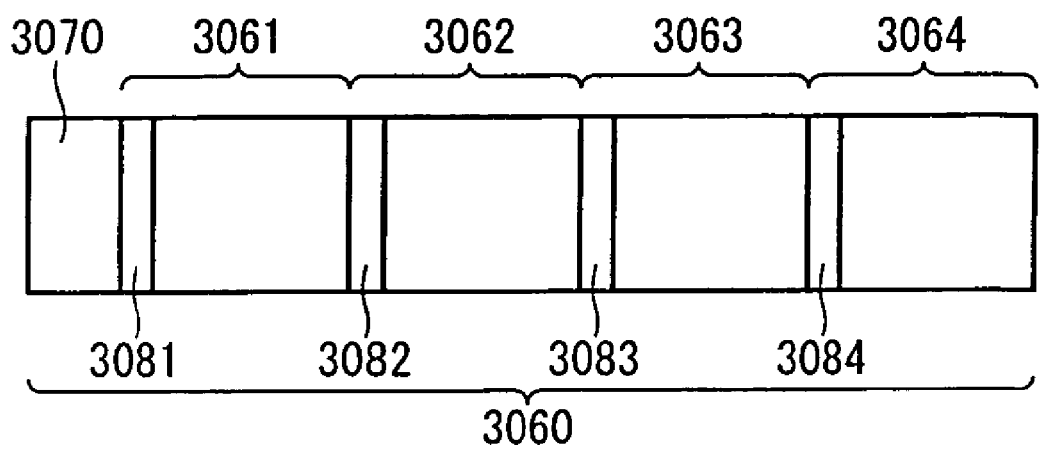
FIG. 43A and FIG. 43B are diagrams showing a configuration of packet frames in the thirteenth embodiment of the present invention.
Figure 43B:
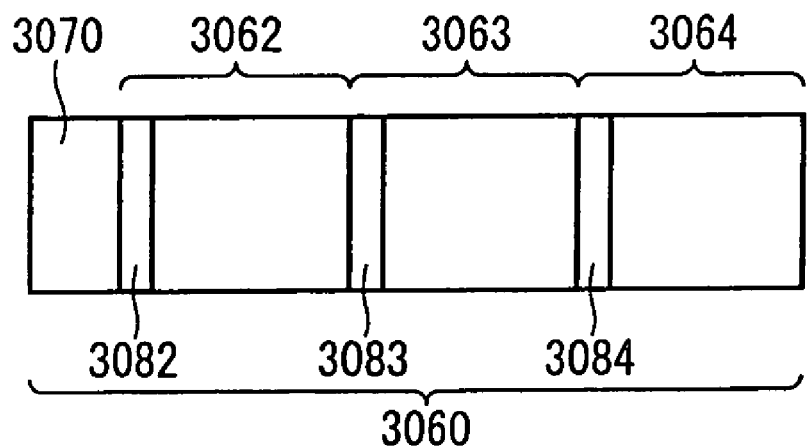

Here, a description is given of a packet frame for circulating on the logical ring topology. FIG. 43A and FIG. 43B show a configuration of a packet frame loaded with information of the respective communication nodes 3201 to 3204 which circulates on the logical ring topology. Here, a description is given of a case where four communication nodes share information in an information sharing system. A packet frame 3060 shown in FIG. 43A is a diagram for showing a detailed frame configuration of the packet frame P4 shown in FIG. 42. The packet frame 3060 shown in FIG. 43A comprises a frame header 3070 loaded with information related to packet frames, and segments 3061 to 3064 configured from information of the respective communication nodes 3201 to 3204.

Furthermore, at the head of the respective segments 3061 to 3064, segment headers 3081 to 3084 loaded with information related to the respective segments are arranged. FIG. 43A shows an example of the case where, the segment 3061 is information of the communication node 3201, the segment 3062 is information of the communication node 3202, the segment 3063 is information of the communication node 3203, and the segment 3064 is information of the communication node 3204.

However, the frame configuration of the information sharing system and a method of loading information of the respective communication nodes onto the frames, is not limited to those described above.

Figure 44:
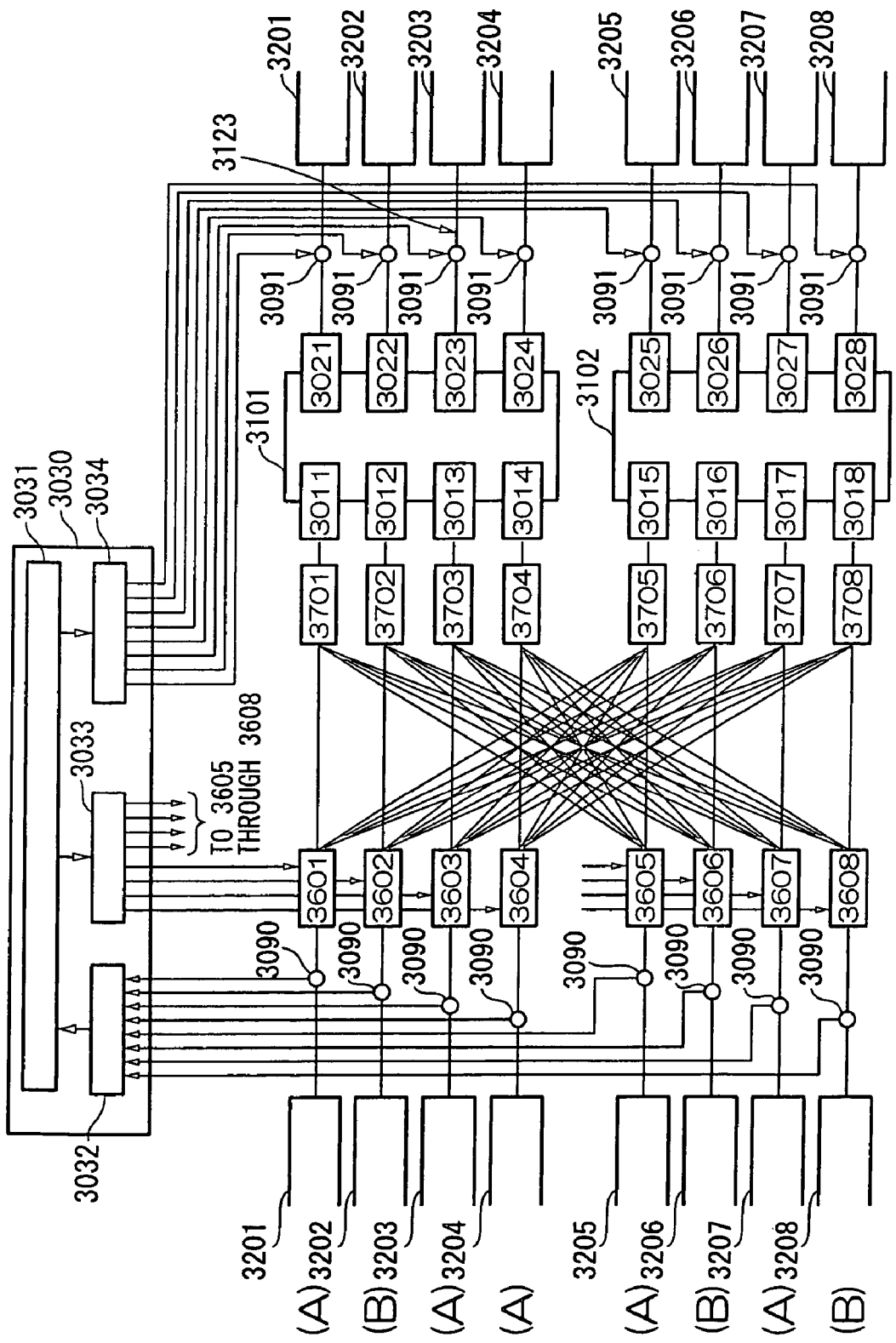
FIG. 44 is a block diagram showing an overall configuration of an information sharing system according to the thirteenth embodiment of the present invention.

Next is a description of an information sharing system for sharing images between the respective communication nodes, using an optical communication system which accommodates the eight communication nodes 3201 to 3208. FIG. 44 is a diagram showing a configuration of an information sharing system which uses the optical communication system of the present invention. In FIG. 44, reference symbols 3101 and 3102 denote path establishment circuits, reference symbols 3201 to 3208 denote communication nodes, reference symbols 3601 to 3608 denote 1×5 optical switches having one input port and five output ports, reference symbols 3701 to 3708 denote 5×1 optical multiplexers having five input ports and one output port, reference symbols 3011 to 3014 denote optical input ports of the path establishment circuit 3101, reference symbols 3015 to 3018 denote optical input ports of the path establishment circuit 3102, reference symbols 3021 to 3024 denote optical output ports of the path establishment circuit 3101, and reference symbols 3025 to 3028 denote optical output ports of the path establishment circuit 3102. Furthermore, reference symbol 3090 denotes an optical demultiplexer and reference symbol 3091 denotes an optical multiplexer. Reference symbol 3030 denotes a network management node provided with: a network management section 3031; an optical control signal receiving section 3032 for receiving optical control signals loaded with information related to the control of the optical switches 3601 to 3608 transmitted from the respective communication nodes 3201 to 3208; an optical switch controlling section 3033 for controlling the optical switches 3601 to 3608; and an optical control signal transmitting section 3034 for transmitting optical control signals transmitted to the respective communication nodes 3201 to 3208.

In FIG. 44, only the signal lines which connect between the optical switch controlling section 3033 and the respective optical switches 3601 to 3608 are electric signal lines, and the other signal lines are signal lines configured by optical fibers. The input ports of the optical switch 360$x$ (x is any integer from 1 to 8) are connected to the communication node 320$x$ by optical fibers, and the output ports of the optical switches 3601 to 3608 are connected to the input ports of the corresponding 5×1 optical multiplexers 3701 to 3708 and the input ports of all of the optical multiplexers 3701 to 3708 connected to the other path establishment circuit. Furthermore, the output ports of the 5×1 optical multiplexer 370$x$ (x is any integer from 1 to 4) are respectively connected to the optical input port 301$x$ of the path establishment circuit 3101, and the output ports of the 5×1 optical multiplexers 370$y$ (y is any integer from 5 to 8) are respectively connected to the optical input port 301$y$ of the path establishment circuit 3102. Moreover, in FIG. 44, similarly to as shown FIG. 30, FIG. 35, FIG. 36 and FIG. 40, the communication nodes 3201 to 3208 are shown separated to the left and right, however the communication nodes denoted by the same reference symbols are the same communication nodes.

Figure 45:
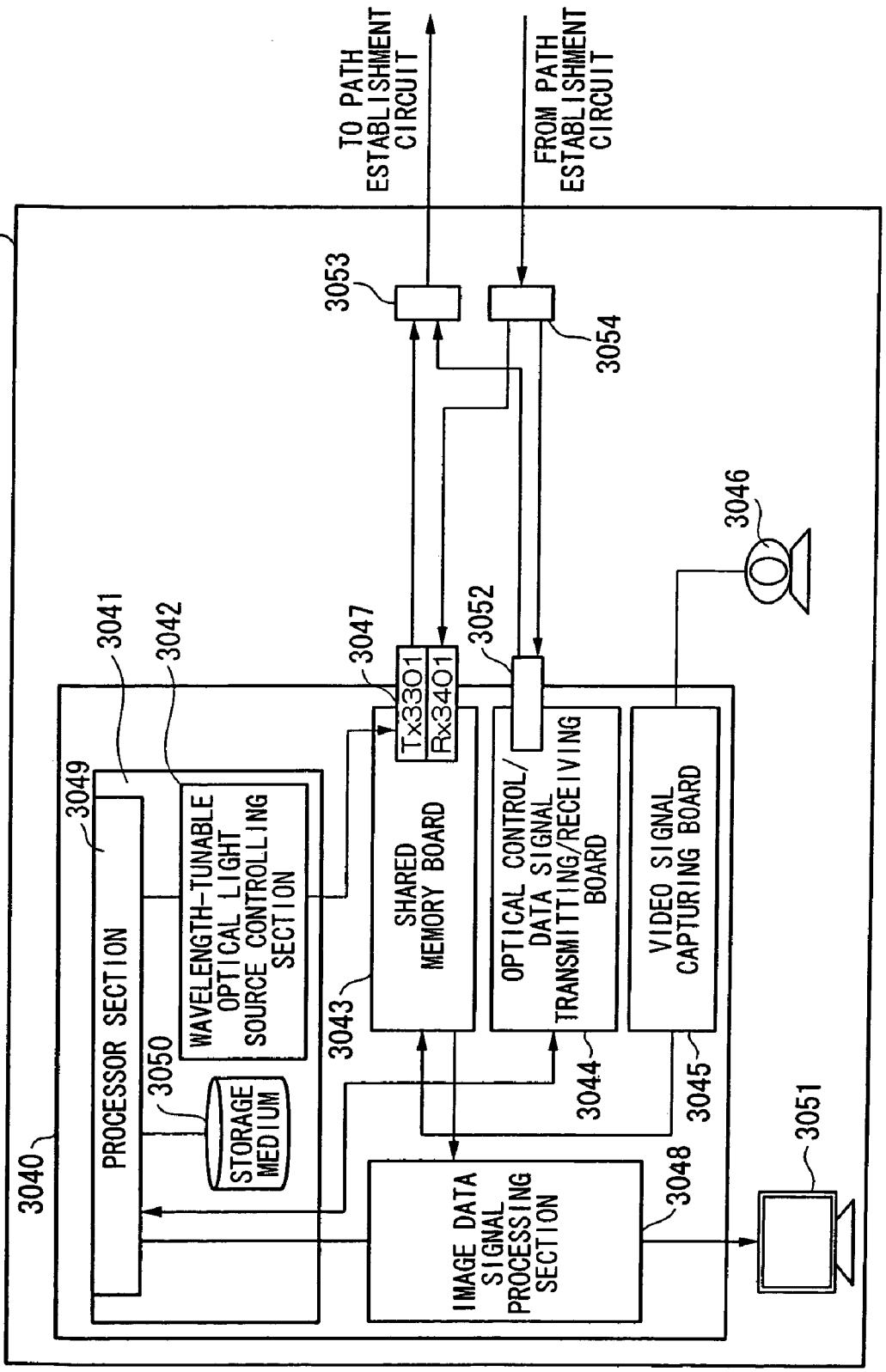
FIG. 45 is a block diagram showing a configuration of the communication node 3201 shown in FIG. 44.

Next is a description of a configuration of the communication nodes 3201 to 3208 shown in FIG. 44, with reference of FIG. 45. Since all eight communication nodes have the same configuration, the configuration of the communication node 3201 is described. In FIG. 45, reference symbol 3040 denotes a computer node, reference symbol 3041 denotes a communication node management section, reference symbol 3042 denotes a wavelength-tunable optical light source controlling section, reference symbol 3043 denotes a shared memory board loaded with an optical transceiver 3047, reference symbol 3044 denotes an optical control/data signal transmitting/receiving board, reference symbol 3045 denotes a video signal capturing board, reference symbol 3046 denotes an image taking camera, reference symbol 3047 denotes a wavelength-tunable optical light source built-in optical transceiver, reference symbol 3048 denotes an image data signal processing section, reference symbol 3049 denotes a processor section, reference symbol 3050 denotes a storage medium stored with wavelength characteristics and the like of the path establishment circuit 3101 and the path establishment circuit 3102, reference symbol 3051 denotes an image monitor, reference symbol 3052 denotes an optical transceiver for transferring optical control signals, reference symbol 3053 denotes an optical multiplexer, and reference symbol 3054 denotes an optical demultiplexer. Signal lines in the computer node 3040 are electric signal lines. Between the optical transceiver 3047 and the optical multiplexer 3053, and between the optical transceiver 3052 and the optical demultiplexer 3054, are signal lines comprising optical fibers.

Next is a description of the operation of the communication node 3201 shown in FIG. 45. The image taking camera 3046, which is an external camera connected to the computer node 3040, transmits image data to the video signal capturing board 3045 in analog signal format. On receiving this, the video signal capturing board 3045 digitizes the analog signal of the image, and transmits this digitized image data to the shared memory board 3043. On receiving this, the shared memory board 3043 stores this image data in a data segment of the packet frame input from the optical transceiver 3047 as new data for its own communication node. The optical transceiver 3047 transmits the packet frame appended with the new data using an optical signal of a desired wavelength. At this time, the optical transceiver 3047, based on control information transmitted to the optical control/data signal transmitting/receiving board 3044 of the communication node via the optical control signal transmitting section 3034 of the network management node 3030 serving as an optical control/data signal related to a wavelength of the wavelength-tunable optical light source, sets the wavelength of the wavelength-tunable optical light source via the wavelength-tunable optical light source controlling section 3042 of the communication node, and outputs a packet frame as an optical packet frame signal of the desired wavelength λd in the 1.55 μm band.

In the respective communication nodes, there is the optical control/data signal transmitting/receiving board 3044 for transferring optical control signals loaded with information related to control of the optical switches 3601 to 3608 shown in FIG. 44. The wavelength of the optical control signal output from the optical transceiver 3052 loaded in the optical control/data signal transmitting/receiving board 3044 is a fixed wavelength λc (for example, 1.3 μg/m), and it is a different wavelength to that of the optical packet frame signal output from the wavelength-tunable optical light source built-in optical transceiver 3047.

Furthermore, an optical packet frame signal transmitted from the wavelength-tunable optical light source built-in optical transceiver 3047 installed in the shared memory board 3043, and an optical control signal output from the optical transceiver 3052 loaded in the optical control/data signal transmitting/receiving board 3044, are multiplexed by the optical multiplexer 3053, and transmitted via an optical fiber to the optical demultiplexer 3090 shown in FIG. 44. On the other hand, an optical packet frame signal and an optical control signal, transmitted via the optical demultiplexer 3091 shown in FIG. 44 to a communication node by an optical fiber, are demultiplexed by the optical demultiplexer 3054. As a result, the optical packet frame signal is transmitted to the receiving section of the optical transceiver 3047 loaded in the shared memory board 3043, and the optical control signal is transmitted to the receiving section of the optical transceiver 3052 loaded in the optical control/data signal transmitting/receiving board 3044.

Figure 46:
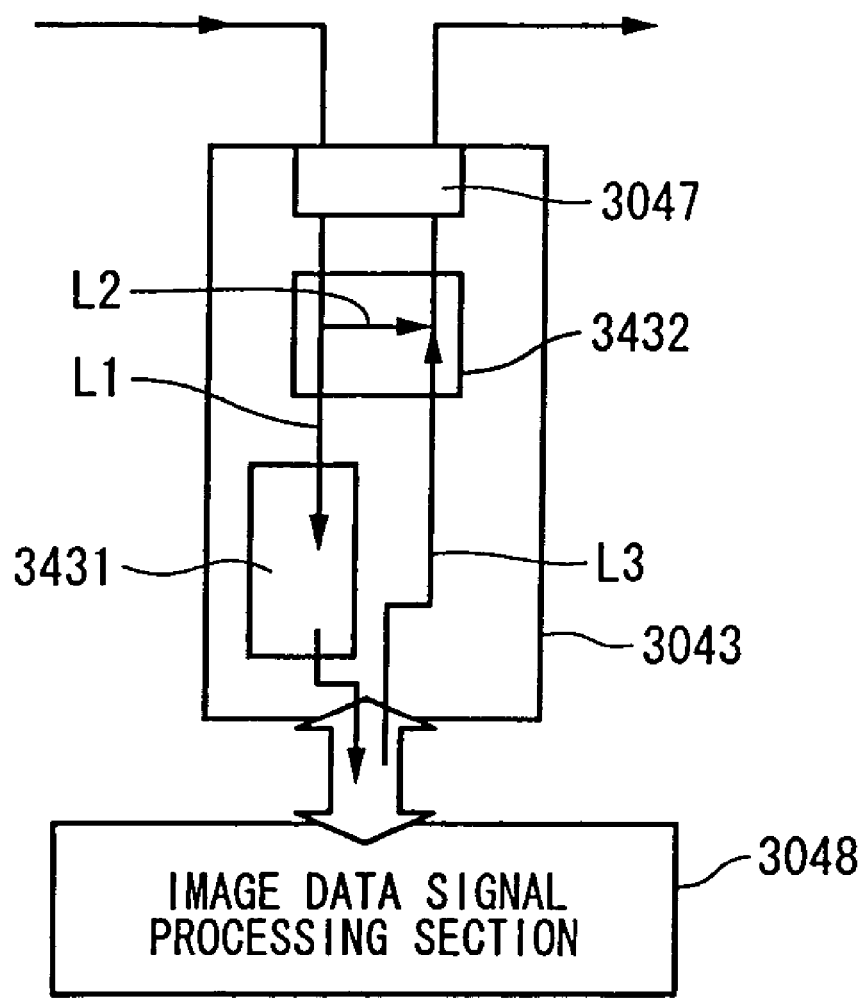
FIG. 46 is a block diagram showing a configuration of the shared memory board 3043 shown in FIG. 45.
Figure 47:
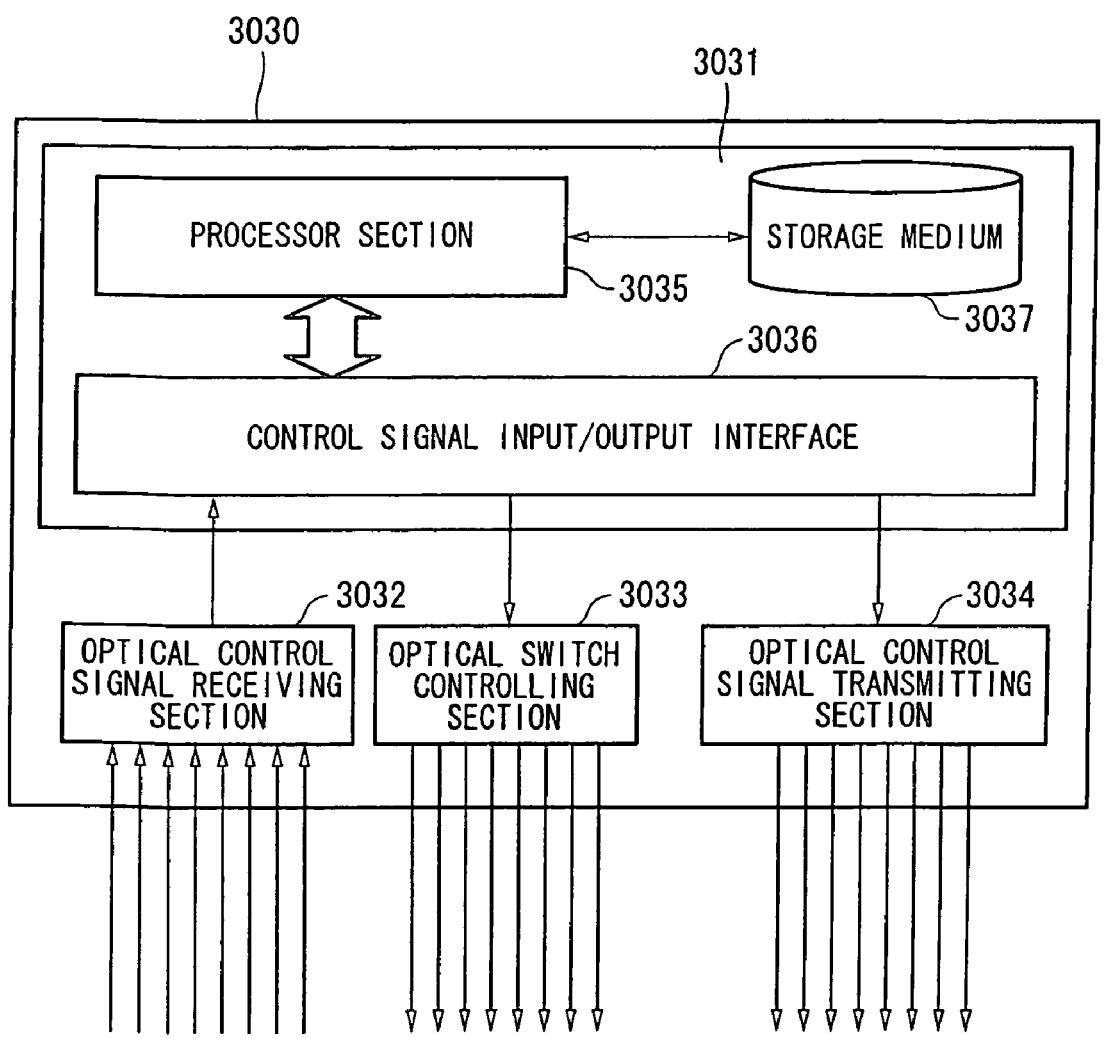
FIG. 47 is a block diagram showing a configuration of the network management node 3030 shown in FIG. 44.

Next is a description of a configuration of the shared memory board 3043 shown in FIG. 45, with a reference of FIG. 46. In FIG. 46, reference symbol 3047 denotes the optical transceiver shown in FIG. 45, reference symbol 3431 denotes a shared memory, reference symbol 3432 denotes a frame transfer processing circuit, and reference symbol 3048 denotes the image data signal processing section shown in FIG. 45. Signals input/output to/from the optical transceiver 3047 are optical signals via optical fibers. Signal lines in the shared memory 3043 are electric signal lines.

Here a description is given of the operation of the shared memory board 3043, with reference to FIG. 46. On the logical ring topology, when a packet frame (optical signal) from one of the adjacent communication nodes is input via an optical fiber to the optical receiving section of the optical transceiver 3047, the packet frame of the optical signal is converted into an electric signal. The frame transfer processing circuit 3432 splits the photo-electrically converted packet frame into two directions of a first direction L1 and a second direction L2. Regarding the packet frame split into the first direction L1, information of each of the communication nodes written in the packet frame is identified by the frame transfer processing circuit 3432, and information of the other communication nodes are respectively stored in the predetermined address space of the shared memory 3431 for respective communication nodes. The communication nodes transmit the information of the respective communication nodes stored in the shared memory 3431 to the image data signal processing section 3048 as required.

On the other hand, for the packet frame split into the second direction L2, the communication node deletes its own old information in the packet frame by the frame transfer processing circuit 3432, reads out new data to be input from the image data signal processing section 3048 to the frame transfer processing circuit 3432, and appends this to the packet frame. In the case where the communication node does not have its own new data, the communication does not form a segment loaded with information of its own communication node, in the packet frame. For example, assuming its own communication node is the communication node 3201 shown in FIG. 42, a packet frame formed in the case where new data of the communication node 3201 is not appended to the packet frame, as shown in FIG. 43, does not have the segment 3061 of its own communication node 3201. As a result, the frame length becomes shorter compared to the case where it has segments of all the data of the communication nodes 3201 to 3204 (FIG. 43A).

Next, the packet frame, which has been split into the second direction L2 and its own new information has been appended (or has not been appended) by the frame transfer processing circuit 3432, is output from the optical transmitter of the optical transceiver 3047 to the optical signal transmission optical fiber, and the packet frame is transmitted to the adjacent communication node on the logical ring topology, as an optical signal.

In this manner, an optical packet frame circulates on the logical ring topology constituted by the communication nodes, to thereby execute update of the data in the shared memory of the respective communication nodes.

Next is a description of a detailed configuration of the network management node 3030 shown in FIG. 44. The network management section 3031 is mainly configured by; a processor section 3035, a control signal input/output interface 3036, and a storage medium 3037. In the storage medium 3037 there is registered as a basic database: a table of wavelength-routing characteristics of the path establishment circuit 3101 and the path establishment circuit 3102; information of the communication nodes connected to the input port side of the optical switches 3601 to 3608, and information of the input ports of the path establishment circuits connected via the optical multiplexers to the output port side of the optical switches 3601 to 3609. FIG. 48 shows a table of wavelength-routing characteristics showing the relationship between the wavelengths of the path establishment circuit 3101 and the input/output ports. FIG. 49 shows a table of wavelength-routing characteristics showing the relationship between the wavelengths of the path establishment circuit 3102 and the input/output ports.

The processor section 3035, when communicating between the respective communication nodes, determines one of the optical multiplexers 3701 to 3708 to which the optical packet frame signals input from the input ports of the optical switches 3601 to 3608 connected to the respective communication nodes should be output, based on the basic database. Based on the determination result, the processor section 3035 then controls the optical switches 3601 to 3608 via the optical switch controlling section 3033 so that optical packet frame signals input from the input ports of the optical switches 3601 to 3608 are output to the input side of the desired optical multiplexers 3701 to 3708.

Next, based on the wavelength-routing characteristics (FIG. 48 and FIG. 49) of the path establishment circuit 3101 and the path establishment circuit 3102 registered in the storage medium 3037, the network management section 3031 transmits information of the wavelength which should be set by the wavelength-tunable optical light source in the wavelength-tunable optical light source built-in optical transceiver 3047 of the respective communication nodes via the optical control signal transmitting section 3034 toward the optical control/data signal transmitting/receiving board 3044 of the respective communication nodes as an optical control/data signal related to the wavelength of the wavelength-tunable optical light source. At this time, the network management section. 3031 registers the wavelength settings of the respective communication nodes in the storage medium 3037 as a wavelength setting database.

Next is a description, as an example of an operation procedure of the optical communication system of the present invention, related to how to realize logical ring topology information sharing configured by; the communication node 3201, the communication node 3203, the communication node 3204, the communication node 3205, and the communication node 3207 (called information sharing group A), and logical ring topology information sharing configured by; the communication node 3202, the communication node 3206, and the communication node 3208 (called information sharing group B).

In the case where the communication node 3201, the communication node 3203, the communication node 3204, the communication node 3205, and the communication node 3207 form a logical ring topology information sharing group A (denoted by (A) in FIG. 44), and the flow of an optical packet frame on the logical ring topology is; the communication node 3201→the communication node 3203→the communication node 3204→the communication node 3207→the communication node 3205→the communication node 3201, then the control information loaded with a request for connecting the node 3201 to the node 3203, the node 3203 to the node 3204, the node 3204 to the node 3207, the node 3207 to the node 3205, and the node 3205 to the node 3201 is transmitted from the optical control/data signal transmitting/receiving board 3044 of the respective communication nodes. Control information is received via the optical demultiplexer 3090 by the optical control signal receiving section 3032 of the network management node 3030, and the received information is transmitted to the network management section 3031.

On receiving this, in the network management section 3031, based on the aforementioned basic database, the processor section 3035 determines one of the optical multiplexers 3701 to 3708 to which the packet frame signals input from the input ports of the optical switches 3601, 3603, 3604, 3605 and 3607 connected to the respective communication nodes should be output, and controls via the optical switch controlling section 3033 so that the packet frame signals input from the input ports of the optical switches 3601, 3603, 3604, 3605 and 3607 are output to the input side of the desired optical multiplexers 3701 to 3708. At the same time, information of the wavelength which should be set by the wavelength-tunable optical light source in the wavelength-tunable optical light source built-in optical transceiver 3047 of the respective communication nodes is transmitted via the optical control signal transmitting section 3034 of the network management node 3030 to the optical control/data signal transmitting/receiving board 3044 of the respective communication nodes as an optical control/data signal related to the wavelength of the wavelength-tunable optical light source. The respective communication nodes receive the information related to the wavelength of the wavelength-tunable optical light source transmitted from the network management node 3030, and set the wavelength of the wavelength-tunable optical light source to the determined wavelength.

Similarly, in the case where the communication node 3202, the communication node 3206, and the communication node 3208 form a logical ring topology information sharing group B (denoted by (B) in FIG. 44) and the flow of an optical packet frame on the logical ring topology is; the communication node 3202→the communication node 3208→the communication node 3206→the communication node 3202, then the control information loaded with a request for connecting the node 3202 to the node 3208, the node 3208 to the node 3206, and the node 3206 to the node 3202 is transmitted from the optical control/data signal transmitting/receiving board 3044 of the respective communication nodes. Control information is received via the optical demultiplexer 3090 by the optical control signal receiving section 3032 of the network management node 3030, and the received information is transmitted to the network management section 3031.

In the network management section 3031, based on the aforementioned basic database, the processor section 3035 determines one of the optical multiplexers 3701 to 3708 to which the packet frame signals input from the input ports of the optical switches 3602, 3606 and 3608 connected to the respective communication nodes should be output, and controls via the optical switch controlling section 3033 so that the packet frame signals input from the input ports of the optical switches 3602, 3606 and 3608 are output to the input side of the desired optical multiplexers 3701 to 3708. At the same time, information of the wavelength which should be set by the wavelength-tunable optical light source in the wavelength-tunable optical light source built-in optical transceiver 3047 of the respective communication nodes is transmitted via the optical control signal transmitting section 3034 of the network management node 3030 to the optical control/data signal transmitting/receiving board 3044 of the respective communication nodes as an optical control/data signal related to the wavelength of wavelength-tunable optical light source. The respective communication nodes receive the information related to the wavelength of the wavelength-tunable optical light source transmitted from the network management node 3030, and set the wavelength of wavelength-tunable optical light source to the determined wavelength.

Next is a description of the flow of an optical packet frame in the condition where the information sharing group A and the information sharing group B form two logical ring topologies. First is a description of the flow of an optical packet frame of the information sharing group A.

An optical packet frame signal output from the communication node 3201, passes through the optical switch 3601, the optical multiplexer 3701, the optical input port 3011 of the path establishment circuit 3101, the output port 3023 of the path establishment circuit and the optical multiplexer 3091, and is received by the optical transceiver 3047 of the shared memory board 3043 of the communication node 3203. Here, the wavelength of the optical packet frame signal output from the communication node 3201 is set to $\lambda 3$ based on the wavelength-routing characteristics (FIG. 48) of the path establishment circuit 3101. The optical packet frame signal transmitted from the communication node 3201 and received by the optical transceiver 3047 of the communication node 3203, after the processing in the frame transfer processing circuit 3432 of the communication node 3203, is output as an optical packet frame signal from the optical transceiver 3047.

An optical packet frame signal output from the communication node 3203, passes through the optical switch 3603, the optical multiplexer 3703, the input port 3013 of the path establishment circuit 3101, the output port 3024 of the path establishment circuit and the optical multiplexer 3091, and is received by the optical transceiver 3047 of the shared memory board 3043 of the communication node 3204. Here, the wavelength of the optical packet frame signal output from the communication node 3203 is set to $\lambda 2$ based on the wavelength-routing characteristics (FIG. 48) of the path establishment circuit 3101. The optical packet frame signal transmitted from the communication node 3203 and received by the optical transceiver 3047 of the communication node 3204, after the processing in the frame transfer processing circuit 3432 of the communication node 3204, is output as an optical packet frame signal from the optical transceiver 3047.

An optical packet frame signal output from the communication node 3204, passes through the optical switch 3604, the optical multiplexer 3705, the input port 3015 of the path establishment circuit 3102, the output port 3027 of the path establishment circuit and the optical multiplexer 3091, and is received by the optical transceiver 3047 of the shared memory board 3043 of the communication node 3207. Here, the wavelength of the optical packet frame signal output from the communication node 3204 is set to $\lambda 3$ based on the wavelength-routing characteristics (FIG. 49) of the path establishment circuit 3102. The optical packet frame signal transmitted from the communication node 3204 and received by the optical transceiver 3047 of the communication node 3207, after the processing in the frame transfer processing circuit 3432 of the communication node 3207, is output as an optical packet frame signal from the optical transceiver 3047.

An optical packet frame signal output from the communication node 3207, passes through the optical switch 3607, the optical multiplexer 3707, the input port 3017 of the path establishment circuit 3102, the output port 3025 of the path establishment circuit and the optical multiplexer 3091, and is received by the optical transceiver 3047 of the shared memory board 3043 of the communication node 3205. Here, the wavelength of the optical packet frame signal output from the communication node 3207 is set to $\lambda 3$ based on the wavelength-routing characteristics (FIG. 49) of the path establishment circuit 3102. The optical packet frame signal transmitted from the communication node 3207 and received by the optical transceiver 3047 of the communication node 3205, after the processing in the frame transfer processing circuit 3432 of the communication node 3205, is output as an optical packet frame signal from the optical transceiver 3047.

An optical packet frame signal output from communication node 3205, passes through the optical switch 3605, the optical multiplexer 3704, the input port 3014 of the path establishment circuit 3101, the output port 3021 of the path establishment circuit and the optical multiplexer 3091, and is received by the optical transceiver 3047 of the shared memory board 3043 of the communication node 3201. Here, the wavelength of the optical packet frame signal output from the communication node 3205 is set to $\lambda 4$ based on the wavelength characteristics (FIG. 48) of the path establishment circuit 3101. The optical packet frame signal transmitted from the communication node 3205 and received by the optical transceiver 3047 of the communication node 3201, after the processing in the frame transfer processing circuit 3432 of the communication node 3201, is output as an optical packet frame signal from the optical transceiver 3047.

In this manner, the connection of the communication nodes circulates sequentially from the communication node 3201→the communication node 3203→the communication node 3204→the communication node 3207→the communication node 3205→the communication node 3201, so that the connection of these communication nodes forms a logical ring topology.

Next is a description of the flow of a packet frame of the information sharing group B.

Firstly, an optical packet frame signal output from the communication node 3202, passes through the optical switch 3602, the optical multiplexer 3706, the input port 3016 of the path establishment circuit 3102, the output port 3028 of the path establishment circuit and the optical multiplexer 3091, and is received by the optical transceiver 3047 of the shared memory board 3043 of the communication node 3208. Here, the wavelength of the optical packet frame signal output from the communication node 3201 is set to $\lambda 1$ based on the wavelength-routing characteristics (FIG. 49) of the path establishment circuit 3102. The optical packet frame signal transmitted from the communication node 3202 and received by the optical transceiver 3047 of the communication node 3208, after the processing in the frame transfer processing circuit 3432 of the communication node 3208, is output as an optical packet frame signal from the optical transceiver 3047.

An optical packet frame signal output from the communication node 3208, passes through the optical switch 3608, the optical multiplexer 3708, the input port 3018 of the path establishment circuit 3102, the output port 3026 of the path establishment circuit and the optical multiplexer 3091, and is received by the optical transceiver 3047 of the shared memory board 3043 of the communication node 3206. Here, the wavelength of the optical packet frame signal output from the communication node 3208 is set to λ1 based on the wavelength-routing characteristics (FIG. 49) of the path establishment circuit 3102. The optical packet frame signal transmitted from the communication node 3208 and received by the optical transceiver 3047 of the communication node 3206, after the processing in the frame transfer processing circuit 3432 of the communication node 3206, is output as an optical packet frame signal from the optical transceiver 3047.

An optical packet frame signal output from the communication node 3206, passes through the optical switch 3606, the optical multiplexer 3702, the input port 3012 of the path establishment circuit 3101, the output port 3022 of the path establishment circuit and the optical multiplexer 3091, and is received by the optical transceiver 3047 of the shared memory board 3043 of the communication node 3202. Here, the wavelength of the optical packet frame signal output from the communication node 3206 is set to λ3 based on the wavelength-routing characteristics (FIG. 48) of the path establishment circuit 3101. The optical packet frame signal transmitted from the communication node 3206 and received by the optical transceiver 3047 of the communication node 3202, after the processing in the frame transfer processing circuit 3432 of the communication node 3202, is output as an optical packet frame signal from the optical transceiver 3047.

In this manner, the connection of the communication nodes circulates sequentially from the communication node 3202→the communication node 3206→the communication node 3208, so that the connection of these communication nodes forms a logical ring topology.

In the description above, the optical input port and optical output port pairs of the path establishment circuit were described as four pairs, however the optical input port and optical output port pairs of the path establishment circuit are not limited to four pairs and may have multiple pairs. Also, the path establishment circuits were described as having the same number of optical input port and optical output port pairs, however the respective path establishment circuits may have different numbers of optical input port and optical output port pairs. Furthermore, it was configured by two units of path establishment circuits, however the number of units is not limited.

Moreover, as the path establishment circuits 3101 to 3102, cyclic-wavelength characteristics arrayed waveguide gratings (AWG) made of Silica-glass optical waveguides or the like are applicable, however they are not limited to this as long as they are wavelength-routing devices in which the output ports can be controlled by wavelengths.

Furthermore, as the 1×5 optical switches 3601 to 3608, Mach-Zehnder type optical switches made of Silica-glass optical waveguides or the like are applicable, however, they are not limited to this as long as they are optical devices having a function for outputting an input optical signal to any one direction of eight directions.

EMBODIMENT 14

Figure 50:
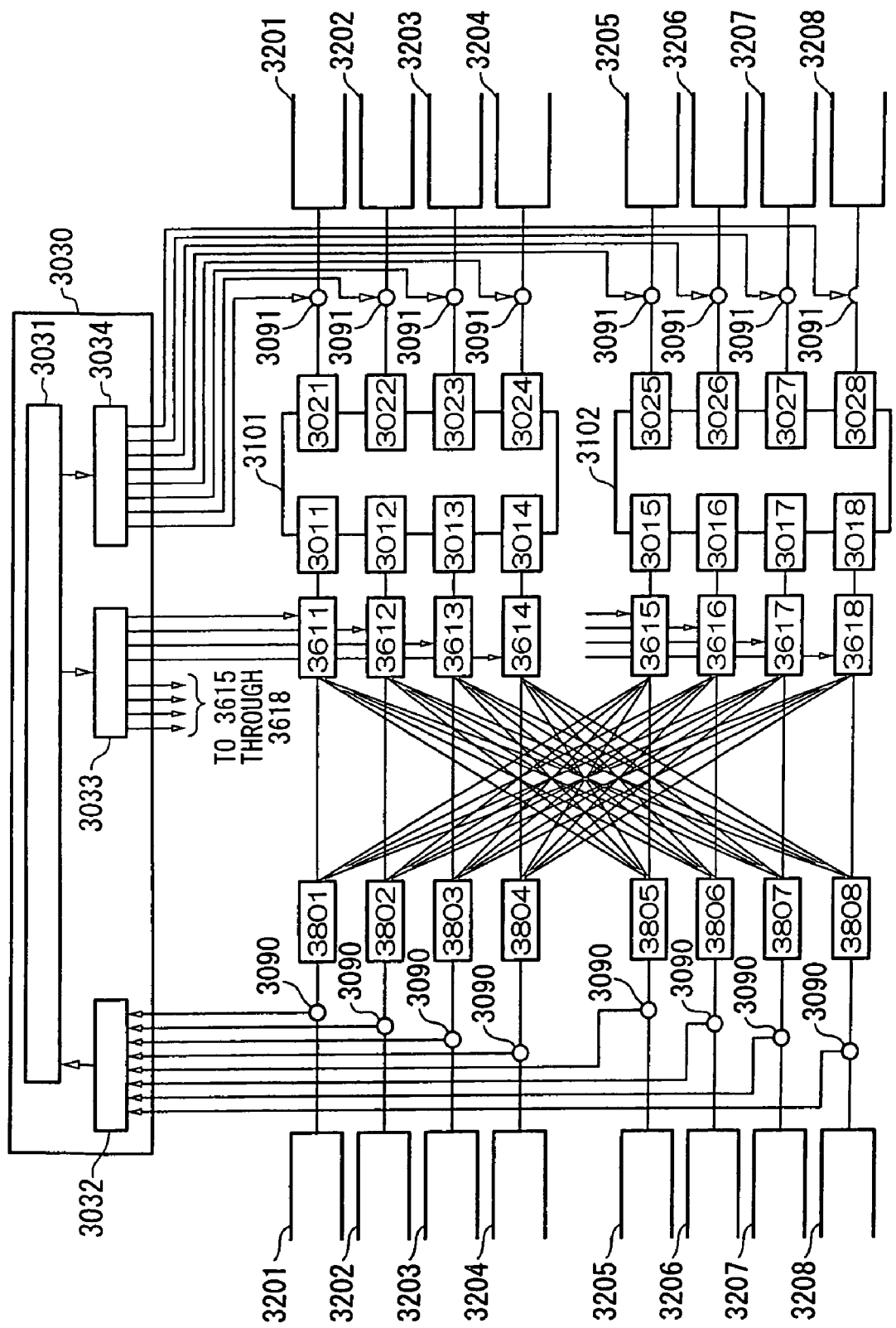
FIG. 50 is a diagram showing an overall configuration of an information sharing system according to a fourteenth embodiment of the present invention.

Next is a description of another configuration of an information sharing system for sharing images between the respective communication nodes, using an optical communication system which accommodates the eight communication nodes 3201 to 3208, with reference to FIG. 50. In FIG. 50, reference symbols 3611 to 3618 denote 5×1 optical switches having five input ports and one output port, and reference symbols 3801 to 3808 denote 1×5 optical splitters having one input port and 5 output ports. The input ports of the optical splitter 380x (x is an integer from 1 to 8) are connected to a communication node 320x by optical fibers, and the output ports of the optical splitter 380x are connected to the input ports of the corresponding 5×1 optical switches 3611 to 3618 and the input ports of all of the 5×1 optical switches 3611 to 3618 connected to the other path establishment circuit. Furthermore, the output ports of the 5×1 optical switch 361x (x is an integer from 1 to 4) are respectively connected to the optical input signal port 301x of the path establishment circuit 3101, and the output ports of the 5×1 optical switch 361y (y is an integer from 5 to 8) are respectively connected to the optical input signal port 301y of the path establishment circuit 3102.

The difference between the configuration shown in FIG. 50 and the configuration shown in FIG. 44 is that the 1×5 optical splitters are arranged on the positions of the optical switches 3601 to 3608 in the configuration shown FIG. 44, and the 5×1 optical switches are arranged on the positions of the optical multiplexers 3701 to 3708 in the configuration shown FIG. 44. The other configuration is the same, and also the operation of the information sharing group formation and the like is the same. Therefore, detailed description is omitted.

Between the multiple communication nodes, in principle there is no master and slave relationship. However, a specific communication node may have a function of determining the timing for starting the flow of a new packet frame, and a function of supervising the size of a segment to be added in the case of adding a new packet frame to a packet frame which is already flowing. As a result, it becomes possible to avoid problems such as the collision of packet frames, or a condition where information included in a packet frame can not be loaded in the memory in the communication node.

EMBODIMENT 15

In the optical communication system accommodating eight communication nodes shown in FIG. 44, a description is given of an embodiment related to fault avoidance in the case where a fault occurs. The configuration of the respective communication nodes is the same as in FIG. 45. Furthermore, the relationship between the wavelengths of the path establishment circuit 3101 and the path establishment circuit 3102 and the optical input/output ports is as shown in FIG. 48 and FIG. 49 respectively.

By the operation procedure described in the thirteenth embodiment of the present invention, logical ring topology information sharing (information sharing group A) configured by the communication node 3201, the communication node 3203, the communication node 3204, the communication node 3205, and the communication node 3207, and logical ring topology information sharing (information sharing group B) configured by the communication node 3202, the communication node 3206, and the communication node 3208 are formed (FIG. 44).

In the present embodiment, a description is given of how the information sharing group avoids a faulty part and continues the operation of information sharing for the information sharing group A, in the case where an optical fiber for connecting between the optical switch 3601 and the optical multiplexer 3701 is disconnected.

<Procedure for Fault Detection>

In the information sharing group A, an optical packet frame for transmitting the information of the respective communication nodes, sequentially circulates on a logical ring topology of the communication node 3201→the communication node 3203→the communication node 3204→the communication node 3207→the communication node 3205→the communication node 3201.

Figure 51:
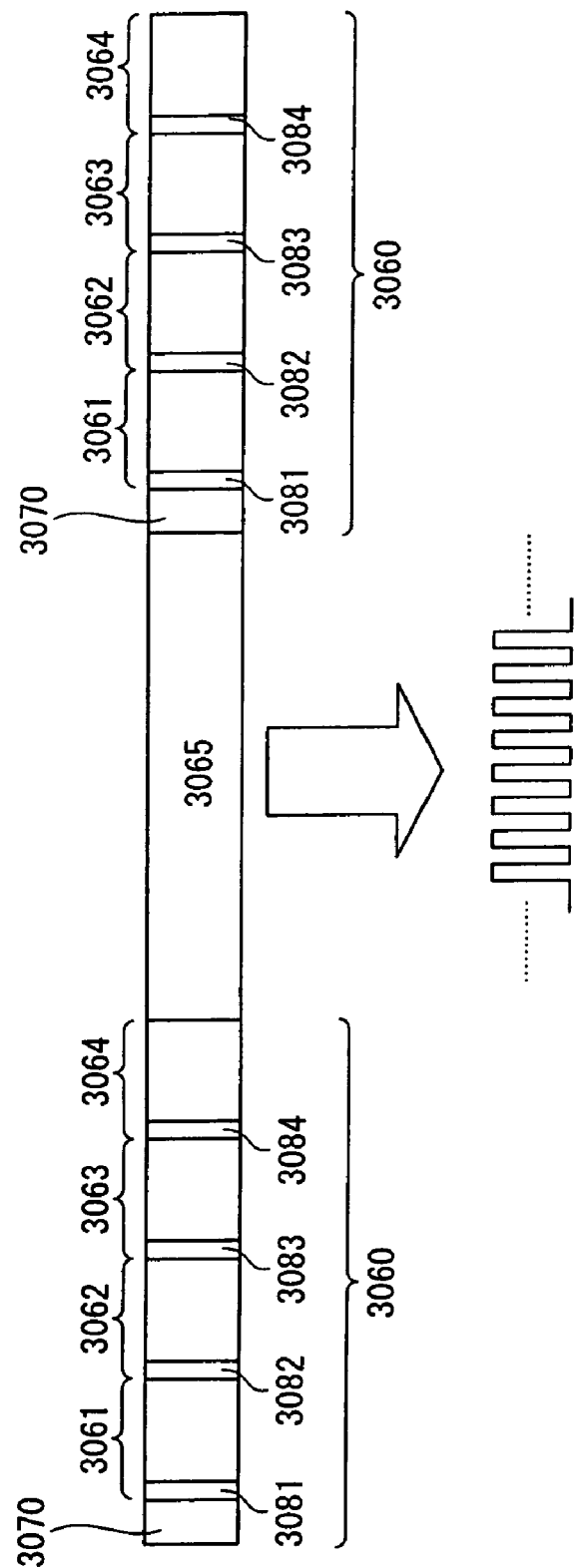
FIG. 51 is a diagram showing a configuration of a packet frame, in the fourteenth embodiment of the present invention.

An optical packet frame output from the communication node 3201, passes through the optical demultiplexer 3090, the optical switch 3601, the optical multiplexer 3701, the optical input port 3011 of the path establishment circuit 3101, the optical output port 3023 of the path establishment circuit 3101 and the optical multiplexer 3091, and is received by the optical receiver of the optical transceiver 3047 in the shared memory board 3043 of the communication node 3203. Here, between the respective optical packet frames (denoted by reference symbol 3065 in FIG. 51), the optical power is not zero (silent condition), and is filled with an optical bit string signal which does not have meaning as information. This bit string signal is called an idle signal. For example, it is an alternating signal of "10101010 . . . " as shown in FIG. 51. Here, "1" is the condition with optical power and "0" is the condition without optical power. In FIG. 51, for convenience of description, the duration of the condition of "1" and the condition of "0" is drawn exaggerated.

In the case where an optical fiber for connecting between the optical switch 3601 and the optical multiplexer 3701 is disconnected due to some fault, the optical signals do not reach to the optical receiver of the optical transceiver 3047 of the communication node 3203, so that the optical receiver detects the disconnection of the optical signals. The communication node 3203 then notifies the detected information for optical signal disconnection, from the optical control/data signal transmitting/receiving board 3044 of the communication node 3203 to the network management node 3030.

The network management node 3030 receives the detected information for optical signal disconnection transmitted by the communication node 3203, by the optical control signal receiving section 3032, and transmits the information to the processor section 3035.

The network management node 3030, on receipt of the detected information for optical signal disconnection from the communication node 3203, transmits halting instruction information (hereunder, called optical output halting instruction information) for halting the optical outputs of the wavelength-tunable optical light sources of the respective communication nodes, from the optical control signal transmitting section 3034 to the other communication nodes of the information sharing group A to which the communication node 3203 belongs (the communication node 3201, the communication node 3204, the communication node 3205 and the communication node 3207). At this time, the optical receivers of the respective optical transceivers 3047 of the communication node 3201, the communication node 3204, the communication node 3205 and the communication node 3207 detect the disconnection of the optical signal. However, since they have received the aforementioned optical output halting instruction information, they do not transmit the detected information for optical signal disconnection to the network management node 3030.

When a predetermined time t1 has elapsed after transmitting the aforementioned detected information for optical signal disconnection, the communication node 3203 transmits information (hereunder called "own communication node optical transmitter cutoff information") to cutoff output from the optical transmitter of its own optical transceiver 3047 to the network management node 3030. The communication node 3203, after transmitting the own communication node optical transmitter cutoff information, cuts off output from its own optical transceiver 3047.

Hereunder is a description of a method for determining the value of time t1.

At the time of constructing the system, the time required from when the communication node transmits the detected information for optical signal disconnection to the network management node 3030 until the network management node 3030 transmits the optical output halting instruction information from the optical control signal transmitting section 3034 (denoted by T1) is measured beforehand for each of the respective communication nodes. Assuming that the maximum value of the time T1 is T1M, the time t1 is set to a value which satisfies t1>T1M.

After cutting off the output of the optical transceiver 3047 of the communication node 3203, the optical signals do not reach to the optical receiver of the optical transceiver 3047 of the communication node 3204, so that the optical receiver of the communication node 3204 detects the disconnection of the optical signals. However, the communication node 3204 has already received the optical output halting instruction information from the network management node 3030, so that it does not transmit the detected information for optical signal disconnection.

At this stage, the optical outputs of the wavelength-tunable optical light sources of all the communication nodes constituting the information sharing group to which the communication node 3203 belongs, are halted.

Next, the processor section 3035 of the network management node 3030 identifies the cause of the optical signal disconnection in the optical receiver of the optical transceiver 3047 of the communication node 3203, from following four cases.

Fault candidate 1: An optical fiber is disconnected somewhere between the communication node 3201 and the optical input port 3011 of the path establishment circuit 3101.

Fault candidate 2: An optical transmitter of the optical transceiver 3047 of the communication node 3201 is faulty so that optical signals are no longer output.

Fault candidate 3: An optical fiber for connecting the optical output port 3023 of the path establishment circuit 3101 and the optical multiplexer 3091 is disconnected.

Fault candidate 4: An optical fiber for connecting the optical multiplexer 3091 and the communication node 3203 is disconnected.

Figure 52A:
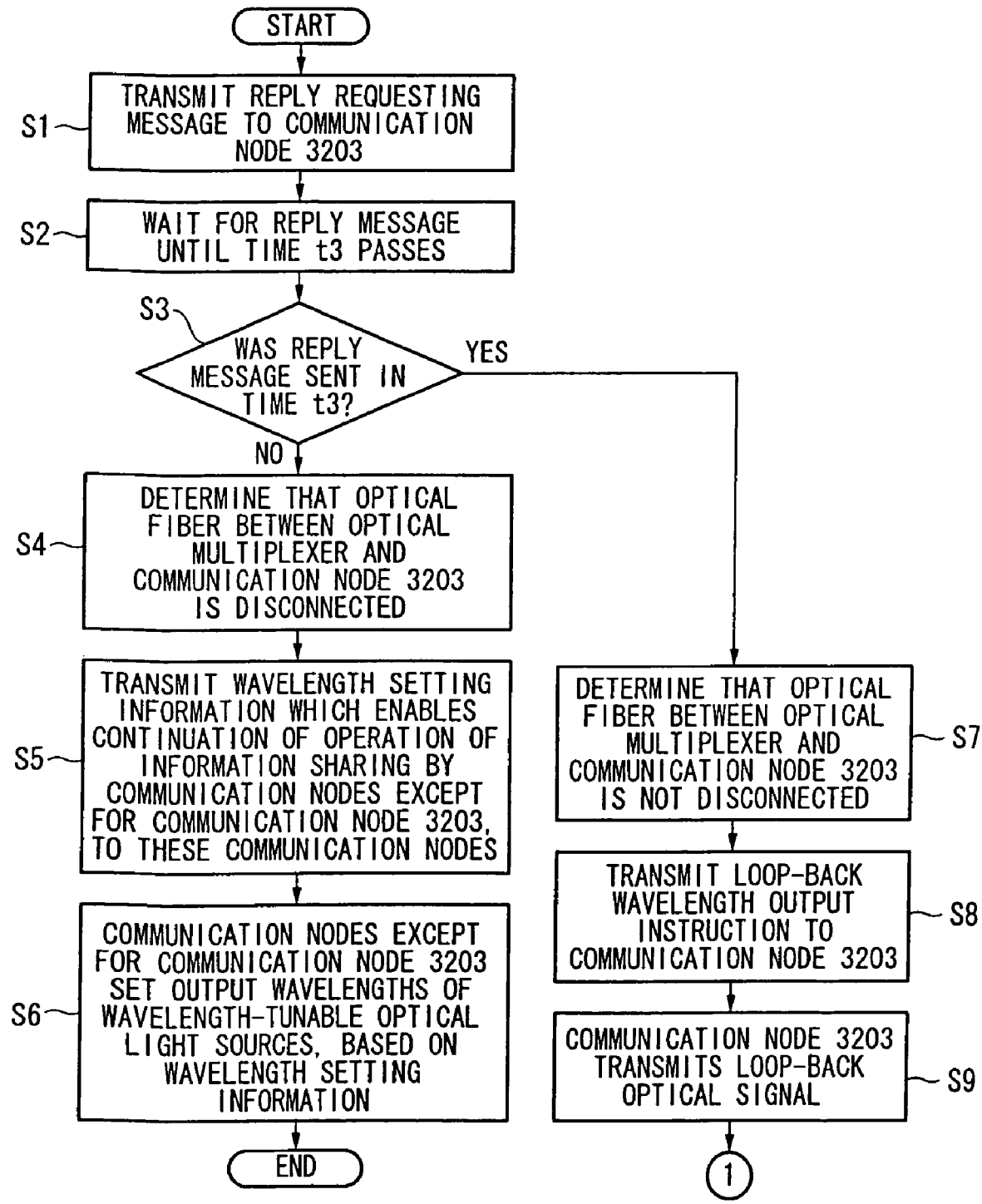
Figure 53:
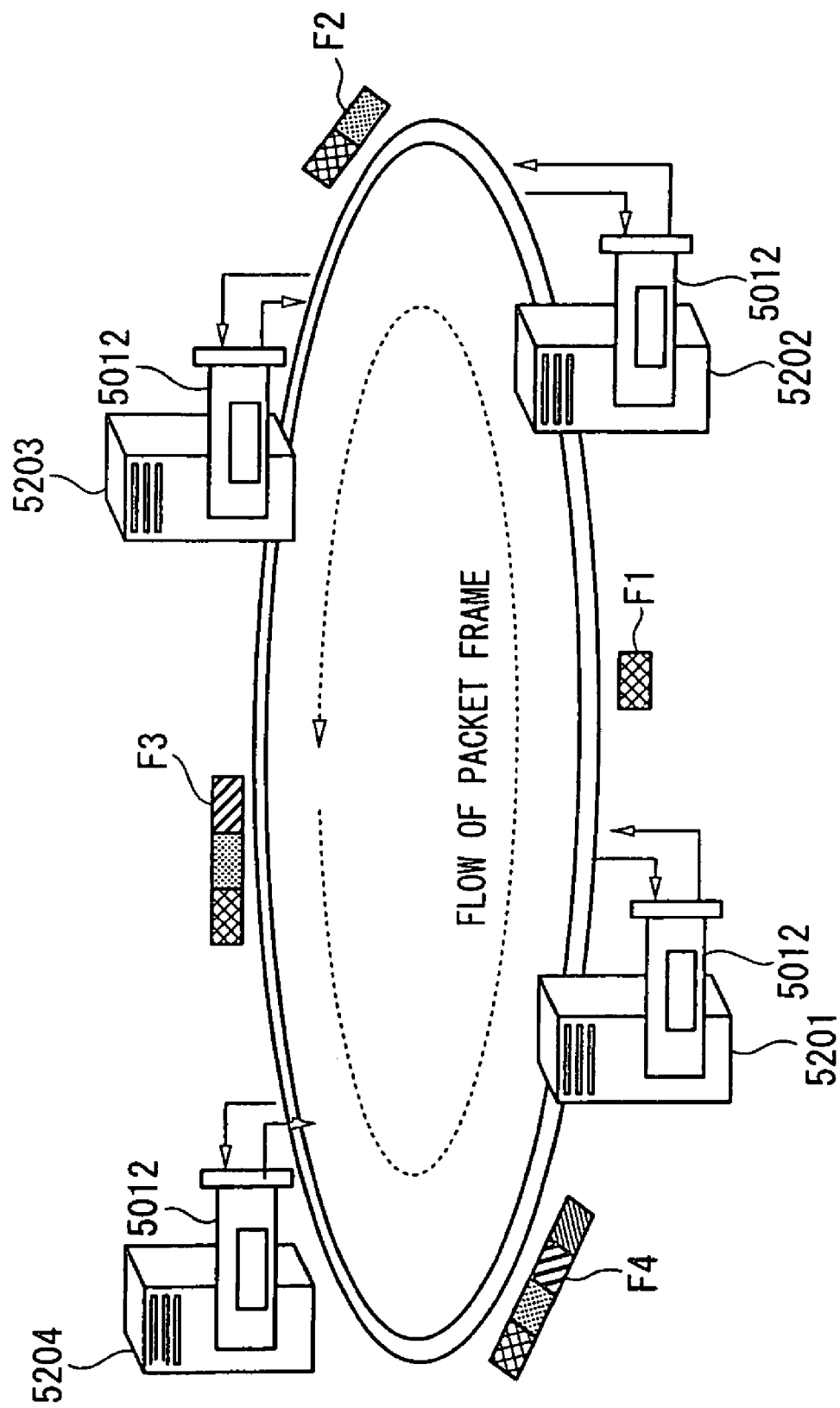
FIG. 53 is a block diagram showing an example of an information sharing system.
Figure 54A:
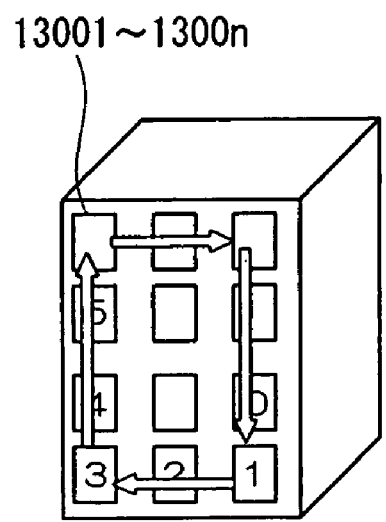
FIG. 54A and FIG. 54B are block diagrams showing an example of an optical communication system according to a token ring scheme.
Figure 54B:
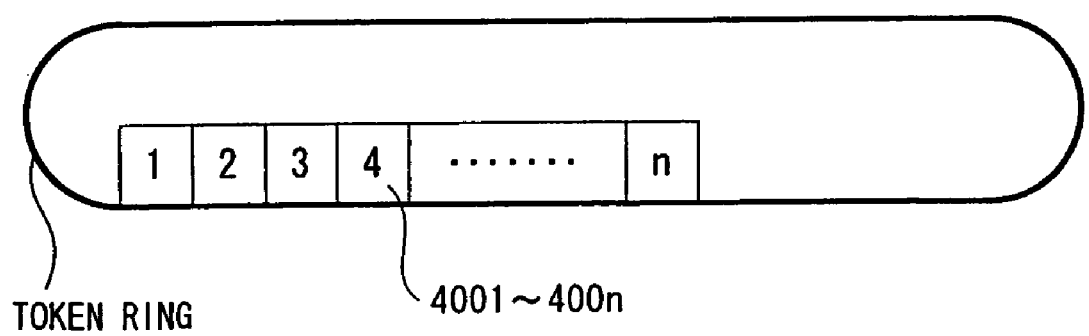

Firstly, the network management node 3030 in order to query the condition (presence of a disconnection) of an optical fiber 3123 for connecting the communication node 3203 and the optical multiplexer 3091, sends a reply requesting message from the optical control signal transmitting section 3034 to the communication node 3203 (step S1 of the flowchart in FIG. 52A).

After step S1, the network management node 3030 waits for a reply message from the communication node 3203 during the preset time t2 (step S2 in FIG. 52A).

Hereunder is a description of a method for determining the value of time t2.

At the time of constructing the system, the network management node 3030 transmits a reply requesting message to the communication nodes, and measures the time required (T2) from transmission of the reply requesting messages until the reply message reaches the respective communication nodes beforehand for each of the respective communication nodes. Assuming that the maximum value of the time T2 is T2M, the time t2 is set to a value which satisfies t2>T2M.

In the case where the reply message is not transmitted from the communication node 3203 during the time t2 (determination result of step S3 in FIG. 52A is NO), the network management node 3030 determines that the optical fiber 3123 is disconnected (this is fault candidate 4) (step S4 in FIG. 52A).

After step S4, the network management node 3030 carries out a step for continuing the operation of information sharing by the communication nodes other than the communication node 3203 in the information sharing group A (the communication node 3201, the communication node 3204, the communication node 3205 and the communication node 3207).

That is to say, the network management node 3030, based on the relationship between the respective input/output ports and the wavelengths of the path establishment circuit 3101 and the path establishment circuit 3102 (FIG. 48 and FIG. 49); transmits wavelength setting information for setting the output wavelength of the wavelength-tunable optical light source of the optical transceiver 3047 of the communication node 3201 to $\lambda 4$ and for optical outputting, from the optical control signal transmitting section 3034 to the communication node 3201; transmits wavelength setting information for setting the output wavelength of the wavelength-tunable optical light source of the optical transceiver 3047 of the communication node 3204 to $\lambda 3$ and for optical outputting, from the optical control signal transmitting section 3034 to the communication node 3204; transmits wavelength setting information for setting the output wavelength of the wavelength-tunable optical light source of the optical transceiver 3047 of the communication node 3207 to $\lambda 3$ and for optical outputting, from the optical control signal transmitting section 3034 to the communication node 3207; and transmits wavelength setting information for setting the output wavelength of the wavelength-tunable optical light source of the optical transceiver 3047 of the communication node 3205 to $\lambda 4$ and for optical outputting, from the optical control signal transmitting section 3034 to the communication node 3205 (step S5 in FIG. 52A).

The communication node 3201, the communication node 3204, the communication node 3205 and the communication node 3207 which receive this wavelength setting information, set the wavelengths of the respective wavelength-tunable optical light sources to $\lambda 4$, $\lambda 3$, $\lambda 4$ and $\lambda 3$ and output optical signals (step S6 in FIG. 52A).

As a result, in the information sharing group A, an optical packet frame for transmitting the information of the respective communication nodes, sequentially circulates on a logical ring topology of the communication node 3201→the communication node 3204→the communication node 3207→the communication node 3205→the communication node 3201, so that it is possible to continue the information sharing in a condition with the communication node 3203 separated.

On the other hand, in the case where the reply message is transmitted from the communication node 3203 during the time t2 (determination result of step S3 is YES), the network management node 3030 determines that the optical fiber 3123 is not disconnected (step S7 in FIG. 52A).

Next, the network management node 3030 transmits from the optical control signal transmitting section 3034 to the communication node 3203, instruction information for setting the output wavelength of its own wavelength-tunable optical light source to a wavelength for returning to its own communication node 3203, that is to $\lambda 1$ (based on FIG. 48) and for optical outputting (hereunder, called "loop-back wavelength outputting instruction") (step S8 in FIG. 52A).

The communication node 3203 on receiving the loop-back wavelength outputting instruction from the network management node 3030, sets the wavelength of its own wavelength-tunable optical light source to $\lambda 1$ and transmits an optical signal (hereunder, called "loop-back optical signal") (step S9 in FIG. 52A).

In the case where the optical receiver of the optical transceiver 3047 of the communication node 3203 receives the loop-back optical signal (determination result of step S10 in FIG. 52B is YES), the communication node 3203 transmits loop-back optical signal receiving information to the network management node 3030 (step S11 in FIG. 52B).

By receiving the loop-back optical signal receiving information, the network management node 3030 determines that the fault is neither fault candidate 3 nor fault candidate 4 (step S12 in FIG. 52B).

On receiving the result of step S12, the network management node 3030 determines that a fault has occurred between the communication node 3201 and the optical input port 3011 of the path establishment circuit 3101, or that the optical transmitter of the optical transceiver 3047 of the communication node 3201 is faulty so that the optical signal can no longer be output (step S113 in FIG. 52B).

After step S13, the network management node 3030, in order to continue the operation of the information sharing group A by the communication nodes except for the communication node 3201, based on the relationship between the respective input/output ports and the wavelengths of the path establishment circuit 3101 and the path establishment circuit 3102 (FIG. 48 and FIG. 49), transmits to the communication node 3203, the communication node 3204, the communication node 3205 and the communication node 3207 instruction information for setting the wavelengths of the wavelength-tunable optical light sources of the respective communication nodes to $\lambda 2$, $\lambda 3$, $\lambda 2$ and $\lambda 3$ and for optical outputting (step S14 in FIG. 52B).

When the respective communication nodes receive the instruction information, they set the wavelengths of their own wavelength-tunable optical light sources based on the instruction information and output optical signals (step S15 in FIG. 52B).

After step S15, in the information sharing group A, an optical packet frame signal for transmitting the information of the respective communication nodes, sequentially circulates on a logical ring topology of the communication node 3203→the communication node 3204→the communication node 3207→the communication node 3205→the communication node 3203, so that it is possible to continue the operation of information sharing.

On the other hand, in the case where the optical receiver of the optical transceiver 3047 of the communication node 3203 could not receive the loop-back optical signal (determination result of step S110 is NO), the communication node 3203 transmits information showing that the loop-back optical signal could not be received, to the network management node 3030 (step S16 in FIG. 52B).

By receiving the information, the network management node 3030 determines that the fault is the fault candidate 4 (step S17 in FIG. 52B).

After step S17, the network management node 3030, in order to continue the operation of the information sharing group A by the communication nodes except for the communication node 3203, based on the relationship between the respective input/output ports and the wavelengths of the path establishment circuit 3101 and the path establishment circuit 3102 and the wavelengths (FIG. 48 and FIG. 49), transmits to the communication node 3201, the communication node 3204, the communication node 3205 and the communication node 3207 instruction information for setting the wavelengths of the wavelength-tunable optical light sources of the respective communication nodes to λ4, λ3, λ2 and λ4 and for optical outputting (step S18 in FIG. 52B).

When the respective communication nodes receive the instruction information, they set the wavelengths of their own wavelength-tunable optical light sources based on the instruction information and output optical packet frame signals (step S19 in FIG. 52B).

Accordingly, in the information sharing group A, an optical packet frame for transmitting the information of the respective communication nodes, sequentially circulates on a logical ring topology of the communication node 3201→the communication node 3204→the communication node 3207→the communication node 3205→the communication node 3201, so that it is possible to continue the operation of information sharing.

By the above-described procedure, in the case where an optical fiber for connecting between the optical switch 3601 and the optical multiplexer 3701 is disconnected in the information sharing group A, the information sharing group avoids the faulty part and continues the operation of information sharing.

As described above, a logical ring topology is formed using the wavelength-routing characteristics of an arrayed waveguide grating, and wavelength-tunable optical light sources. Hence, even in the case where a fault occurs for some reason in one of the communication nodes constituting the logical ring topology, it is possible to bypass the faulty node and to easily form a new logical ring topology by changing the routing. Furthermore, a logical grouping of communication nodes becomes possible, and dynamically changing this grouping or forming a new grouping can be easily realized.

Moreover, in the abovementioned thirteenth to fifteenth embodiments, a description is given of the configuration and operation of a control system where the network management node 3030 is the main constituent, with the example being given of the case applied to an optical communication system provided with multiple wavelength path establishment circuits as described in the fifth to twelfth embodiments. However, by omitting the control related to the optical switches 3601 to 3608 from within the controls that the aforementioned control system carries out, then this can be similarly applied to the optical communication system which uses only one wavelength path establishment circuit as described in the first to fourth embodiments.

An optical communication system of the present invention can also be applied to usage where information sharing between respective communication nodes is essential. For example, this is applicable to the following systems:

(1) High quality image sharing systems in hospitals, CAD data real time editing, image sharing systems inside an intranet, such as for image source real time editing at broadcasting stations.

(2) Information sharing systems for FA, such as production line control systems, process control systems and the like.

(3) Distributed processing systems for on line distributed processing, computer clustering (cooperative operation between CPUs) and the like.

(4) Monitoring systems for monitoring atomic power plants, bank counters, and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical communication system comprising:
   an N×N wavelength path establishment circuit having N input ports and N output ports, N being an integer of at least 2, outputting light input from an input port to a different output port depending on the wavelength of the input light, and the wavelength of light output from an output port being different depending on the input port;
   n communication nodes, n being an integer at least 2 and not greater than N, for outputting information of an input optical signal, as is or after changing a part of the information, as an optical signal of a predetermined wavelength; and
   optical waveguides for connecting the input ports and the output ports of the N×N wavelength path establishment circuit, and the communication nodes,
   wherein for at least some of the n communication nodes, in order to form a first logical-ring transmission path where an optical signal transmitted from one communication node circulates in a clockwise direction and returns to the one communication node via other communication nodes or to form both the first logical-ring transmission path and a second logical-ring transmission path where an optical signal transmitted from the one communication node circulates in a counterclockwise direction and returns to the one communication node via the other communication nodes, a correlation of wavelengths for connecting between the input ports and the output ports of the N×N wavelength path establishment circuit, wavelengths of optical signals output from the respective communication nodes, and connections between the input ports and the output ports of the N×N wavelength path establishment circuit, and the respective communication nodes are set.

2. An optical communication system comprising:
   an N×N wavelength path establishment circuit having N input ports and N output ports, N being an integer of at least 2, outputting light input from an input port to a different output port depending on the wavelength of the input light and the wave length of light output from an output port being different depending on the input port;
   n communication nodes, n being an integer at least 2 and not greater than N, for outputting information of an input optical data signal, as is or after changing a part of the information, as an optical data signal of a predetermined wavelength; and
   optical waveguides for connecting the input ports and the output ports of the N×N wavelength path establishment circuit, and the communication nodes,
   wherein for at least some of the n communication nodes, in order to form at least two logical-ring transmission paths where an optical data signal transmitted from one communication node returns to the one communication node via other communication nodes, a correlation of wavelengths for connecting between the input ports and the output ports of the N×N wavelength path establishment circuit, wavelengths of at least two optical data signals output from the respective communication nodes, and connections between the input ports and the output ports of the N×N wavelength path establishment circuit, and the respective communication nodes are set.

3. An optical communication system according to claim 2, wherein each communication nodes is provided with:

a device which transfers the optical data signal so that an optical data signal loaded with information of communication nodes circulates the respective communication nodes forming the logical-ring transmission path;

a memory for storing information of the optical data signal which has been received; and a transfer device which writes the information of the optical data signal to the memory, and appends information to the optical data signal which is transmitted.

4. An optical communication system according to claim 3, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

5. An optical communication system according to claim 2, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

6. An optical communication system comprising:

an N×N wavelength path establishment circuit having N input ports and N output ports, N being an integer of at least 2, outputting light input from an input port to a different output port depending on the wavelength of the input light, and the wavelength of light output from an output port being different depending on the input port;

n communication nodes, n being an integer at least 2 and not greater than N, for outputting information of an input optical data signal, as is or after changing a part of the information, as an optical data signal of a predetermined wavelength; and optical waveguides for connecting the input ports and the output ports of the N×N wavelength path establishment circuit, and the communication nodes, wherein for at least some of the n communication nodes, in order to form at least one logical-ring transmission path where an optical data signal transmitted from one communication node returns to the one communication node via other communication nodes, a correlation of wavelengths for connecting between the input ports and the output ports of the N×N wavelength path establishment circuit, wavelengths of optical data signals out put from the respective communication nodes, and connections between the input ports and the output ports of the N×N wavelength path establishment circuit, and the respective communication nodes are set, and each communication node sets the wavelength of an optical control signal for link query between the communication nodes which is output so as to form the logical-ring transmission path where the optical control signal circulates in reverse to the optical data signal.

7. An optical communication system according to claim 6, wherein each communication node splits a part of an input optical data signal and transmits the split optical data signal as the optical control signal for link query.

8. An optical communication system according to claim 7, wherein a communication node which cannot receive the optical control signal for link query sets the output wavelength of the optical data signal to a wavelength corresponding to a communication node which skips at least the next communication node on the transmission path of the optical data signal.

9. An optical communication system according to claim 8, wherein each communication nodes is provided with:

a device which transfers the optical data signal so that an optical data signal loaded with information of communication nodes circulates the respective communication nodes forming the logical-ring transmission path;

a memory for storing information of the optical data signal which has been received; and a transfer device which writes the information of the optical data signal to the memory, and appends information to the optical data signal which is transmitted.

10. An optical communication system according to claim 9, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

11. An optical communication system according to claim 8, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

12. An optical communication system according to claim 7, wherein each communication nodes is provided with:

a device which transfers the optical data signal so that an optical data signal loaded with information of communication nodes circulates the respective communication nodes forming the logical-ring transmission path;

a memory for storing information of the optical data signal which has been received; and a transfer device which writes the information of the optical data signal to the memory, and appends information to the optical data signal which is transmitted.

13. An optical communication system according to claim 12, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

14. An optical communication system according to claim 7, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

15. An optical communication system according to claim 6, wherein each communication node configures a leading part of the optical data signal with an unmodulated signal, modulates the unmodulated part of the optical data signal input to each communication node, and transmits the modulated optical data signal as the optical control signal for link query.

16. An optical communication system according to claim 15, wherein a communication node which cannot receive the optical control signal for link query sets the output wavelength of the optical data signal to a wavelength corresponding to a communication node which skips at least the next communication node on the transmission path of the optical data signal.

17. An optical communication system according to claim 16, wherein each communication nodes is provided with:
a device which transfers the optical data signal so that an optical data signal loaded with information of communication nodes circulates the respective communication nodes forming the logical-ring transmission path;
a memory for storing information of the optical data signal which has been received; and
a transfer device which writes the information of the optical data signal to the memory, and appends information to the optical data signal which is transmitted.

18. An optical communication system according to claim 17, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

19. An optical communication system according to claim 16, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

20. An optical communication system according to claim 15, wherein each communication nodes is provided with:
a device which transfers the optical data signal so that an optical data signal loaded with information of communication nodes circulates the respective communication nodes forming the logical-ring transmission path;
a memory for storing information of the optical data signal which has been received; and
a transfer device which writes the information of the optical data signal to the memory, and appends information to the optical data signal which is transmitted.

21. An optical communication system according to claim 20, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

22. An optical communication system according to claim 15, further comprising a management device which monitors and controls the condition of the respective communication nodes, wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

23. An optical communication system according to claim 6, wherein a communication node which cannot receive the optical control signal for link query sets the output wavelength of the optical data signal to a wavelength corresponding to a communication node which skips at least the next communication node on the transmission path of the optical data signal.

24. An optical communication system according to claim 23, wherein each communication nodes is provided with:
a device which transfers the optical data signal so that an optical data signal loaded with information of communication nodes circulates the respective communication nodes forming the logical-ring transmission path;
a memory for storing information of the optical data signal which has been received; and
a transfer device which writes the information of the optical data signal to the memory, and appends information to the optical data signal which is transmitted.

25. An optical communication system according to claim 24, further comprising a management device which monitors and controls the condition of the respective communication nodes,
wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

26. An optical communication system according to claim 23, further comprising a management device which monitors and controls the condition of the respective communication nodes,
wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

27. An optical communication system according to claim 6, wherein each communication nodes is provided with:
a device which transfers the optical data signal so that an optical data signal loaded with information of communication nodes circulates the respective communication nodes forming the logical-ring transmission path;
a memory for storing information of the optical data signal which has been received; and
a transfer device which writes the information of the optical data signal to the memory, and appends information to the optical data signal which is transmitted.

28. An optical communication system according to claim 27, further comprising a management device which monitors and controls the condition of the respective communication nodes,
wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

29. An optical communication system according to claim 6, further comprising a management device which monitors and controls the condition of the respective communication nodes,
wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

30. An optical communication system comprising:
an N×N wavelength path establishment circuit having N input ports and N output ports, N being an integer of at least 2, outputting light input from an input port to a different output port depending on the wavelength of the input light, and the wavelength of light output from an output port being different depending on the input port;
n communication nodes, n being an integer at least 2 and not greater than N, for outputting information of an input optical data signal, as is or after changing a part of the information, as an optical data signal of a predetermined wavelength; and
optical waveguides for connecting the input ports and the output ports of the N×N wavelength path establishment circuit, and the communication nodes,
wherein for at least some of the n communication nodes, in order to form at least one logical-ring transmission path where an optical data signal transmitted from one communication node returns to the one communication node via other communication nodes, a correlation of wavelengths for connecting between the input ports and the output ports of the N×N wavelength path establishment circuit, wavelengths of o optical data signals out put from the respective communication nodes, and connections between the input ports and the output ports of the N×N wavelength path establishment circuit, and the respective communication nodes are set, and
each communication nodes is provided with:
a device which transfers the optical data signal so that an optical data signal loaded with information of communication nodes circulates the respective communication nodes forming the logical-ring transmission path;
a memory for storing information of the optical data signal which has been received; and
a transfer device which writes the information of the optical data signal to the memory, and appends information to the optical data signal which is transmitted.

31. An optical communication system according to claim 30, further comprising a management device which monitors and controls the condition of the respective communication nodes,
wherein a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

32. An optical communication system comprising:
an N×N wavelength path establishment circuit having N input ports and N output ports, N being an integer of at least 2, outputting light input from an input port to a different output port depending on the wavelength of the input light, and the wavelength of light output from an output port being different depending on the input port;
n communication nodes, n being an integer at least 2 and not greater than N, for outputting information of an input optical data signal, as is or after changing a part of the information, as an optical data signal of a predetermined wavelength; and
optical waveguides for connecting the input ports and the output ports of the N×N wavelength path establishment circuit, and the communication nodes, a management device which monitors and controls the condition of the respective communication nodes, wherein for at least some of the n communication nodes, in order to form at least one logical-ring transmission path where an optical data signal transmitted from one communication node returns to the one communication node via other communication nodes, a correlation of wavelengths for connecting between the input ports and the output ports of the N×N wavelength path establishment circuit, wavelengths of optical data signals output from the respective communication nodes, and connections between the input ports and the output ports of the N×N wavelength path establishment circuit, and the respective communication nodes are set, and a management signal for managing a communication node is: transferred between the management device and the communication node by an optical signal, of which wavelength is different from the wavelength of the optical data signal or the wavelengths of the optical data signal and the optical control signal; transferred via an optical waveguide which is different from an optical waveguide for transmitting the optical data signal or both the optical data signal and the optical control signal; or transferred via an electric signal.

33. An optical communication system for communicating between multiple communication nodes for outputting information of an input optical data signal, as is or after changing a part of the information, as an optical data signal of a predetermined wavelength, comprising:

an N×N wavelength path establishment circuit, which has N input ports and N output ports, N being any integer which satisfies $2 \leq n \leq N$ where n is the number of the communication nodes, connected to the communication nodes via an optical waveguide, and light input from an input port is output to a different output port depending on the wavelength of the input light, and the wavelength of light output from an output port is different depending on the input port;

a database prestored with output wavelengths used in the case in which a signal is routed from a predetermined input port to a predetermined output port in the N×N wavelength path establishment circuit; and a controlling device which receives control information including a connection request from a communication node, refers to the database and reads out an output wavelength which should be set by the communication node, and transmits control information for instructing the output wavelength to the communication node which transmitted the connection request, wherein for at least some of the n communication nodes, in order to form a logical-ring transmission path where an optical data signal transmitted from one communication node returns to the one communication node via other communication nodes, a correlation of wavelengths for connecting between the input ports and the output ports of the N×N wavelength path establishment circuit, wavelengths of optical data signals output from respective communication nodes, and connections between the input ports and the output ports of the N×N wavelength path establishment circuit, and the respective communication nodes are set.

* * * * *